(12) United States Patent
Sato

(10) Patent No.: US 10,187,664 B2
(45) Date of Patent: Jan. 22, 2019

(54) IMAGE PROCESSING DEVICE AND METHOD

(75) Inventor: Kazushi Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 157 days.

(21) Appl. No.: 14/123,616

(22) PCT Filed: Jun. 21, 2012

(86) PCT No.: PCT/JP2012/004016
§ 371 (c)(1),
(2), (4) Date: Dec. 3, 2013

(87) PCT Pub. No.: WO2013/001752
PCT Pub. Date: Jan. 3, 2013

(65) Prior Publication Data
US 2014/0092958 A1 Apr. 3, 2014

(30) Foreign Application Priority Data
Jun. 28, 2011 (JP) .................................. 2011-143248

(51) Int. Cl.
H04N 19/96 (2014.01)
H04N 7/12 (2006.01)
(Continued)

(52) U.S. Cl.
CPC ........... *H04N 19/96* (2014.11); *H04N 19/176* (2014.11); *H04N 19/182* (2014.11);
(Continued)

(58) Field of Classification Search
CPC ....... H04N 19/00066; H04N 19/00333; H04N 19/176; H04N 19/82; H04N 19/182
(Continued)

(56) References Cited

U.S. PATENT DOCUMENTS

2011/0026611 A1 2/2011 Kondo
2012/0121188 A1 5/2012 Kondo
(Continued)

FOREIGN PATENT DOCUMENTS

CN 101517909 A 8/2009
JP 2014-506061 A 3/2014
(Continued)

OTHER PUBLICATIONS

Office Action dated Jul. 2, 2015 in Japanese Patent Application No. 2011-143248 (with English language translation).
(Continued)

Primary Examiner — Hee-Yong Kim
(74) Attorney, Agent, or Firm — Xsensus, LLP

(57) ABSTRACT

An image decoding apparatus includes a brightness adaptive offset processing section and a color difference adaptive offset processing section. The brightness adaptive offset processing section performs a brightness adaptive offset process with regard to brightness signal of an image to be decoded. The color difference adaptive offset processing section performs a color difference adaptive offset process with regard to a color difference signal based on data generated by the brightness adaptive offset process by the brightness adaptive offset processing section to generate a decoded image.

10 Claims, 28 Drawing Sheets

(51) Int. Cl.
H04N 19/44 (2014.01)
H04N 19/50 (2014.01)
H04N 19/176 (2014.01)
H04N 19/82 (2014.01)
H04N 19/169 (2014.01)
H04N 19/86 (2014.01)
H04N 19/182 (2014.01)

(52) U.S. Cl.
CPC ......... H04N 19/1883 (2014.11); H04N 19/82 (2014.11); H04N 19/86 (2014.11)

(58) Field of Classification Search
USPC .................................................. 375/240.02
See application file for complete search history.

(56) References Cited

U.S. PATENT DOCUMENTS

| | | | |
|---|---|---|---|
| 2012/0294353 A1* | 11/2012 | Fu ........................ | H04N 19/70 375/240.02 |
| 2013/0028531 A1 | 1/2013 | Sato | |
| 2013/0051477 A1 | 2/2013 | Sasaki | |
| 2013/0071039 A1 | 3/2013 | Sato | |
| 2013/0216149 A1 | 8/2013 | Sato | |
| 2013/0251032 A1 | 9/2013 | Tanaka | |
| 2013/0251050 A1 | 9/2013 | Ikeda et al. | |
| 2013/0259118 A1* | 10/2013 | Fu ................... | H04N 19/00066 375/240.02 |
| 2013/0259142 A1 | 10/2013 | Ikeda et al. | |
| 2013/0301739 A1 | 11/2013 | Sato | |
| 2013/0301743 A1 | 11/2013 | Ikeda et al. | |
| 2013/0301942 A1 | 11/2013 | Kondo | |
| 2013/0322525 A1 | 12/2013 | Tanaka | |
| 2013/0330012 A1 | 12/2013 | Sato | |
| 2013/0343451 A1 | 12/2013 | Sato | |
| 2014/0003510 A1 | 1/2014 | Lu et al. | |
| 2014/0023150 A1 | 1/2014 | Kondo | |
| 2014/0064362 A1 | 3/2014 | Sato | |
| 2014/0072037 A1 | 3/2014 | Sato | |
| 2014/0086322 A1 | 3/2014 | Takahashi et al. | |
| 2014/0105281 A1 | 4/2014 | Sato et al. | |

FOREIGN PATENT DOCUMENTS

| | | |
|---|---|---|
| WO | WO 2010/001999 A1 | 1/2010 |
| WO | WO 2012/142966 A1 | 10/2012 |
| WO | WO 2012/155553 A1 | 11/2012 |
| WO | WO 2012/176910 A1 | 12/2012 |
| WO | WO 2013/002554 A2 | 1/2013 |

OTHER PUBLICATIONS

U.S. Appl. No. 14/402,188, filed Nov. 19, 2014, Nakagami.
U.S. Appl. No. 14/402,200, filed Nov. 19, 2014, Nakagami.
Extended European Search Report dated Feb. 6, 2015 in Patent Application No. 12803692.8.
Peter List, et al. "Adaptive Deblocking Filter" IEEE Transactions on circuits and systems for video technology, vol. 13, No. 7, XP11221094A, Jul. 2003, pp. 614-619.
Mei-Yin Shen, et al. "Fast compression artifact reduction technique based on nonlinear filtering" Proceedings of the 1999 IEEE International symposium on circuits and systems/iscas, vol. 4, XP10341158A, May 30, 1999, pp. 179-182.
U.S. Appl. No. 13/386,849, filed Jan. 24, 2012, 2012-0121188, Kondo.
U.S. Appl. No. 12/820,305, filed Jun. 22, 2010, 2011-0026611, Kondo.
U.S. Appl. No. 13/639,056, filed Oct. 2, 2012, 2013-0051477, Sasaki.
U.S. Appl. No. 13/640,243, filed Oct. 9, 2012, 2013-0028531, Sato.
U.S. Appl. No. 13/700,156, filed Nov. 27, 2012, 2013-0071039, Sato.
U.S. Appl. No. 13/881,927, filed Apr. 26, 2013, 2013-0216149, Sato.
U.S. Appl. No. 13/990,893, filed May 31, 2013, 2013-0259142, Ikeda, et al.
U.S. Appl. No. 13/991,007, filed May 31, 2013, 2013-0251050, Ikeda, et al.
U.S. Appl. No. 13/990,489, filed May 30, 2013, 2013-0251032, Tanaka.
U.S. Appl. No. 14/001,305, filed Aug. 23, 2013, 2013-0330012, Sato.
U.S. Appl. No. 13/932,709, filed Jul. 1, 2013, 2014-0003510, Lu et al.
U.S. Appl. No. 13/946,707, filed Jul. 19, 2013, 2013-0301743, Ikeda, et al.
U.S. Appl. No. 13/940,782, filed Jul. 12, 2013, 2013-0301739, Sato.
U.S. Appl. No. 13/963,275, filed Aug. 9, 2013, 2013-0322525, Tanaka.
U.S. Appl. No. 13/942,335, filed Jul. 15, 2013, 2013-0301942, Kondo.
U.S. Appl. No. 13/972,392, filed Aug. 21, 2013, 2013-0343451, Sato.
U.S. Appl. No. 14/118,408, filed Nov. 18, 2013, 2014-0086322, Takahashi, et al.
U.S. Appl. No. 14/032,766, filed Sep. 20, 2013, 2014-0023150, Kondo.
U.S. Appl. No. 14/123,375, filed Dec. 2, 2013, Ikeda.
U.S. Appl. No. 14/077,932, filed Nov. 12, 2013, 2014-0064362, Sato.
U.S. Appl. No. 14/123,616, filed Dec. 3, 2013, 2014-0092958, Sato.
U.S. Appl. No. 14/082,988, filed Nov. 18, 2013, 2014-0072037, Sato.
U.S. Appl. No. 14/106,006, filed Dec. 13, 2013, 2014-0105281, Sato, et al.
Office Action dated Apr. 14, 2015 in Japanese Patent Application No. 2011-143248 (with English language translation).
Chih-Ming Fu, et al., "CE8 Subset3: Picture Quadtree Adaptive Offset", Media Tek, Inc., Joint Collaborative Team on Video Coding (JCT-VC) of ITU-T SG16 WP3 and ISO/IEC JTC1/SC29/WG11, 4th Meeting: Daegu, KR, JCTVC-D122, Jan. 20-28, 2011, 10 pages.
Takeshi Chujoh, "Block-based adaptive Loop Filter", Corporate Research & Development Center, ITU Telecommunications Standardization Sector Study Group 16 Question 6, Video Coding Experts Group (VCEG), 35$^{th}$ Meeting Berlin, Germany, VCEG-AI18, Jul. 16-18, 2008, 6 pages.
Thomas Wiegand, et al., "WD3: Working Draft 3 of High-Efficiency Video Coding", Joint Collaborative Team on Video Coding (JCT-VC) of ITU-T SG16 WP3 and ISO/IEC JTC1/SC29/WG11, 5$^{th}$ meeting Geneva, CH, JCTVC-E603, Mar. 16-23, 2011, 194 pages.
Thomas Wiegand, et al., "WD3: Working Draft 3 of High-Efficiency Video Coding", Joint Collaborative Team on Video Coding (JCT-VC) of ITU-T SG16 WP3 and ISO/IEC JTC1/SC29/WG11, 5$^{th}$ meeting Geneva, CH, JCTVC-E603, Mar. 16-23, 2011, 193 pages.
Chih-Ming Fu, et al., "CE8 Subtest3: Picture Quadtree Adaptive Offset", Media Tek, Inc., Joint Collaborative Team on Video Coding (JCT-VC) of ITU-T SG16 WP3 and ISO/IEC JTC1/SC29/WG11, 4th meeting Daegu, KR, JCTVC-D122, Jan. 20-28, 2011, 10 pages.
Chih-Ming Fu, et al., "Sample Adaptive Offset for Chroma", Media Tek Inc., LG Electronics, and Samsung Electronics Co., Ltd., Joint Collaborative Team on Video Coding (JCT-VC) of ITU-T SG16 WP3 and ISO/IEC JTC1/SC29/WG11, 6th Meeting: Torino, IT, JCTVC-F057, Jul. 14-22, 2011, 5 pages.
Yu-Wen Huang, et al., "In-Loop Adaptive Restoration", Media Tek Inc., Joint Collaborative Team on Video Coding (JCT-VC) of ITU-T SG16 WP3 and ISO/IEC JTC1/SC29/WG11, 2nd Meeting: Geneva, CH, JCTVC-B077, Jul. 21-28, 2010, 11 pages.
Office Action dated Oct. 20, 2016 in Japanese Patent Application No. 2015-170299 (with English language translation).
Thomas Wiegand, et al., "WD3: Working Draft 3 of High-Efficiency Video Coding," Joint Collaborative Team on Video Coding (JCT-VC) of ITU-T SG16 WP3 and ISO/IEC JTC1/SC29/WG11, JCTVC-E603, Mar. 16-23, 2011, 5 pages.

(56) References Cited

OTHER PUBLICATIONS

Notification of Reason(s) for Refusal dated Aug. 2, 2016 in Japanese Patent Application No. 2015-170299 (with English language translation).
Combined Chinese Office Action and Search Report dated Aug. 18, 2016 in Patent Application No. 201280030343.1 (with English language translation).
Chih-Ming Fu, et al., "CE13: Sample Adaptive Offset with LCU-Independent Decoding" Joint Collaborative Team on Video Coding (JCT-VC) of ITU-T SG16 WP3 and ISO/IEC JTC1/SC29/WG11 JCTVC-E049, Mar. 2011, pp. 1-5.
Yu-Wen Huang, "A Technical Description of Media Tek's Proposal to the JCT-VC CfP" Joint Collaborative Team on Video Coding (JCT-VC) of ITU-T SG16 WP3 and ISO/IEC JTC1/SC29/WG11, Apr. 2010, pp. 15-18.
Combined Chinese Office Action and Search Report dated May 9, 2017 in Patent Application No. 201280030343.1 (with English Translation).
Office Action dated Dec. 19, 2017 in Japanese Patent Application No. 2017-024599 (with English language translation), 10 pages.
Office Action dated Jan. 15, 2018 in Korean Patent Application No. 10-2013-7033662 (with English language translation), 15 pages.
Chih-Ming Fu. et al. "CE13: Sample Adaptive Offset with LCU-Independent Decoding", Joint Collaborative Team on Video Coding (JCT-VC) of ITU-T SG16 WP3 and ISO/IEC JTC1/SC29/WG11 JCTVC-E049. 2011, pp. 1-6 (with cover pages) [reference previously filed, submitting complete copy].
Office Action dated Jan. 23, 2018 in Japanese Patent Application No. 2017-024599 (with English language translation).
Japanese Office Action dated Mar. 20, 2018 in Japanese Patent Application No. 2017-024599 (with English translation), 7 pages.

\* cited by examiner

FIG. 6

| Condition | Bs |
|---|---|
| EITHER p OR q BELONGS TO INTRA MACRO BLOCK AND IS POSITIONED ON MACRO BLOCK BOUNDARY | Bs=4 (Strongest Filtering) |
| EITHER p OR q BELONGS TO INTRA MACRO BLOCK BUT IS NOT POSITIONED ON MACRO BLOCK BOUNDARY | Bs=3 |
| NEITHER p OR q BELONGS TO INTRA MACRO BLOCK AND EITHER HAS A CONVERSION EFFICIENT | Bs=2 |
| NEITHER p OR q BELONGS TO INTRA MACRO BLOCK AND NEITHER HAS A CONVERSION EFFICIENT BUT REFERENCE FRAME IS DIFFERENT, NUMBER OF REFERENCE FRAMES IS DIFFERENT, OR mv VALUE IS DIFFERENT | Bs=1 |
| NEITHER p OR q BELONGS TO INTRA MACRO BLOCK, NEITHER HAS A CONVERSION EFFICIENT AND REFERENCE FRAME AND mv VALUE ARE IDENTICAL | Bs=0 (No Filtering) |

| indexA (for α) or indexB (for β) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| α | 0 | 0 | 0 | 0 | 0 | 0 | 0 | 0 | 0 | 0 | 0 | 0 | 0 | 0 | 0 | 0 | 4 | 4 | 5 | 6 | 7 | 8 | 9 | 10 | 12 | 13 |
| β | 0 | 0 | 0 | 0 | 0 | 0 | 0 | 0 | 0 | 0 | 0 | 0 | 0 | 0 | 0 | 0 | 2 | 2 | 2 | 3 | 3 | 3 | 3 | 4 | 4 | 4 |

B

| indexA (for α) or indexB (for β) | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|
| α | 15 | 17 | 20 | 22 | 25 | 28 | 32 | 36 | 40 | 45 | 50 | 56 | 63 | 71 | 80 | 90 | 101 | 113 | 127 | 144 | 162 | 182 | 203 | 226 | 255 | 255 |
| β | 6 | 6 | 7 | 7 | 8 | 8 | 9 | 9 | 10 | 10 | 11 | 11 | 12 | 12 | 13 | 13 | 14 | 14 | 15 | 15 | 16 | 16 | 17 | 17 | 18 | 18 |

| indexA | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| bs=1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 |
| bs=2 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 |
| bs=3 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 |

B

| indexA | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|
| bs=1 | 1 | 1 | 1 | 1 | 1 | 1 | 1 | 2 | 2 | 2 | 2 | 3 | 3 | 3 | 4 | 4 | 4 | 5 | 6 | 6 | 7 | 8 | 9 | 10 | 11 | 13 |
| bs=2 | 1 | 1 | 1 | 1 | 1 | 2 | 2 | 2 | 2 | 3 | 3 | 3 | 4 | 4 | 5 | 5 | 6 | 7 | 8 | 8 | 10 | 11 | 12 | 13 | 15 | 17 |
| bs=3 | 1 | 2 | 2 | 2 | 2 | 3 | 3 | 3 | 4 | 4 | 4 | 5 | 6 | 6 | 7 | 8 | 9 | 10 | 11 | 13 | 14 | 16 | 18 | 20 | 23 | 25 |

FIG. 15

A  Classification rule for 1-D patterns

| Category | Condition |
|---|---|
| 1 | C < 2 neighboring pixels |
| 2 | C < 1 neighbor && c == 1 neighbor |
| 3 | C > 1 neighbor && c == 1 neighbor |
| 4 | C > 2 neighbors |
| 0 | None of the above |

B  Classification rule for 2-D patterns

| Category | Condition |
|---|---|
| 1 | C < 4 neighbors |
| 2 | C < 3 neighbors && C = $4^{th}$neighbor |
| 3 | C < 3 neighbors && C > $4^{th}$neighbor |
| 4 | C > 3 neighbors && C < $4^{th}$neighbor |
| 5 | C > 3 neighbors && C = $4^{th}$neighbor |
| 6 | C > 4 neighbors |
| 0 | None of the above |

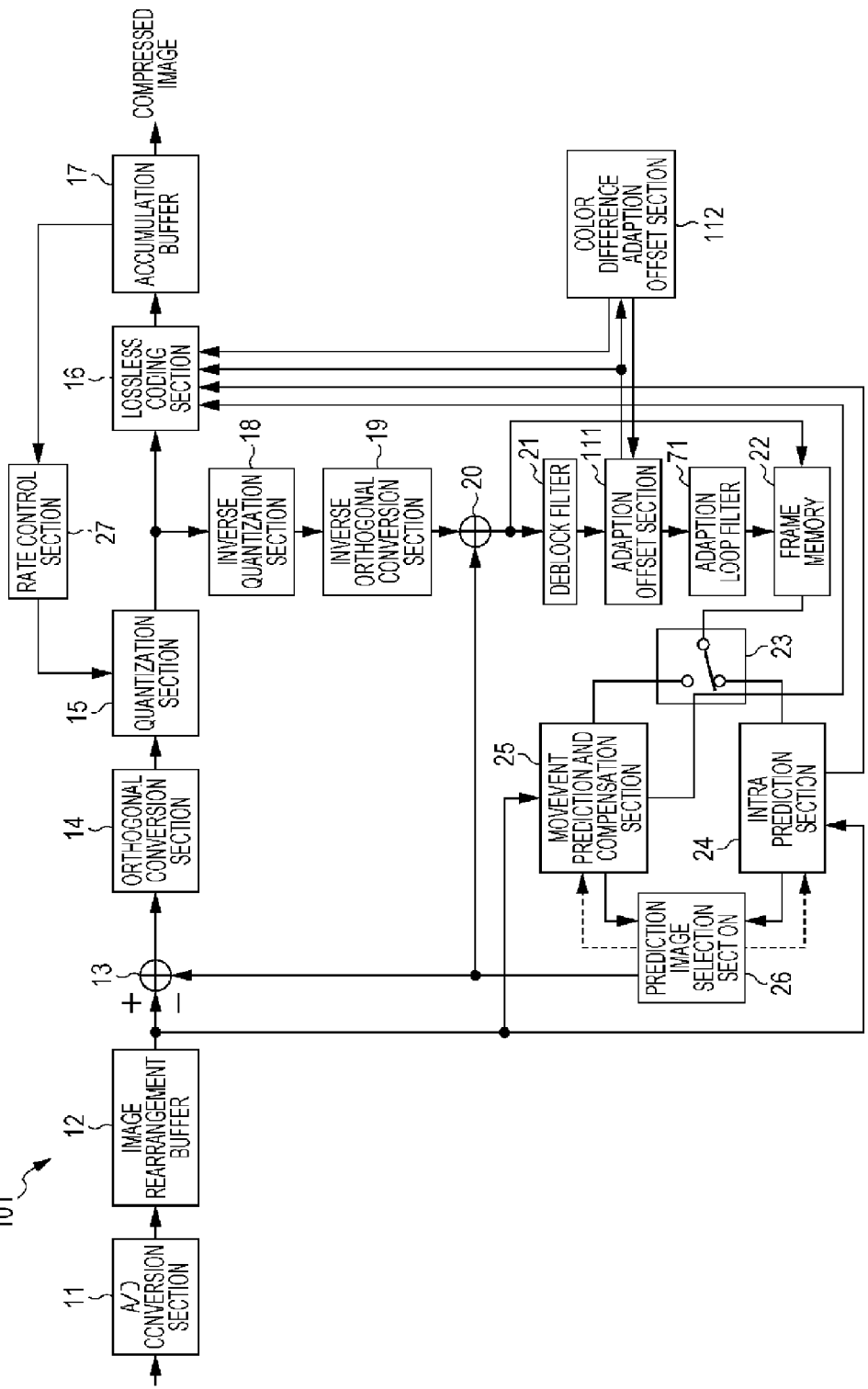

IMAGE PROCESSING DEVICE AND METHOD

CROSS-REFERENCE TO RELATED APPLICATIONS

The present application is based upon and claims the benefit of priority under 35 U.S.C. § 119 of Japanese Priority Patent Application JP 2011-143248 filed in the Japanese Patent Office on Jun. 28, 2011, the entire contents of which are hereby incorporated by reference.

TECHNICAL FIELD

The present disclosure relates to an image processing device and method, and in particular, relates to an image processing device and method which are able to improve the coding efficiency with regard to a color difference signal.

BACKGROUND ART

Recently, a device is coming into wide spread in which image information is treated as digital and an image is compressed and coded by adopting a coding method which compresses using orthogonal transformation such as a discrete cosine transformation and movement compensation using the redundancy which is a characteristic of image information with the transfer and accumulation of information with high efficiency being an object at this time. In the coding method, for example, there is MPEG (Moving Picture Experts Group) and the like.

In particular, MPEG2 (ISO/IEC 13818-2) is defined as a general image coding method and is a standard which includes both interlace scanning images and sequential scanning images, standard resolution images, and high-precision images. For example, MPEG2 is currently widely used as an application with a wide scope for professional purposes and consumer purposes. Due to the use of the MPEG2 compression method, a coding amount (bit rate) of 4 to 8 Mbps is allocated if using, for example, the interlace scanning images with standard resolution which have 720×480 pixels. In addition, due to the use of the MPEG2 compression method, a coding amount (bit rate) of 18 to 22 Mbps is allocated if using, for example, the interlace scanning images with standard resolution which have 1920×1008 pixels. Due to this, the realization of high efficiency and excellent image quality is possible.

MPEG2 mainly has high image quality coding which is appropriate for broadcasting as a target, but is not supported in the coding amount (bit rate) which is lower than MPEG1, that is, the coding method with a higher rate of compression. Due to the diffusion of mobile phones, it is thought that the needs of a compression method such as this will increase in the future and the standardization of an MPEG4 coding method is being performed according to this. In relation to the image coding method, the specifications of ISO/IEC 14496-2 of December 1998 has been recognized as the international standard.

As the schedule for standardization, there is an international standard of H.264 and MPEG-4 Part 10 (Advanced Video Coding which is referred to below as H.264/AVC) in March 2003.

Furthermore, standardization of FRExt (Fidelity Range Extension), which includes coding tools which are necessary for administration with RGB, 4:2:2, and 4:4:4 and a 8×8 DCT and quantization matrix which are specified by MPEG-2 as an extension of H.264/AVC, was completed in February 2005. Due to this, FRExt became a coding method where it is possible to excellently realize film noise which is included in video using H.264/AVC and become a transport which is widely used in applications such as Blu-Ray Discs (registered trademark).

However, recently, needs with regard to further high compression rate coding are increasing such as the compression of images with approximately 4000×2000 pixels which is four times that of high vision images and the distribution of high vision images in an environment of limited transfer capacity such as the Internet. As a result, studies in relation to the improvement of coding efficiency are continually being performed in VCEG (=Video Coding Experts Group) under ITU-T as described previously.

As one improvement in coding efficiency, a method is proposed where there is a FIR filter in a movement compensation loop (for example, refer to NPL1). It is possible to suppress deterioration of a reference image to a minimum and improve the coding efficiency of image compression information which is the output by determining the FIR filter coefficient in a coding device so that an error between the FIR filter and the input image is minimized using a Wiener Filter.

Then, with the object of further improving the coding efficiency using H.264/AVC, currently, standardization of a coding method which is referred to as HEVC (High Efficiency Video Coding) is progressing due to JCTVC (Joint Collaboration Team—Video Coding) which is a collaborative standardization body of ITU-T and ISO/IEC. NPL2 has been published by HEVC as a draft.

A coding unit (CU) has been defined in HEVC as the same processing unit as that of the macroblock in AVC. The CU is designated in the image compression information in each sequence without the size being fixed to 16×16 pixels unlike the macroblock in AVC.

The CU is configured in a layered manner from the LCU (Largest Coding Unit) which is the largest to the SCU (Smallest Coding Unit) which is the smallest. That is, in general, it is possible to consider that the LCU is equivalent to the macroblock of AVC and the CU in the lower layers than the LCU (the CU which is smaller than the LCU) is equivalent to sub-macroblocks of AVC.

Here, a method is adopted in HEVC with an adaptive offset filter which is proposed in NPL3. The adaptive offset filter in HEVC is provided between a deblock filter and an adaptive loop filter.

As types of adaptive offsets, there are two types which are referred to as band offsets, six types which are referred to as edge offsets, and furthermore, it is possible that the offsets are not adapted. Then, it is possible to divide the image into a quad-tree and select whether to code using which of the types of adaptive offsets described above in each of the regions. It is possible to improve the coding efficiency using the method.

CITATION LIST

Non Patent Literature

NPL 1: Takeshi Chujoh, Goki Yasuda, Naofumi Wada, Takashi Watanabe, Tomoo Yamakage, "Block-based Adaptive Loop Filter", VCEG-AI18, ITU-Telecommunications Standardization SectorSTUDY GROUP 16 Question 6Video Coding Experts Group (VCEG)35th Meeting: Berlin, Germany, 16-18 Jul. 2008

NPL 2: Thomas Wiegand, Woo-jin Han, Benjamin Bross, Jens-Rainer Ohm, Gary J. Sullivian, "WD3: Working Draft3 of High-Efficiency Video Coding", JCTVc-E603, March 2011

NPL 3: "CE8 Subtest 3:Picture Quality Adaptive Offset", JCTVC-D122, January 2011

SUMMARY OF INVENTION

Technical Problem

However, the method which is proposed in NPL3 is applied only with regard to a brightness signal and is not applied to a color difference signal. Accordingly, support with regard to the color difference signal is necessary.

The present disclosure takes into consideration these circumstances and is able to improve the coding efficiency with regard to the color difference signal.

Solution to Problem

The present invention broadly comprises image decoding and encoding apparatuses, and image decoding and encoding methods. In one embodiment, the image decoding apparatus includes a brightness adaptive offset processing section and a color difference adaptive offset processing section. The brightness adaptive offset processing section performs a brightness adaptive offset process with regard to brightness signal of an image to be decoded. The color difference adaptive offset processing section performs a color difference adaptive offset process with regard to a color difference signal based on data generated by the brightness adaptive offset process by the brightness adaptive offset processing section to generate a decoded image.

BRIEF DESCRIPTION OF DRAWINGS

FIG. 6 is a diagram illustrating a method of defining Bs.

FIG. 8 is a diagram illustrating an example of a correspondence relationship of index A and index B and the values of alpha and beta.

FIG. 9 is a diagram illustrating an example of a correspondence relationship of Bs and index A and tC0.

FIG. 15 is a diagram illustrating a regulations list of an edge offset.

FIG. 16 is a block diagram illustrating an example of the main configuration of an image coding device according to the present disclosure.

DESCRIPTION OF EMBODIMENTS

Below, embodiments for carrying out the present disclosure will be described. Here, the description will be performed with the order below.

1. First Embodiment (Image Coding Device)
2. Second Embodiment (Image Decoding Device)
3. Third Embodiment (Personal Computer)
4. Fourth Embodiment (Television Reception Unit)
5. Fifth Embodiment (Mobile Phone Unit)
6. Sixth Embodiment (Hard Disk Recorder)
7. Seventh Embodiment (Camera)

1. First Embodiment

<H.264/AVC Image Coding Device>

Figure 1:
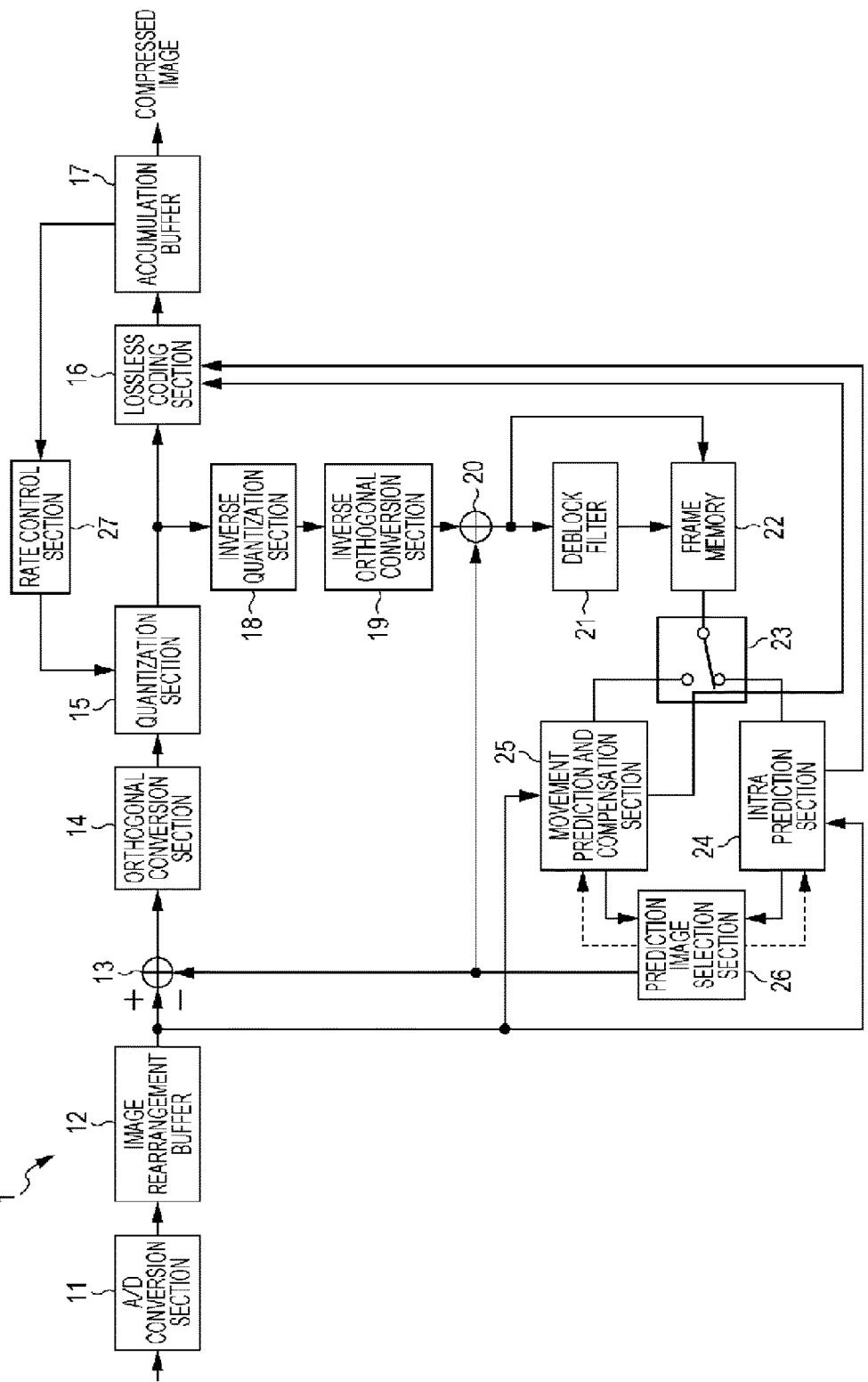
FIG. 1 is a block diagram illustrating an example of the main configuration of an image coding device with an H.264/AVC method.

FIG. 1 represents a configuration of an embodiment of an image coding device which codes an image using a coding method of H.264 and MPEG (Moving Picture Experts Group) 4 Part 10 (AVC (Advanced Video Coding)). Below, the coding method of H.264 and MPEG is referred to as the H.264/AVC method.

In the example of FIG. 1, an image coding device 1 is configured to include an A/D conversion section 11, an image rearrangement buffer 12, a calculation section 13, an orthogonal transformation section 14, a quantization section 15, a lossless coding section 16, an accumulation buffer 17, an inverse quantization section 18, an inverse orthogonal transformation section 19, and a calculation section 20. In addition, the image coding device 1 is configured to also include a deblock filter 21, a frame memory 22, a selection section 23, an intra prediction section 24, a movement prediction and compensation section 25, a prediction image selection section 26 and a rate control section 27.

The A/D conversion section 11 carries out A/D conversion image data which is input, outputs to the image rearrangement buffer 12, and stores. The image rearrangement buffer 12 rearranges images of frames in the order of display which are stored to an order of frames for coding according to a GOP (Group of Pictures) configuration. The image rearrangement buffer 12 supplies the images where the frame order has been rearranged to the calculation section 13. In addition, the image rearrangement buffer 12 also supplies the images where the frame order has been rearranged to the intra prediction section 24 and the movement prediction and compensation section 25.

The calculation section 13 reduces the prediction image which is supplied from the intra prediction section 24 or the movement prediction and compensation section 25 via the prediction image selection section 26 from the image which is read out from the image rearrangement buffer 12 and outputs the difference information to the orthogonal transformation section 14.

For example, in a case of an image where intra coding is performed, the calculation section 13 reduces a prediction image which is supplies from the intra prediction section 24 from the image which is read out from the image rearrangement buffer 12. In addition, for example, in a case of an image where inter coding is performed, the calculation section 13 reduces a prediction image which is supplies from the movement prediction and compensation section 25 from the image which is read out from the image rearrangement buffer 12.

The orthogonal transformation section 14 executes an orthogonal transformation such as a discrete cosine transformation, a Karhunen Loeve transformation, or the like with regard to the difference information which is supplied from the calculation section 13 and supplies the transformation coefficient to the quantization section 15.

The quantization section 15 quantizes the transformation coefficient which is output from the orthogonal transformation section 14. The quantization section 15 sets the quantization parameter based on the information which relates to a target value of the amount of coding which is supplied from the rate control section 27 and performs quantization. The quantization section 15 supplies the transformation coefficient which has been quantized to the lossless coding section 16.

The lossless coding section 16 carries out lossless coding such as variable-length coding or arithmetic coding with regard to the transformation coefficient which has been quantized. Since the coefficient data is quantized under the control of the rate control section 27, the amount of coding becomes the target which is set by the rate control section 27 (or is approximated to the target value).

The lossless coding section 16 acquires the information which expresses the intra prediction and the like from the intra prediction section 24 and acquires information which expresses the inter prediction mode, movement vector information, and the like from the movement prediction and compensation section 25. Here, the information which expresses the intra prediction (prediction within a screen) is also referred to below as intra prediction mode information. In addition, the information which expresses the inter prediction (prediction between screens) is also referred to below as inter prediction mode information.

The lossless coding section 16 codes the transformation coefficient which has been quantized and sets various information such as a filter coefficient, the intra prediction mode information, the inter prediction mode information, and the quantization parameters as a portion of header information of the coding data (multi-layering). The lossless coding section 16 accumulates coding data which is obtained by coding by supplying to the accumulation buffer 17.

For example, in the lossless coding section 16, a lossless coding process such as variable-length coding or arithmetic coding is performed. As the variable length coding, there is CAVLC (Context-Adaptive Variable Length Coding) which is determined using the H.264/AVC method and the like. As the arithmetic coding, there is CABAC (Context-Adaptive Binary Arithmetic Coding) or the like.

The accumulation buffer 17 temporarily holds the coding data which is supplied from the lossless coding section 16 and outputs as coding image which is coded using the H.264/AVC method to, for example, a recording device or a transfer path which are not shown at a later stage at a predetermined timing.

In addition, the transformation coefficient which is quantized in the quantization section 15 is also supplied to the inverse quantization section 18. The inverse quantization section 18 carries out inverse quantization of the transformation coefficient which has been quantized using a method which corresponds to the quantization by the quantization section 15. The quantization section 18 supplies the transformation coefficient which has been acquired to the inverse orthogonal transformation section 19.

The inverse orthogonal transformation section 19 carries out inverse orthogonal transformation of the transformation coefficient which is supplied using a method which corresponds to the orthogonal transformation by the orthogonal transformation section 14. The output where the inverse orthogonal transformation has been carried out (difference information which has been decoded) is supplied to the calculation section 20.

The calculation section 20 adds the prediction image, which is supplied from the intra prediction section 24 or the movement prediction and compensation section 25 via the prediction image selection section 26, to the result of the inverse orthogonal transformation which is supplied by the inverse orthogonal section 19, that is, the difference information which is reconstructed and obtains the image which is locally decoded (decoding image).

For example, in a case where the difference information corresponds to an image where intra coding is performed, the calculation section 20 adds the prediction image which is supplied from the intra prediction section 24 to the difference information. In addition, for example, in a case where the difference information corresponds to an image where inter coding is performed, the calculation section 20 adds the prediction image which is supplied from the movement prediction and compensation section 25 to the difference information.

The calculation result is supplied to the deblock filter 21 or the frame memory 22.

The deblock filter 21 removes block distortion of the decoding image by appropriately performing a deblock filter process. The deblock filter 21 supplies a filter process result to the frame memory 22. Here, the decoding image which is output from the calculation section 20 is able to be supplied to the frame memory 22 without going via the deblock filter 21. That is, it is possible to omit the deblock filter process of the deblock filter 21.

The frame memory 22 stores the decoding image which is supplied and is output to the intra prediction section 24 or the movement prediction and compensation section 25 via the selection section 23 at a predetermined timing with the decoding image which is stored as a reference image.

For example, in a case where intra coding is performed, the frame memory 22 supplies the reference image to the intra prediction section 24 via the selection section 23. In addition, for example, in a case where inter coding is performed, the frame memory 22 supplies the reference image to the movement prediction and compensation section 25 via the selection section 23.

The selection section 23 supplies the reference image to the intra prediction section 24 in a case where the reference image which is supplied from the frame memory 22 is an image where intra coding is performed. In addition, the selection section 23 supplies the reference image to the movement prediction and compensation section 25 in a case where the reference image which is supplied from the frame memory 22 is an image where inter coding is performed.

The intra prediction section 24 performs intra prediction (prediction within a screen) where the prediction image is generated using the pixel value in a processing target picture which is supplied from the frame memory 22 via the selection section 23. The intra prediction section 24 performed intra prediction using a plurality of modes (intra prediction modes) which are prepared in advance.

In the H.264/AVC method, an intra
4×4
prediction mode, an intra
8×8
prediction mode, and an intra
16×16
prediction mode are defined with regard to the brightness signal. In addition, it is possible to define the prediction mode which is independent to the brightness signal for each macroblock in relation to the color difference signal. There is the intra
4×4
prediction mode with regard to each of the
4×4
brightness blocks, there is the intra
8×8
prediction mode with regard to each of the
8×8
brightness blocks, and one intra prediction mode is defined. With regard to the intra
16×16
prediction mode and the color difference signal, one prediction mode is defined for each with regard to one macroblock.

The intra prediction section 24 generates the prediction image using all of the intra prediction modes as candidates, evaluates a cost function value of each prediction image using the input image which is supplied from the image rearrangement buffer 12, and selects an optimal mode. The intra prediction section 24 supplies the prediction image which is generated using the optimal mode to the calculation section 13 or the calculation section 20 via the prediction image selection section 26 when the optimal intra prediction mode is selected.

In addition, as described above, the intra prediction section 24 appropriately supplies information such as an intra prediction mode which expresses the intra prediction mode which has been adopted to the lossless coding section 16.

The movement prediction and compensation section 25 performs movement prediction (inter prediction) using the input image which is supplied from the image rearrangement buffer 12 and the reference image which is supplied from the frame memory 22 via the selection section 23 with regard to the image where inter coding is performed. The movement prediction and compensation section 25 performs a movement compensation process according to a movement vector which is detected and generates the prediction image (inter prediction image information). The movement prediction and compensation section 25 performs inter prediction in this manner using a plurality of modes (inter prediction modes) which are prepared in advance.

The movement prediction and compensation section 25 generates the prediction image using all of the inter prediction modes as candidates, evaluates a cost function value of each prediction image, and selects an optimal mode. The movement prediction and compensation section 25 supplies the prediction image which is generated to the calculation section 13 or the calculation section 20 via the prediction image selection section 26.

In addition, the movement prediction and compensation section 25 supplies the inter prediction mode information which expresses the inter prediction mode which is adopted and the movement vector information which expresses the movement vector which has been calculated to the lossless coding section 16.

The prediction image selection section 26 supplies the output of the intra prediction section 24 to the calculation section 13 or the calculation section 20 in a case of the image where intra coding is performed and supplies the output of the movement prediction and compensation section 25 to the calculation section 13 or the calculation section 20 in a case of the image where inter coding is performed.

The rate control section 27 controls the rate of the quantization operation of the quantization section 15 based on the compressed image which is accumulated in the accumulation buffer 17 so that overflow or underflow is not generated.

<H.264/AVC Method Image Decoding Method>

Figure 2:
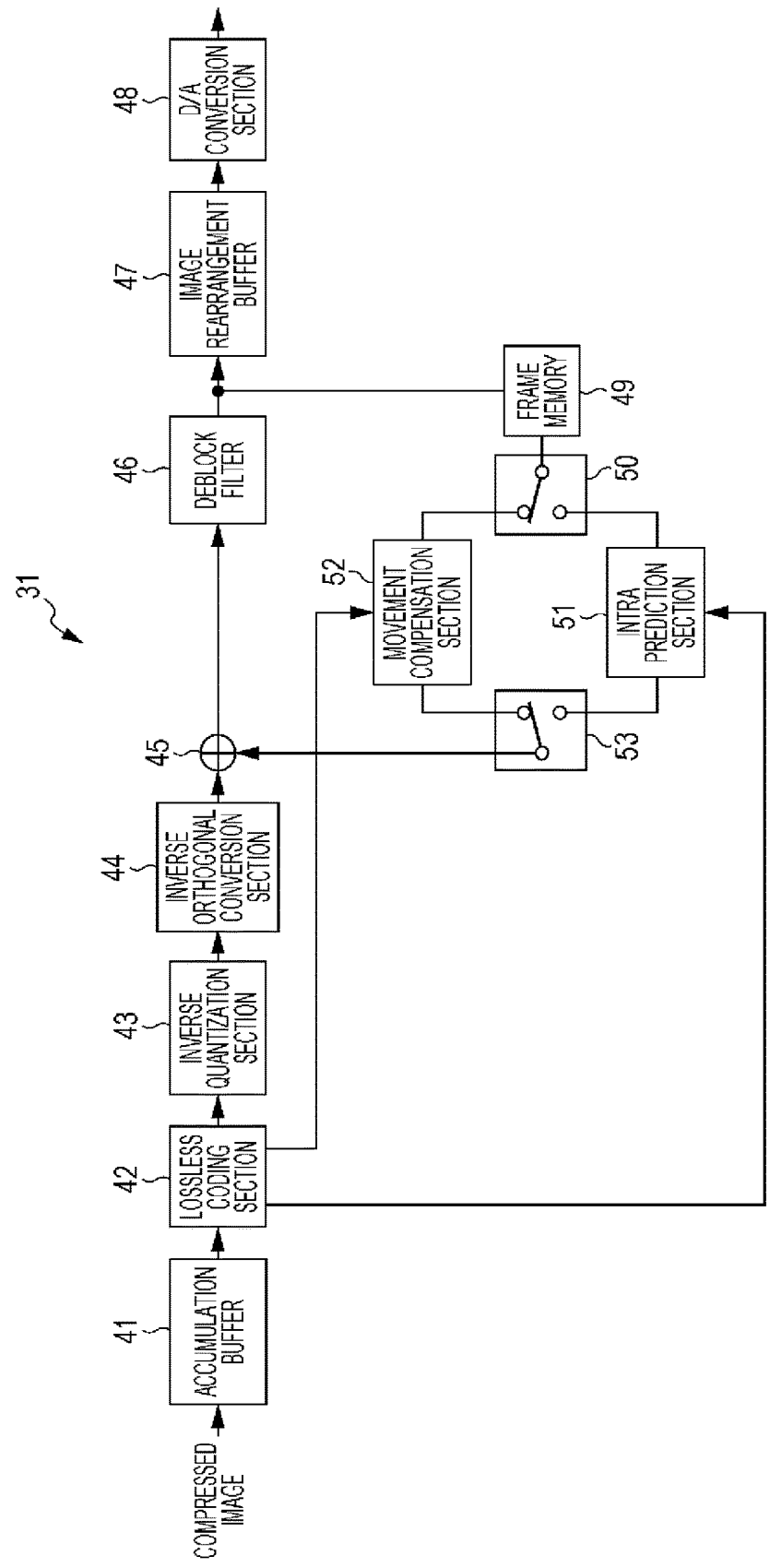
FIG. 2 is a block diagram illustrating an example of the main configuration of an image decoding device with the H.264/AVC method.

FIG. 2 is a block diagram illustrating an example of the main configuration of an image decoding device which realizes image compression using orthogonal transformation such as a discrete cosine transformation, a Karhunen Loeve transformation, or the like and movement compensation. An image decoding device 31 which is shown in FIG. 2 is a decoding device which corresponds to the image coding device 1 of FIG. 1.

The coding data which is coded by the image coding device 1 is supplied to and decoded by the image decoding device 31 which corresponds to the image coding section 1 via, for example, an arbitrary route such as a transfer path or a recording medium.

As shown in FIG. 2, the image decoding device 31 is configured to include an accumulation buffer 41, a lossless decoding section 42, an inverse quantization section 43, an inverse orthogonal transformation section 44, a calculation section 45, a deblock filter 46, an image rearranging buffer 47, and a D/A conversion section 48. In addition, the image decoding device 31 has a frame memory 49, a selection section 50, an intra prediction section 51, a movement compensation section 52, and the image selection section 53.

The accumulation buffer 41 accumulates coding data which has been transferred. The coding data is coded using the image coding device 1. The lossless decoding section 42 decodes the coding data which is read out at the predetermined timing from the accumulation buffer 41 using the coding method of the lossless coding section 16 of FIG. 1.

In addition, in a case where the frame is intra coding, the intra prediction mode information is stored in a header section of the coding data. The lossless decoding section 42 decodes the intra prediction mode information and the information is supplied to the intra prediction section 51. With regard to this, in a case where the frame is intra coding, the movement vector information is stored in a header section of the coding data. The lossless decoding section 42 decodes the movement vector information and the information is supplied to the movement vector section 52.

The inverse quantization section 43 carried out inverse quantification on coefficient data (quantization coefficient) which is obtained by decoding using the lossless decoding section 42 using a method which corresponds to the quantization method of the quantization section 15 of FIG. 1. That is, the inverse quantization section 43 performs inverse quantization of the quantization coefficient with the same method as the inverse quantization section 18 of FIG. 1.

The inverse quantization section 43 supplies the coefficient data which has been quantized, that is, the orthogonal transformation coefficient to the inverse orthogonal transformation section 44. The inverse orthogonal transformation section 44 carried out inverse orthogonal transformation of the orthogonal transformation coefficient using a method which corresponds to the orthogonal transformation method of the orthogonal transformation section 14 of FIG. 1 (the method which is the same as the inverse orthogonal transformation section 19 of FIG. 1) and obtains decoding residual data which corresponds to previous residual data where orthogonal transformation is carried out in the image coding device 1. For example, fourth-order inverse orthogonal transformation is carried out.

The decoding residual data which is obtained by the inverse orthogonal transformation is supplied to the calculation section 45. In addition, the prediction image is supplied from the intra prediction section 51 or the movement compensation section 52 via the image selection section 53 in the calculation section 45.

The calculation section 45 adds the decoding residual data and the prediction image and obtains the decoding image data which corresponds to the previous image data where the prediction image is reduced using the calculation section 13 of the image coding device 1. The calculation section 45 supplies the decoding image data to the deblock filter 46.

The deblock filter 46 supplies the decoding image which has been supplied to the image rearrangement buffer 47 after the block distortion has been removed.

The image rearrangement buffer 47 performs the rearrangement of images. That is, the order of the frames which are arranged for the order of coding by the image rearrangement buffer 12 of FIG. 1 are rearranged to the original order for display. The D/A conversion section 48 carries out D/A conversion on the images which are supplied from the image rearrangement buffer 47, outputs to the display which is not shown, and displays.

The output of the deblock filter 46 is further supplied to the frame memory 49.

The frame memory 49, the selection section 50, the intra prediction section 51, the movement compensation section 52, and the image selection section 53 respectively corresponds to the frame memory 22, the selection section 23, the intra prediction section 24, the movement prediction and compensation section 25, and the prediction image selection section 26 of FIG. 1.

The selection section 50 reads out the image where inter processing is performed and the image which is referenced from the frame memory 49 and supplies to the movement compensation section 52. In addition, the selection section 50 reads out the image which is used in the intra prediction from the frame memory 49 and supplies to the intra prediction 51.

In the intra prediction section 51, the information which expresses the intra prediction mode which is obtained by decoding the header information and the like is appropriately supplied from the lossless decoding section 42. The intra prediction section 51 generates the prediction image from the reference image which is acquired from the frame memory 49 based on the information and supplies the prediction image which is generation to the image selection section 53.

The movement compensation section 52 acquires the information which is obtained by decoding the header information (prediction mode information, movement vector information, reference frame information, flags, various types of parameters, and the like) from the lossless decoding section 42.

The movement compensation section 52 generates the prediction image from the reference image which is acquired from the frame memory 49 based on the information which is supplies from the lossless decoding section 42 and the prediction image which is generated is supplied to the image selection section 53.

The image selection section 53 selects prediction image which is generated by the movement compensation section 52 or the intra prediction section 51 and supplies to the calculation section 45.

<Details of Adaptive Loop Filter>

Next, the adaptive loop filter (ALF) which is proposed in PTL1 will be described.

Figure 3:
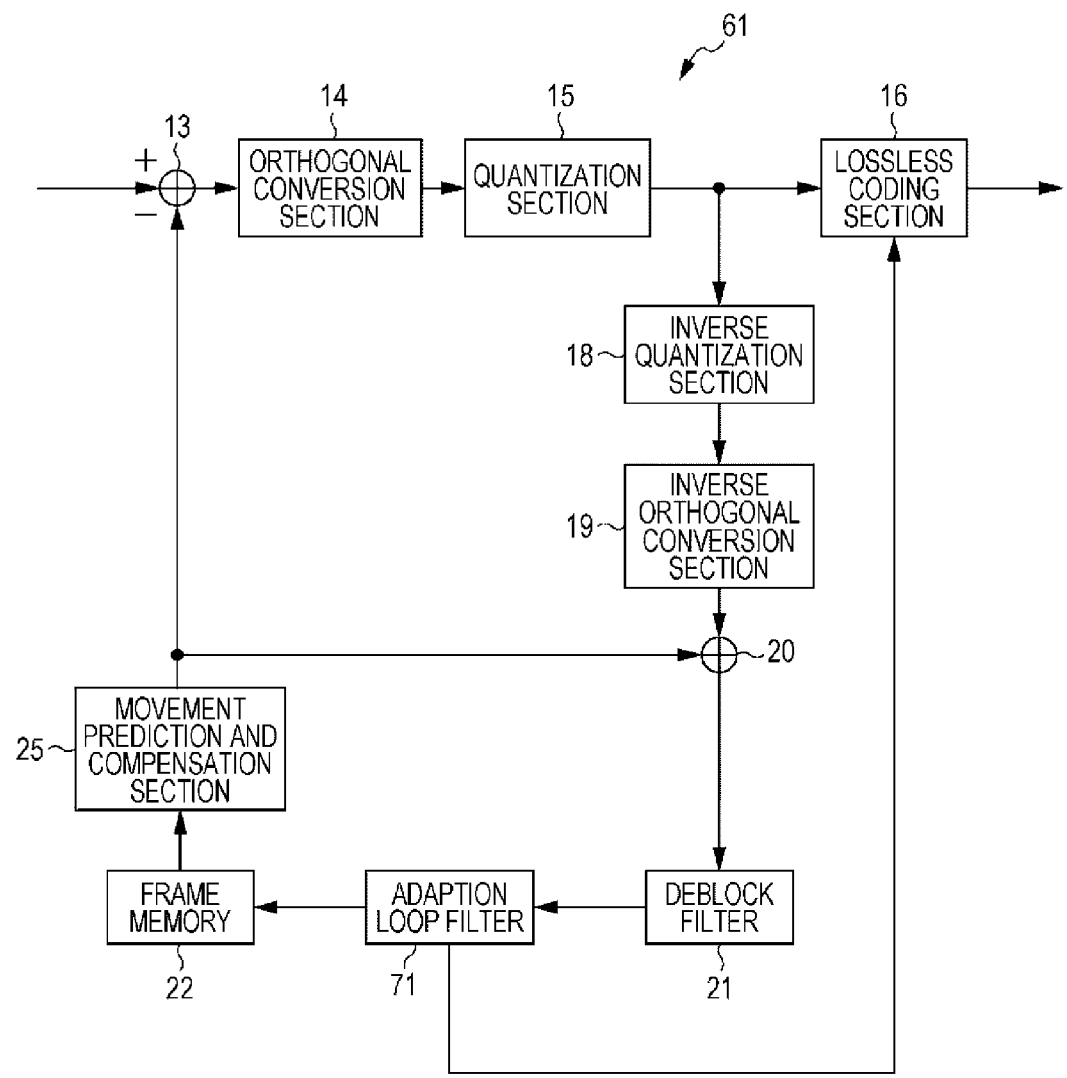
FIG. 3 is a block diagram illustrating an example of the main configuration of an image coding device where an adaptive loop filter is applied.

FIG. 3 is a block diagram illustrating a configuration example of an image coding device where an adaptive loop filter is applied. Here, in the example of FIG. 3, for ease of description, the A/D conversion section 11, the image rearrangement buffer 12, the accumulation buffer 17, the selection section 23, the intra prediction section 24, the prediction image selection section 26, and the rate control section 27 of FIG. 1 are omitted. In addition, the arrows and the like are appropriately omitted. Accordingly, in the case of the example of FIG. 3, the reference image from the frame memory 22 is directly input to the movement prediction and compensation section 25 and the prediction image from the movement prediction and compensation section 25 is directly input to the calculation sections 13 and 20.

That is, an image coding device 61 of FIG. 3 is different to the image coding device 1 of FIG. 1 only in the point where an adaptive loop filter 71 is added between the deblock filter 21 and the frame memory 22.

The adaptive loop filter 71 performs calculation of an adaptive loop filter coefficient that the residual of the original image from the image rearrangement buffer 12 (which is omitted from the diagram) is minimized and performs a filter process on the decoding image from the deblock filter 21 using the adaptive loop filter coefficient. As the filter, for example, a Wiener Filter is used.

In addition, the adaptive loop filter 71 sends the adaptive loop filter coefficient which is calculated to the lossless coding section 16. In the lossless coding section 16, a lossless coding process such as variable-length coding or arithmetic coding is carried out on the adaptive loop filter coefficient which is inserted into the header section of the compressed image.

Figure 4:
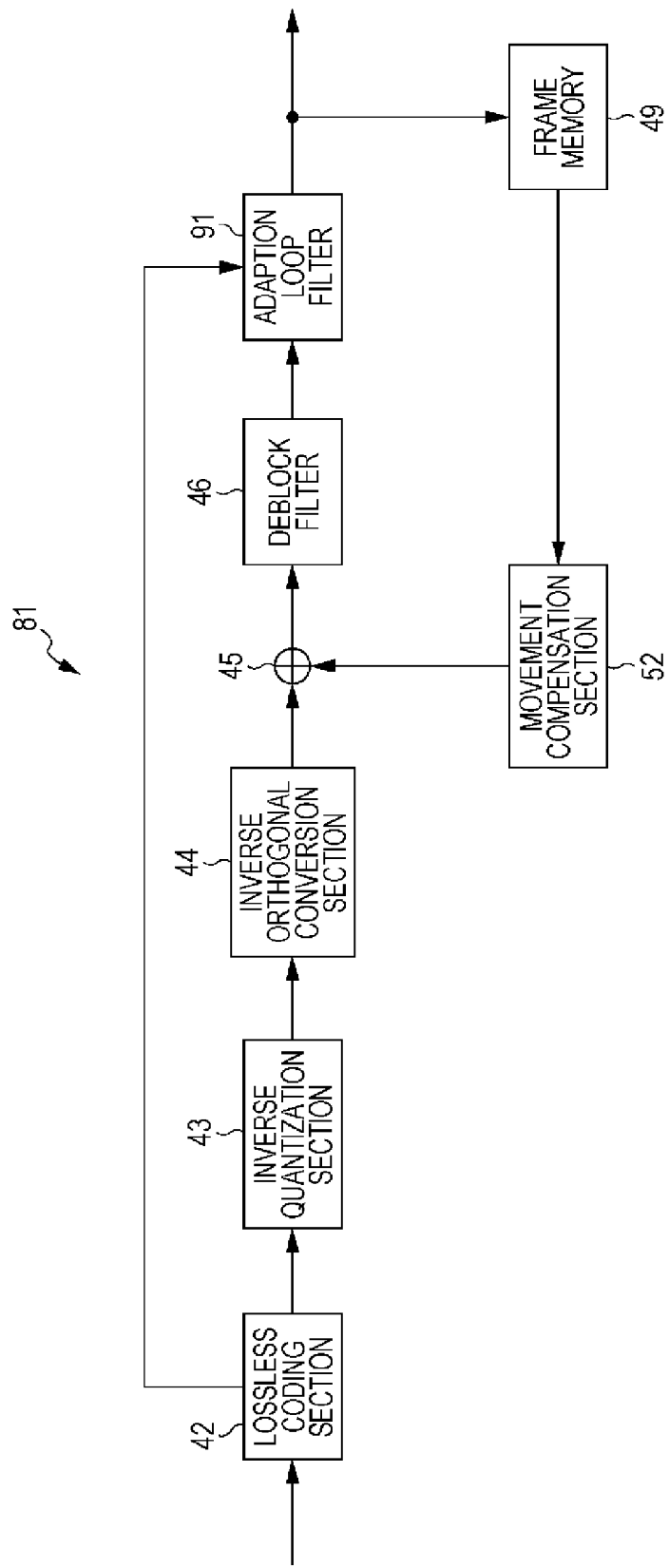
FIG. 4 is a block diagram illustrating an example of the main configuration of an image decoding device where an adaptive loop filter is applied.

FIG. 4 is a block diagram illustrating a configuration example of an image decoding device which corresponds to the image coding device of FIG. 3. Here, in the example of FIG. 4, for ease of description, the accumulation buffer 41, the image rearranging buffer 47, the D/A conversion section 48, the selection section 50, the intra prediction section 51, and the image selection section 53 of FIG. 2 are omitted. In addition, the arrows and the like are appropriately omitted. Accordingly, in the case of FIG. 4, the reference image from the frame memory 49 is directly input into the movement compensation section 52 and the prediction image from the movement compensation section 52 is directly output to the calculation section 45.

That is, an image decoding device 81 of FIG. 4 is different to the image coding device 31 of FIG. 2 only in the point where an adaptive loop filter 91 is added between the deblock filter 46 and the frame memory 49.

The adaptive loop filter coefficient which is decoded from the lossless decoding section 42 and is extracted from the header is supplied in the adaptive loop filter 91. The adaptive loop filter 91 performs a filter process on the decoding image from the deblock filter 46 using the adaptive loop filter coefficient which has been supplied. As the filter, for example, a Wiener Filter is used.

Due to this, it is possible to improve the image quality of the decoding image, and further, to improve the image quality of the reference signal.

<Deblock Filter>

Next, the deblock filter in the H.264/AVC filter will be described. The deblock filter 21 is included in a movement compensation loop and removes block distortion in the decoding image, that is, distortion in the region in processing units. Due to this, transferring of block distortion to the image which is referenced is suppressed using the movement compensation process.

As the process of the deblock filter, it is possible to select a method of (a) to (c) below using two parameters of a deblocking_filter_control_present_flag which is included in the Picture Parameter Set RBSP (Raw Byte Sequence Payload) and a disable_deblocking_filter_idc which is included in the slice header which are included in the coding data.

(a) Carry out on block boundary or macroblock boundary
(b) Carry out only on macroblock boundary
(c) Do not carry out With regard to a quantization parameter QP, QPY is used in a case where the process below is applied with regard to the brightness signal and QPC is used in a case where there is application with regard to the color difference signal. In addition, with regard to movement vector coding, intra prediction, entropy coding (CAVLC/CABAC), the pixel value which belongs to the different slices is processed as being "not available". However, in the deblock filter processing, a process is performed where even the pixel value which belongs to the difference slices is "available" in the case of belonging to the same picture.

Figure 5:
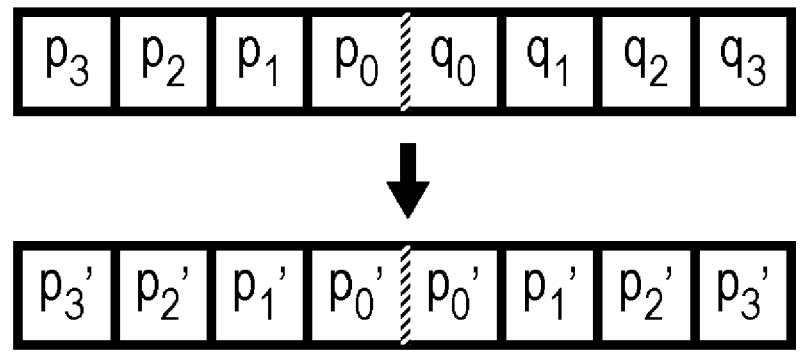
FIG. 5 is a diagram illustrating an operation principle of a deblock filter.

Below, as shown in FIG. 5, the pixel value before the deblock filter is set as p0 to p3 and q0 to q3 and the pixel value after the processing is set as p0' to p3' and q0' to q3'.

First, prior to the deblock filter process, Bs (Boundary Strength) which is block boundary strength data is defined with regard to p and q in FIG. 5 as shown in the table of FIG. 6.

As shown in FIG. 6, Bs is allocated as "4" which is the highest filter strength in a case where either of the pixel p or the pixel q belongs to a macroblock where intra coding has been carried out and the pixel is position on a boundary of the macroblock.

Bs is allocated as "3" which is the next highest filter strength to "4" in a case where either of the pixel p or the pixel q belongs to a macroblock where intra coding has been carried out and the pixel is not positioned on a boundary of the macroblock.

Bs is allocated as "2" which is the next highest filter strength to "3" in a case where both of the pixel p or the pixel q belong to a macroblock where intra coding has been carried out and any of the pixels have a transformation coefficient.

Bs is allocated as "1" in a case where neither of the pixel p or the pixel q belong to a macroblock where intra coding has been carried out, in a case where a condition is satisfied where either of the pixel have no transformation coefficient, and in case where a condition of any of the reference frames are different, the number of reference frames are different, or the movement vectors are different is satisfied.

Bs is allocated as "0" in a case where neither of the pixel p or the pixel q belong to a macroblock where intra coding has been carried out, neither of the pixel have a transformation coefficient, and the reference frames and the movement vectors are the same. Here, "0" has the meaning that the filter process is not performed.

The deblock filter process is carried out on (p2, p1, p0, q0, q1, q2) in FIG. 5 only in a case where the conditions which are express in equation (1) and equation (2) below are satisfied.

$$Bs>0 \qquad (1)$$

$$|p0-q0|<\alpha; |p1-p0|<\beta; |q0-q0|<\beta \qquad (2)$$

The values of alpha and beta in equation (2) are determined according to QP as below in default, but it is possible for the user to adjust the strength thereof in the manner of the arrows in the graph due to two parameters of the coding data of slice_alpha_c0_offset_div2 and slice_beta_offset_div2 which are included in the slice header.

Figure 7:
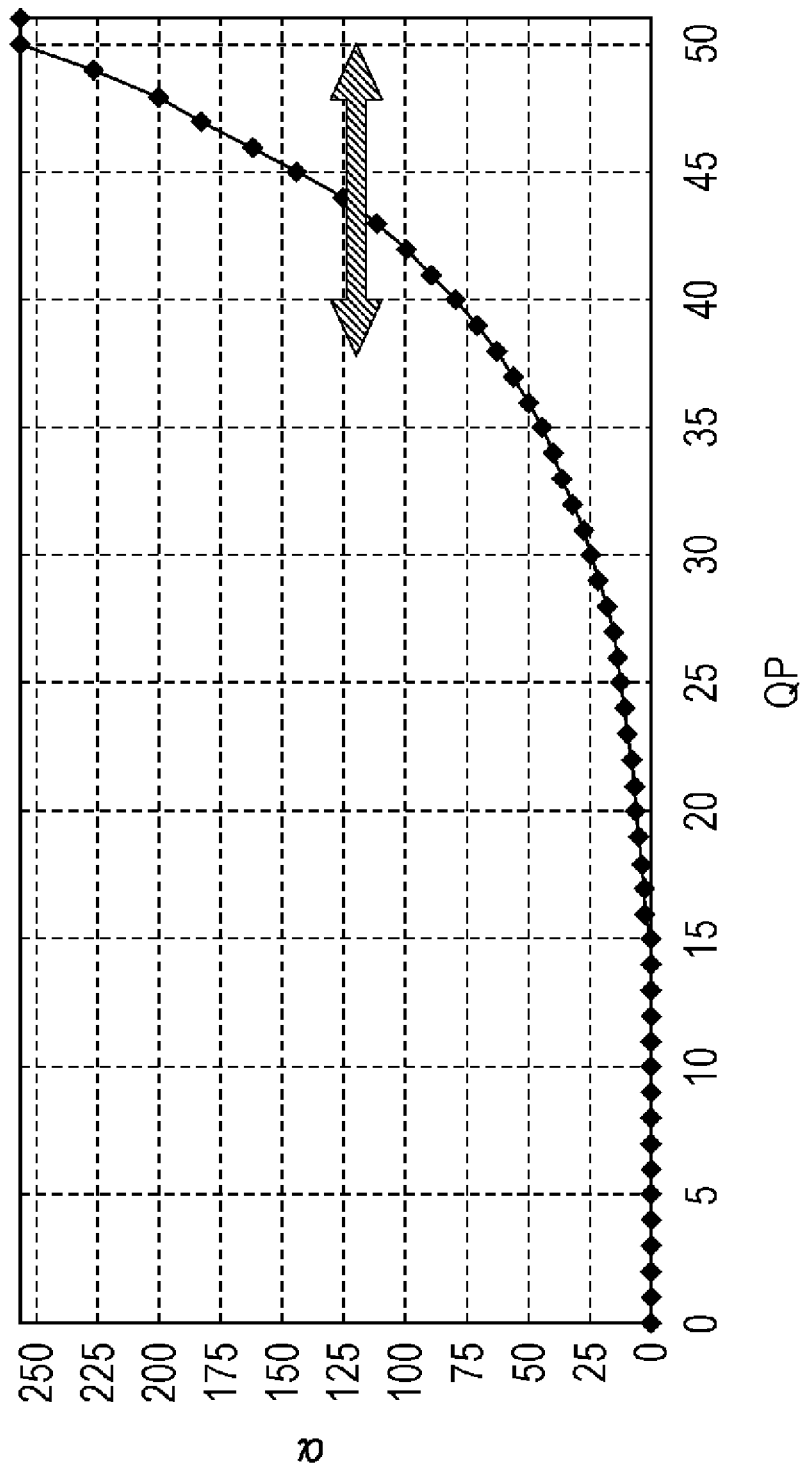
FIG. 7 is a diagram illustrating an operation principle of a deblock filter.

Here, FIG. 7 illustrates the relationship between QP and the threshold alpha, and it is clear that the filter strength is adjusted from the curve which expresses the relationship of QP and the threshold alpha being moved in the direction of the arrow when an offset amount is added to QP.

In addition, the threshold alpha is determined from the table which is shown in A of FIG. 8 by calculating index A from the following equations (3) and (4) using the respective quantization parameters $qP_p$ and $qP_q$ of the adjacent block P and block Q. In the same manner, the threshold b is determined from the table which is shown in B of FIG. 8 by calculating index B from the following equations (3) and (5) using the respective quantization parameters $qP_p$ and $qP_q$ of the adjacent block P and block Q. The index A and the index B are defined by equation (3) to equation (5) below.

$$qP_p=(qP_p+qP_q[\ ])>>1 \qquad (3)$$

$$\text{index } A=\text{Clip3}(0,51,qP_a+\text{FilterOffset}A) \qquad (4)$$

$$\text{index } B=\text{Clip3}(0,51,qP_a+\text{FilterOffset}B) \qquad (5)$$

In equation (4) and equation (5), the FilterOffsetA and the FilterOffsetB are equivalent to the adjustment amount due to the user.

The deblock filter process defines methods which are different to each other in a case where Bs<4 and in a case where Bs=4 as described below.

First, in a case where Bs<4, the pixel values p'0 and q'0 after the deblock filter process are determined as in equation (6) to equation (8) below.

$$\Delta=\text{Clip3}(-t_{c0},t_c(((q0-p0<<2)+(p1-q1)+4)>>3)) \qquad (6)$$

$$p'0=\text{Clip1}(p0+\Delta) \qquad (7)$$

$$q'0=\text{Clip1}(q0+\Delta) \qquad (8)$$

Here, $t_c$ is calculated as in equation (9) and equation (10) below. That is, $t_c$ is calculated as in equation (9) below in a case where the value of chromaEdgeFlag is "0".

$$t_c = t_{c0} + ((a_p < \beta)?1:0) + ((a_q < \beta)?1:0) \quad (9)$$

In addition, $t_c$ is calculated as in equation (10) below in a cases other than where the value of chromaEdgeFlag is "0".

$$t_c = t_{c0} + 1 \quad (10)$$

The value of $t_{c0}$ is defined as in the table which is shown in A of FIG. 9 and B of FIG. 9 according to the Bs and the index A.

In addition, the values of $a_p$ and $a_q$ of equation (9) are calculated as in equation (11) and equation (12) below.

$$a_p = |p2 - p0| \quad (11)$$

$$a_q = |q2 - q0| \quad (12)$$

The pixel value p'1 after the deblock process is determined as below. That is, p'1 is determined as in equation (13) below in a case where the value of chromaEdgeFlag is "0" and the value of $a_p$ is b or less.

$$p'1 = p1 + \text{Clip3}(-t_{c0}, t_{c0}, (p2 + ((p0+q0+1) >> 1) - (p1 << 1)) >> 1) \quad (13)$$

In addition, p'1 is determined as in equation (14) below in a case other than where the equation (13) is not established.

$$p'1 = p1 \quad (14)$$

The pixel value q'1 after the deblock process is determined as below. That is, q'1 is determined as in equation (15) below in a case where the value of chromaEdgeFlag is "0" and the value of $a_q$ is b or less.

$$q'1 = q1 + \text{Clip3}(-t_{c0}, t_{c0}, (q2 + ((p0+q0+1) >> 1) - (q1 << 1)) >> 1) \quad (15)$$

In addition, q'1 is determined as in equation (16) below in a case other than where the equation (15) is not established.

$$q'1 = q1 \quad (16)$$

The values of p'2 and q'2 do not change from the values of p2 and q2 before filtering. That is, p'2 is determined as equation (17) below and q'2 is determined as equation (18) below $$p'2 = p2 \quad (17)$$

$$q'2 = q2 \quad (18)$$

Next, the pixel value p'i (i=0 . . . 2) after the deblock filter is determined as below in the case of Bs=4. In the case where the value of chromaEdgeFlag is "0" and the conditions which are exhibited in equation (19) below are established, p'0, p'1, and p2 are determined as shown in equation (20) to equation (22) below.

$$ap < \beta \&\& |p0-q0| < ((\alpha >> 2)+2) \quad (19)$$

$$p'0 = (p2 + 2 \times p1 + 2 \times p0 + 2 \times q0 + q1 + 4) >> 3 \quad (20)$$

$$p'1 = (p2 + p1 + p0 + q0 + 2) >> 2 \quad (21)$$

$$p'2 = (2 \times p3 + 3 \times p2 + p1 + p0 + q0 + 4) >> 3 \quad (22)$$

In addition, in the case where the conditions which are exhibited in equation (19) below are not established, p'0, p'1, and p'2 are determined as shown in equation (23) to equation (25) below.

$$p'0 = (2 \times p1 + p0 + q1 + 2) >> 2 \quad (23)$$

$$p'1 = p1 \quad (24)$$

$$p'2 = p2 \quad (25)$$

Next, the pixel value q'i (i=0 . . . 2) after the deblock filter process is determined as below. That is, in the case where the value of chromaEdgeFlag is "0" and the conditions which are exhibited in equation (26) below are established, q'0, q'1, and q'2 are determined as shown in equation (27) to equation (29) below.

$$aq < \beta \&\& |p0-q0| < ((\alpha >> 2)+2) \quad (26)$$

$$q'0 = (p1 + 2 \times p0 + 2 \times q0 + 2 \times q1 + q2 + 4) >> 3 \quad (27)$$

$$q'1 = (p0 + q0 + q1 + q2 + 2) >> 2 \quad (28)$$

$$q'2 = (2 \times q3 + 3 \times q2 + q1 + q0 + p4 + 4) >> 3 \quad (29)$$

In addition, in the case where the conditions which are exhibited in equation (26) below are not established, q'0, q'1, and q'2 are determined as shown in equation (30) to equation (32) below.

$$q'0 = (2 \times q1 + q0 + p1 + 2) >> 2 \quad (30)$$

$$q'1 = q1 \quad (31)$$

$$q'2 = q2 \quad (32)$$

<Cost Function>

Here, in the AVC coding method, selection of the appropriate prediction mode is important in reaching higher coding efficiency.

As an example of the selection method, it is possible that there is a method which is disclosed in http://iphome.hhi.de/suchring/tml/index.htm and is executed using reference software of H.264/MPEG-4 AVC which is referred to as JM (Joint Model).

In JM, it is possible to select two types of mode determining methods of a High Complexity Mode and a Low Complexity Mode as will be described below. Both calculate a cost function value which relates each of the prediction modes and select the prediction mode where these are minimized as the optical mode with regard to the block to the macroblock.

The cost function in the High Complexity Mode is as in equation (33) below.

$$\text{Cost}(\text{Mode} \in \Omega) = D + \lambda * R \quad (33)$$

Here, omega is the overall set of a candidate mode for coding the block to the macroblock and D is a difference energy of the decoding image and the input image in a case of coding using the prediction mode. lambda is a Lagrange undetermined multiplier which is applied as a function of a quantization parameter. R is a total coding amount in the case of coding using the mode which includes the orthogonal transformation coefficient.

That is, in the performing of the High Complexity Mode, it is necessary to perform a temporary encode process once using all of the candidate modes in order to calculate the parameters D and R described above and a higher calculation amount is necessary.

The cost function of the Low Complexity Mode is as in equation (34) below.

$$\text{Cost}(\text{Mode} \in \Omega) = D + QP2\text{Quant}(QP) * \text{HeaderBit} \quad (34)$$

Here, D is different to the case of the High Complexity Mode and is the difference energy of the prediction image and the input image. QP2Quant (QP) is applied as the function of the quantization parameter QP, the HeaderBit is a coding amount which relates to information which belongs to the header such as movement vector and mode which does not include the orthogonal transformation coefficient.

That is, in the Low Complexity Mode, it is necessary to perform a prediction process in relation to each of the candidate modes, but it is not necessary to perform up until the coding process since up until the decoding image is not necessary. As a result, it is possible to realize a lower calculation amount than the High Complexity Mode.

<Coding Unit>

Next, a coding unit which is determined in the HEVC (High Efficiency Video Coding) coding method (referred to below as the HEVC method) which is described in NPL2 will be described.

Figure 10:
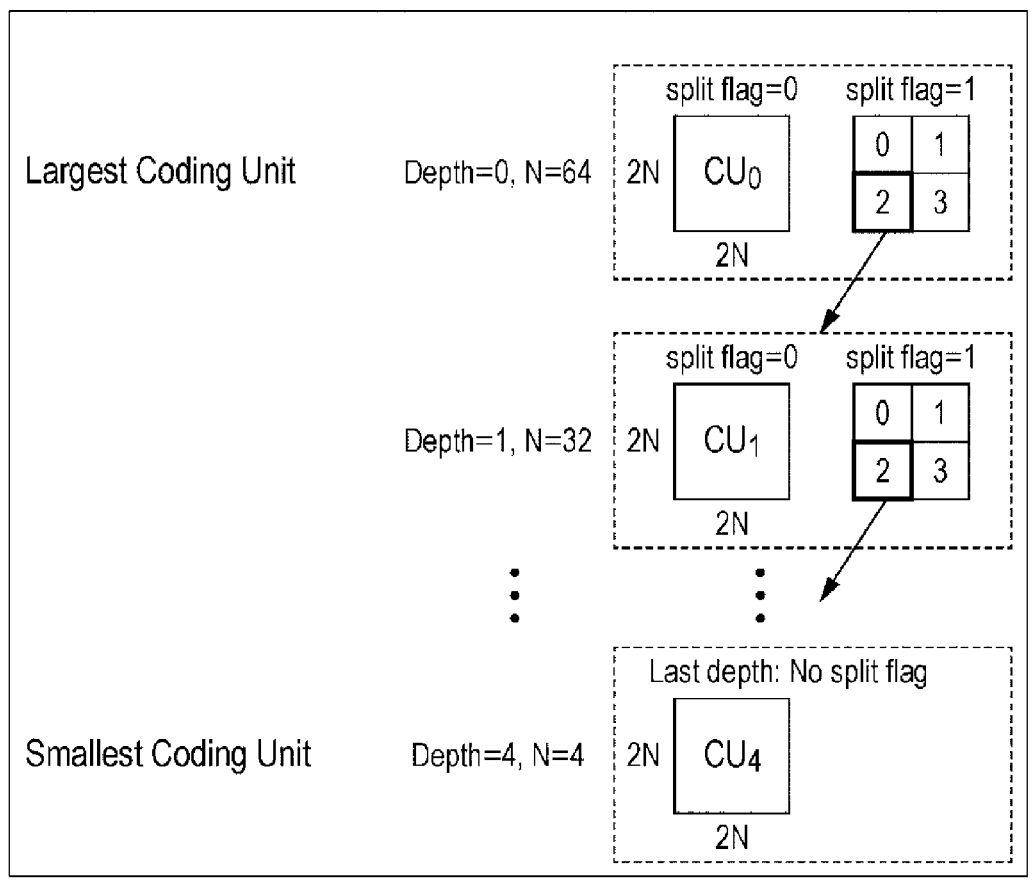
FIG. 10 is a diagram illustrating a configuration example of a coding unit.

In the H.264/AVC method, it is possible to divide one macroblock into a plurality of movement compensation blocks and to have movement information which is different with regard to each of these. That is, in the H.264/AVC method, a layered configuration is specified using macroblocks and sub-macroblocks, but for example, in the HEVC method, the coding unit (CU) is specified as shown in FIG. 10.

The CU is referred to as a coding tree block (CTB) and is a partial region of an image in a picture unit which fills the same role as the macroblock in the H.264/AVC method. While the latter is fixed with a size of a
16×16
pixel, the size of the former is not fixed and is specified in the image compression information in each of the sequences.

For example, in the sequence parameter set (SPS) which is included in the coding data as an output specifies the largest size of the CU (LCU (Largest Coding Unit)) and the smallest size of the CU (SCU (Smallest Coding Unit)).

In each of the LCUs, it is possible to divide into CUs with smaller sizes by setting split-flag=1 within the range of not being less than the size of the SCU. In the example of FIG. 10, the size of the LCU is 128 and the largest layering depth is five. A CU with a size of
2N×2N
is divided into CUs with a size of
N×N
which is one layer lower when the value of the split-flag is "1".

Furthermore, the CU is divided into prediction units (PU) which are regions which are processing units of intra or inter prediction (a partial region of the image in a picture unit), and in addition, is divided into transform units (TU) which are regions which are the processing units of orthogonal transformation (a partial region of the image in a picture unit). Currently, in the HEVC method, in addition to
4×4
and
8×8,
it is possible to use orthogonal transformation of
16×16
and
32×32.

As in the HEVC method below, in a case of a coding method where CU is defined and each type of processing is performed with the CU as the unit, it is possible to consider that the macroblocks in the H.264/AVC method are equivalent to the LCU. However, since the CU has a layered configuration as shown in FIG. 10, it is typical that the size of the LCU in the top layer is set to be larger than the macroblock of the H.264/AVC method such as, for example, 128×128 pixels.

The present disclosure is able to be applied to not only the coding method which uses macroblocks in the H.264/AVC method but also the coding method which uses the CU, the PU, the TU, or the like such as in the HEVC method. That is, since the region which is the block, the unit, or the processing unit is indicated, there is description using a term such as the region of the processing unit which is appropriately included in either below.

However, below, in the case where the H.264/AVC method is described as an example, there is description where block is used, but the block indicates the region which is the processing unit and is the unit in the HEVC method. On the contrary, in the case where the HEVC method is described as an example, there is description where unit is used, but the unit indicates the region which is the processing unit and is the block in the H.264/AVC method.

<HEVC Method Adaptive Offset Process>

Next, the adaptive offset filter in the HEVC method will be described. A sample adaptive offset method which is described in NPL3 is adopted in the HEVC method.

Figure 11:
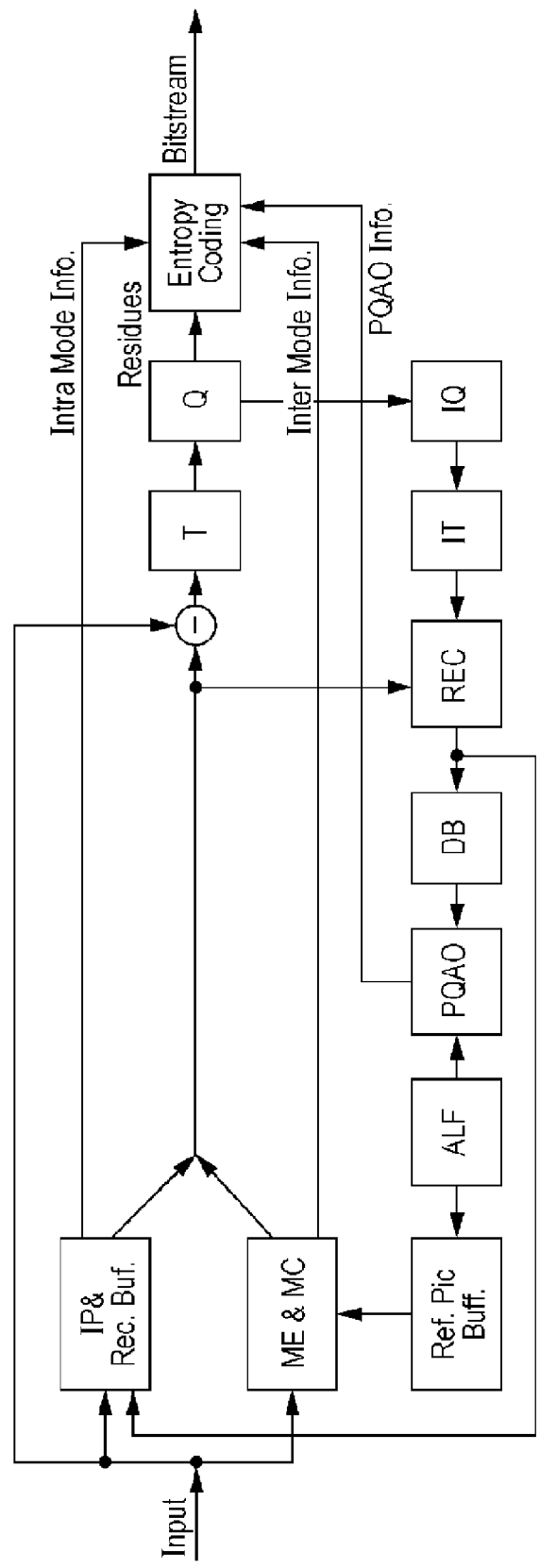
FIG. 11 is a diagram illustrating an adaptive offset process in a HEVC method.

The adaptive offset filter (Picture Quality Adaptive Offset: PQAO) is provided between the deblock filter (DB) and the adaptive loop filter (ALF) as shown in FIG. 11.

As the type of the adaptive offset, there are two types which are referred to as band offsets, six types which are referred to as edge offsets, and furthermore, it is possible that the offsets are not adapted. Then, it is possible to divide the image into a quad-tree and select whether to code using which of the types of adaptive offsets described above in each of the regions.

The selection information is coded using entropy coding as PQAO information, a bit stream is generated, and the bit stream which is generated is transmitted to the decoding side. It is possible to improve the coding efficiency by using the method.

Here, the quad-tree structure will be described with reference to FIG. 12.

Figure 12:
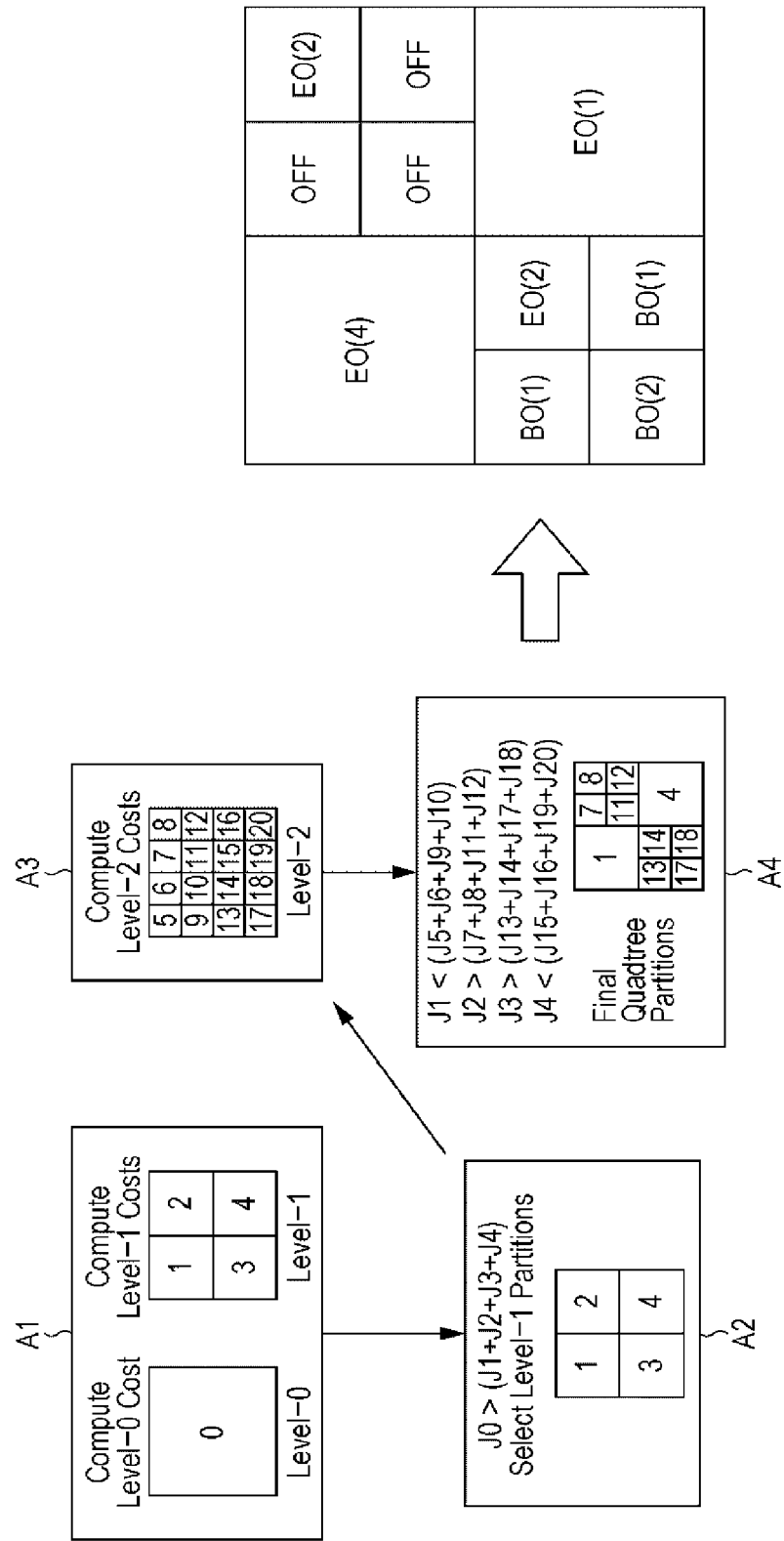
FIG. 12 is a diagram illustrating a quad-tree structure.

For example, in the coding side, a cost function value J0 of a level-0 (division depth 0), which indicates a state where a region 0 is not divided as shown in A1 of FIG. 12, is calculated. In addition, cost function values J1, J2, J3, and J4 of a level-1 (division depth 0), which indicates a state where the region 0 is divided into four regions 1 to 4, are calculated.

Then, as shown in A2, the cost function values are compared and the division region (partitions) of level-1 are selected due to J0>(J1+J2+J3+J4).

In the same manner, as shown in A3, cost function values J5 to J20 of a level-2 (division depth 2), which indicates a state where the region 0 is divided into 16 regions 5 to 20, are calculated.

Then, as shown in A4, the cost function values are compared and the division region (partitions) of level-1 are selected in region 1 due to J1<(J5+J6+J9+J10). The division region (partitions) of level-2 are selected in region 2 due to J2>(J7+J8+J11+J12). The division region (partitions) of level-2 are selected in region 3 due to J3>(J13+J14+J17+J18). The division region (partitions) of level-1 are selected in region 4 due to J4>(J15+J16+J19+J20).

As a result, the final Quad-tree regions (partitions) which are shown in A4 are determined in the Quad-tree structure. Then, the cost function values are calculated with regard to all of the two types of the band offsets, six types of the edge offsets, and no offsets for each region which is determined in the quad-tree structure and whether to code using which of the offsets is determined.

For example, in the example of FIG. 12, EO(4), that is, the fourth type out of the edge offsets is determined with regard to the region 1 as shown by the white arrow. OFF, that is, no offset is determined with regard to the region 7 and EO(2), that is, the second type out of the edge offsets are determined with regard to the region 8. OFF, that is, no offset is determined with regard to the regions 11 and 12.

In addition, BO(1), that is, the first type out of the band offsets is determined with regard to the region 13 and EO(2), that is, the second type out of the edge offsets is determined with regard to the region 14. BO(2), that is, the second type out of the band offsets is determined with regard to the region 17 and BO(1), that is, the first type out of the band offsets is determined with regard to the region 18 and EO(1), that is, the first type out of the edge offsets is determined with regard to the region 4. With regard to the fourth type, EO(1), that is, the first type out of the edge offsets is determined.

Next, the details of the band offsets will be described with reference to FIG. 13.

Figure 13:
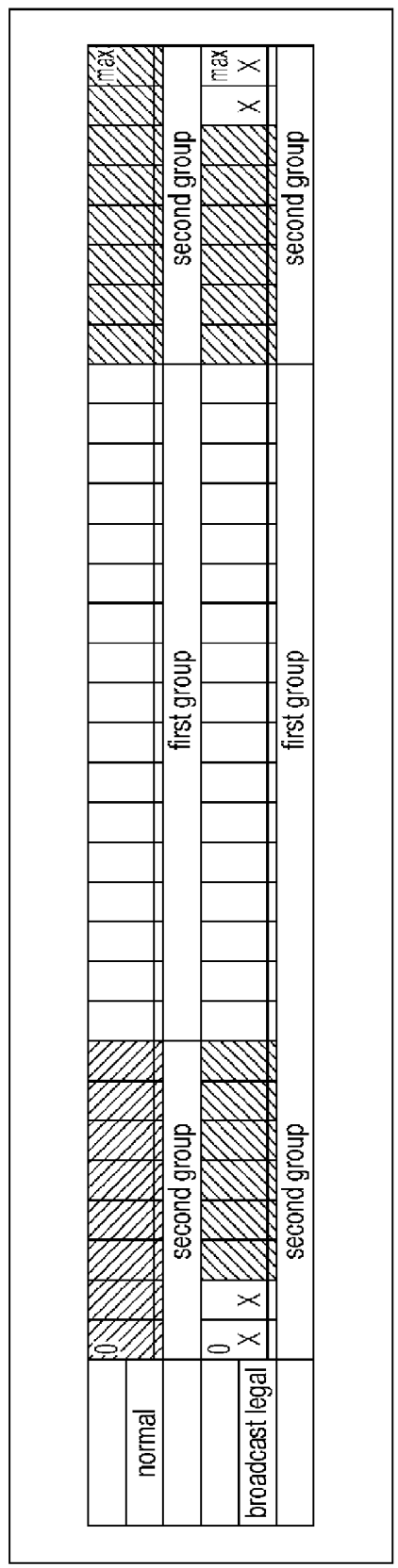
FIG. 13 is a diagram illustrating a band offset.

In the band offsets, in the example of FIG. 13, one scale represents one band=eight pixels, the brightness pixel value is divided into 32 bands, and each of the bands has an independent offset value.

That is, in the example of FIG. 13, the center of the 16 bands out of the 0 to 255 pixels (32 bands) is divided into a first group and each of the eight bands on both sides are divided into a second group.

Then, the offset of only one of either of the first group and the second group is coded and is sent to the decoding side. Typically, it is often the case that either black and white is clear defined or there is a slight tone in one region and it is rare that there are pixels in both of the first group and the second group. As a result, by only one offset being sent, increasing of the coding amount is suppressed by transferring the pixel value of a value which is not included in each of the Quad-tree regions.

Here, in a case where an input signal is due to broadcasting, the brightness signal is limited to the range of 16,235 and the color difference is limited to the range of 16,240. At this time, the offset value with regard to the two bands on each side, where broadcast legal which is shown in the lower level of FIG. 13 is applied and a × mark is shown, are not transferred.

Next, the detail of edge offsets will be described with reference to FIG. 14.

In the edge offsets, comparison of a certain pixel value and an adjacent pixel value which adjacent to the certain pixel value is performed and the offset value is transferred with regard to the categories which correspond thereto.

Figure 14:
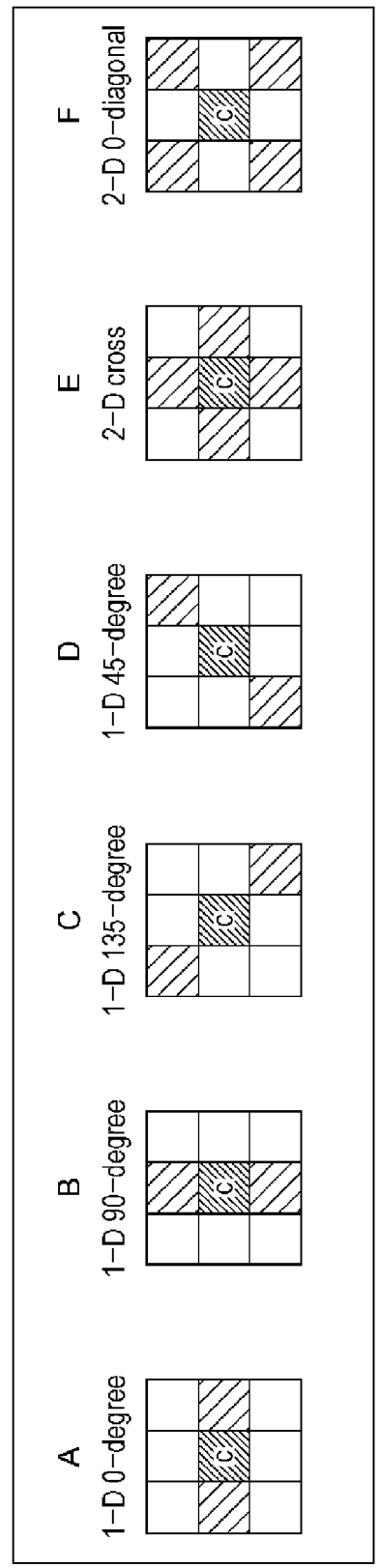
FIG. 14 is a diagram illustrating an edge offset.

In the edge offsets, there are four one-dimensional patterns which are shown in A of FIG. 14 to D of FIG. 14 and two two-dimensional patterns which are shown in E of FIG. 14 and F of FIG. 14, and offsets are transferred for each which are shown in FIG. 15.

In A of FIG. 14, adjacent pixels are disposed left and right in one dimension with regard to the pixel C. That is, a 1-D, 0-degree pattern is represented which is zero degrees with regard to the pattern in A of FIG. 14. In B of FIG. 14, adjacent pixels are disposed up and down in one dimension with regard to the pixel C. That is, a 1-D, 90-degree pattern is represented which is 90 degrees with regard to the pattern in A of FIG. 14.

In C of FIG. 14, adjacent pixels are disposed upper left and lower right in one dimension with regard to the pixel C. That is, a 1-D, 135-degree pattern is represented which is 135 degrees with regard to the pattern in A of FIG. 14. In D of FIG. 14, adjacent pixels are disposed upper right and lower left in one dimension with regard to the pixel C. That is, a 1-D, 135-degree pattern is represented which is 45 degrees with regard to the pattern in A of FIG. 14.

In E of FIG. 14, adjacent pixels are disposed up and down and left and right in two dimensions with regard to the pixel C. That is, a 2-D, cross pattern is represented which intersects with regard to the pixel C. In F of FIG. 14, adjacent pixels are disposed upper right and lower left and upper left and lower right in two dimensions with regard to the pixel C. That is, a 2-D, diagonal pattern is represented which intersects diagonally with regard to the pixel C.

In A of FIG. 15, a regulation list of the one-dimensional patterns (classification rule for 1-D patterns) is shown. The patterns of A of FIG. 14 to D of FIG. 14 are classified into five types of categories such as that shown in A of FIG. 15, the offset is calculated according to the categories, and sent to the decoding section.

There is classification into category 1 in a case where the pixel value of the pixel C is smaller than the pixel values of the two adjacent pixels. There is classification into category 2 in a case where the pixel value of the pixel C is smaller than one of the pixel values of the two adjacent pixels and matches the pixel value of the other adjacent pixel. There is classification into category 3 in a case where the pixel value of the pixel C is larger than one of the pixel values of the two adjacent pixels and matches the pixel value of the other adjacent pixel. There is classification into category 4 in a case where the pixel value of the pixel C is larger than the pixel values of the two adjacent pixels. There is classification into category 0 in cases of none of the above.

In B of FIG. 15, a regulation list of the two-dimensional patterns (classification rule for 2-D patterns) is shown. The patterns of E of FIG. 14 and F of FIG. 14 are classified into seven types of categories such as that shown in B of FIG. 15, the offset sent to the decoding section according to the categories.

There is classification into category 1 in a case where the pixel value of the pixel C is smaller than the pixel values of the four adjacent pixels. There is classification into category 2 in a case where the pixel value of the pixel C is smaller than the pixel values of three adjacent pixels and matches the pixel value of the fourth adjacent pixel. There is classification into category 3 in a case where the pixel value of the pixel C is smaller than the pixel values of three adjacent pixels and is larger the pixel value of the fourth adjacent pixel.

There is classification into category 4 in a case where the pixel value of the pixel C is larger than the pixel values of three adjacent pixels and is smaller than the pixel value of the fourth adjacent pixel. There is classification into category 5 in a case where the pixel value of the pixel C is larger than the pixel values of three adjacent pixels and matches the pixel value of the fourth adjacent pixel. There is classification into category 6 in a case where the pixel value of the pixel C is larger than the pixel values of the four adjacent pixels. There is classification into category 0 in cases of none of the above.

As described above, in the edge offset, since it is sufficient if one-dimensional patterns perform comparison with regard to two adjacent pixels, the amount of calculation is reduced. Here, in the high efficiency coding conditions, the value of the 1 bit offset is sent to the decoding side with high accuracy compared to the low delay coding conditions.

The adaptive offset process above is only performed with regard to the brightness signal in the HEVC method.

However, the carrying out of the adaptive offset process with regard to the color difference signal is linked to an increase in the amount of calculation. In addition, the resolution of the color difference signal is low compared to the brightness signal particularly in a case where the input is 4:2:0 and 4:2:2 and the performing of the same process as the brightness signal is redundant.

In consideration of the above, in the present embodiment, it is possible to improve the coding efficiency of the color difference signal by applying the adaptive offset filter also to the color difference signal.

Configuration Example of Image Coding Device

FIG. 16 represents an embodiment of an image coding device as an image processing device where the present disclosure is applied.

An image coding device 101 of FIG. 16 is the same as the image coding device 1 of FIG. 1 in the point where the A/D conversion section 11, the image rearrangement buffer 12, the calculation section 13, the orthogonal transformation section 14, the quantization section 15, the lossless coding section 16, the accumulation buffer 17, the inverse quantization section 18, the inverse orthogonal transformation section 19, and the calculation section 20 are provided. The image coding device 101 of FIG. 16 is the same as the image coding device 1 of FIG. 1 in the point where the deblock filter 21, the frame memory 22, the selection section 23, the intra prediction section 24, the movement prediction and compensation section 25, the prediction image selection section 26, and the rate control section 27 are provided.

In addition, the image coding device 101 of FIG. 16 is different to the image coding device 1 of FIG. 1 in the point where the adaptive loop filter 71 of FIG. 3 which is described above is added.

Furthermore, the image coding device 101 of FIG. 16 is different to the image coding device 1 of FIG. 1 in the point where an adaptive offset section 111 and a color different adaptive offset section 112 are added.

The image coding device 101 which is shown in FIG. 16 codes image data using a prediction method. Here, as the coding method, for example, a coding method of H.264 and MPEG (Moving Picture Experts Group) 4 Part 10 (AVC (Advanced Video Coding)) (referred to below as the H.264/AVC method), the HEVC (High Efficiency Video Coding) method, and the like are used.

That is, the adaptive offset section 111 and the color difference adaptive offset section 112 are provided after the deblock filter 21 and before the adaptive loop filter 71. That is, the adaptive offset section 111 and the color difference adaptive offset section 112 are provided in the movement compensation loop which is formed from the image rearrangement buffer 12, the calculation section 13, the orthogonal transformation section 14, the quantization section 15, the inverse quantization section 18, the inverse orthogonal transformation section 19, the calculation section 20, the deblock filter 21, the adaptive loop filter 71, the frame memory 22, the selection section 23, the intra prediction section 24, the movement prediction and compensation section 25, and the prediction image selection section 26. That is, the image is used by being looped in the movement compensation loop.

The adaptive offset section 111 performs an offset process with regard to the brightness signal of the decoding image from the deblock filter 21 (base band information after local decoding). That is, the adaptive offset section 111 determines the Quad-tree structure which was described with reference to FIG. 12. Specifically, the adaptive offset section 111 performs region division according to the quad-tree using the brightness signal and determines the type of offset from among the two types of band offset, six types of edge offset and no offset for each region which has been divided. In addition, the adaptive offset section 111 calculates the offset value with regard to the brightness signal for each region which has been divided by referencing the quad-tree structure.

The adaptive offset section 111 supplies the quad-tree structure which has been determined and an offset value with regard to the brightness signal which has been calculated (referred to below as the brightness offset value) to the lossless coding section 16 and the color difference adaptive offset section 112.

In addition, the adaptive offset section 111 performs an offset process with regard to the brightness signal of the decoding image from the deblock filter 21 using the quad-tree which has been determined and the brightness offset value. Then, the adaptive offset section 111 supplies the brightness signal after the offset process and the color difference signal where an offset process has been carried out by the color difference adaptive offset section 112 to the adaptive loop filter 71.

The color difference adaptive offset section 112 performs an offset process with regard to the color difference signal based on the quad-tree structure from the adaptive offset section 111. That is, the color difference adaptive offset section 112 calculates an offset value with regard to the color difference signal for each region which has been divided by referencing the quad-tree by the adaptive offset section 111. The color difference adaptive offset section 112 performs an offset process with regard to the color difference signal of the decoding image from the deblock filter 21 using the color difference offset value which has been determined. Then, the color difference adaptive offset section 112 supplies the color difference after the offset process to the adaptive offset section 111.

Furthermore, the color difference adaptive offset section 112 calculates the prediction residual of the color difference offset value using the offset value with regard to the color difference signal which has been determined (referred to below as the color difference offset value), the brightness offset value, and a correlation coefficient and supplies to the lossless coding section 16.

The adaptive loop filter 71 performs image quality improvement by performing a loop filter process using a Wiener Filter with regard to the decoding image which is offset by the adaptive offset section 111.

<Adaptive Offset Process of Present Disclosure>

The adaptive offset process which is performed using the adaptive offset section 111 and the color difference adaptive offset section 112 of FIG. 16 will be described with appropriate reference again to FIGS. 12 to 15.

First, in the image coding device 101, that there is correlation in the brightness signal and the color difference signal is utilized, the determination of the quad-tree structure which was described above with reference to FIG. 12 is performed for only the brightness signal and the region division in the quad-tree structure which is determined using the brightness signal is also applied to the color difference signal.

Due to this, since it is sufficient that the region division is not performed individually for the brightness signal and the color difference signal, it is possible to suppress the increase in the amount of calculation. Furthermore, since it is not necessary to transfer information which relates to the region division which is difference for the brightness and the color difference to the decoding side, the amount of coding of the image compression information does not increase.

Here, the type of the offset is determined based on the quad-tree structure of the brightness signal. Of course, the type of offset may be the same for the brightness signal and the color difference signal. In addition, for example, the division may be carried out according to only two types of the band offset and the edge offset in relation to the color difference signal. That is, in a case, the processing is performed in relation to the color difference signal with the quad-tree structure with the three types of band offset, edge offset and off (offsetting is not performed).

Furthermore, when the band offset is applied, the color difference signal sends an offset which has less than 32 bands with regard to the brightness signal which is shown in FIG. 13, for example, 16 bands, due to the resolution being lower than the brightness signal. Due to this, it is possible for the image quality to be improved due to the increase in the coding amount being suppressed.

In addition, 0 has the meaning that there is no component of the brightness signal, but 128 has the meaning that there is no component in relation to the color difference in the case of 8 bits. As a result, in FIG. 13, when the information which relates to the first group in the brightness signal is sent, the information which relates to the second group in the color difference signal is sent. On the contrary, when the information which relates to the second group in the brightness signal is sent, the information which relates to the first group in the color difference signal is sent. This may be the case.

Furthermore, the prediction residual which is expressed in the following equation (35) is sent to the decoding side along with the edge offset and the band offset and not the offset value $O_C$ with regard to the color difference signal.

$$O_C - (\alpha * O_L + \beta) \quad (35)$$

Here, $O_L$ is the offset value with regard to the brightness signal and alpha and beta are the correlation coefficients. alpha and beta may calculate each of the independent values of the two types of band offsets and the six types of edge offsets and may be transmitted to the decoding side. Alternatively, two types of the correlation coefficients alpha and beta may be calculated and may be sent with regard to the two types of band offset and the six types of edge offset. Furthermore, the correlation coefficients alpha and beta may be individually calculated and may be sent with regard to Cb and Cr.

Furthermore, in addition, there are 32 bands with the band offset with regard to the brightness signal, but with regard to the color difference signal, the prediction residual which is expressed in the following equation (36) may be sent to the decoding side if it is assumed that $O_L$ corresponds to $O_{L0}$ and $O_{L1}$ in the case where there is only 16 bands.

$$O_C - (\alpha * (O_{L0} + O_{L1} + 1)/2 + \beta) \quad (36)$$

Here, equation (35) and equation (36) use the same value for the brightness offset value as the color difference signal in the case where alpha=1 and beta=0. Furthermore, in the image coding device 101, the offset value (prediction residual) with regard to the color difference signal may be quantized.

In addition, as will be described next, there may be performing of the correspondence of categories using the brightness signal and the color difference signal. That is, for example, four brightness pixels are set to correspond to one color difference pixel in the case of 4:2:0, but in a case where all or three of the brightness pixels out of the four belong to the same category, the same category may be applied also to the color difference signal.

In a case where two of each of the brightness pixels belong to the same category, a flag is sent which represents information which relates to which of the categories is to be applied with regard to the color difference signal. In other cases, the category information even in relation to the color difference signal is sent as described above.

In this manner, it is possible to improve the coding efficiency in the color difference signal without increasing the amount of calculation by applying the adaptive offset also with regard to the color difference signal.

Figure 17:
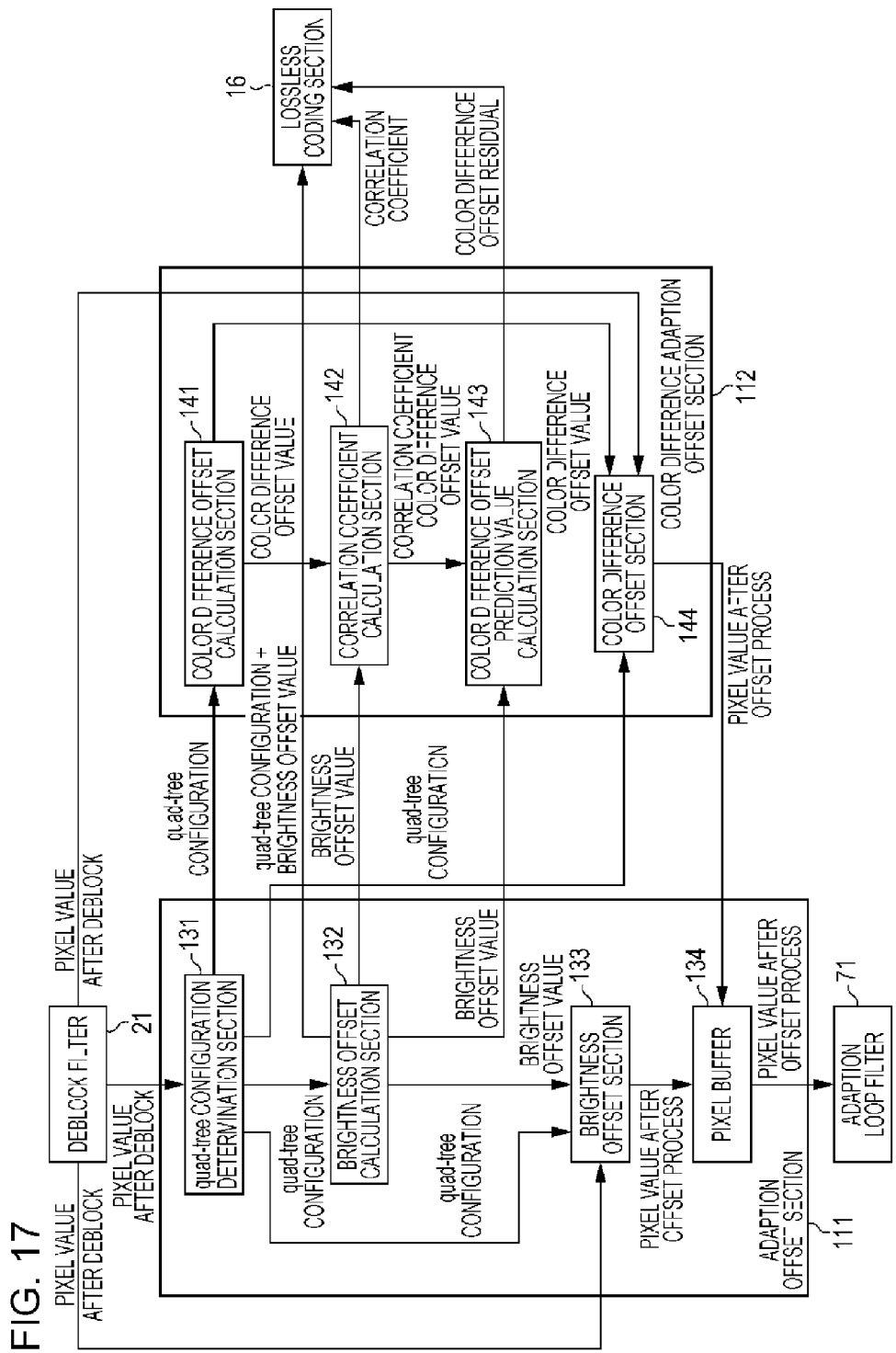
FIG. 17 is a diagram illustrating configuration examples of an adaptive offset section and a color difference adaptive offset section.

Configuration Example of Adaptive Offset Section and Color Difference Adaptive Offset Section Next, each section of the image coding device 101 will be described. FIG. 17 is a diagram illustrating configuration examples of the adaptive offset section 111 and the color difference adaptive offset section 112.

In the example of FIG. 17, the adaptive offset section 111 is configured to include a Quad-tree structure determining section 131, a brightness offset calculation section 132, a brightness offset section 133, and an image buffer 134.

The color difference adaptive offset section 112 is configured to include a color difference offset calculation section 141, a correlation coefficient calculation section 142, a color difference offset prediction value calculation section 143, and a color difference offset section 144.

The pixel value after the deblock from the deblock filter 21 is supplied to the Quad-tree structure determining section 131, the brightness offset section 133, and the color difference offset section 144.

The Quad-tree structure determining section 131 determines the Quad-tree structure which is described above with reference to FIG. 12 by referencing the pixel value of the brightness signal after the deblock. That is, the Quad-tree structure determining section 131 divides up the image into a quad-tree and determines which of the types of adaptive offsets described above to code with for each of the regions using the cost function value.

The Quad-tree structure determining section 131 supplies the Quad-tree structure which has been determined to the brightness offset calculation section 132, the brightness offset section 133, the color difference offset calculation section 141, and the color difference offset section 144.

The brightness offset calculation section 132 performs calculation of the brightness offset value with regard to each region which is divided into the Quad-tree in relation to the brightness signal. The brightness offset calculation section 132 supplies the information on the brightness offset which has been calculated to the brightness offset section 133, the correlation coefficient calculation section 142, and the color difference offset prediction value calculation section 143. In addition, the brightness offset calculation section 132 supplies the information on the brightness offset which has been calculated to the lossless coding section 16 along with the information on the Quad-tree structure.

The brightness offset section 133 performs an offset process with regard to the pixel value of the brightness signal after deblock. That is, the brightness offset section 133 adds the brightness offset value which is calculated using the brightness offset calculation section 132 with regard to the pixel value of the brightness in each region which is divided into the Quad-tree using the Quad-tree structure determining section 131. The brightness offset section 133 accumulates the pixel value after the offset process in the pixel buffer 134.

The pixel buffer 134 waits for both the pixel values of the brightness signal and the color difference signal after the offset process to match up and supplies the pixel values after the offset process which have matched up to the adaptive loop filter 71.

The color difference offset calculation section 141 and the color difference offset section 144 determine in advance the correspondence of the number of divisions, the number of bands, or the categories in a case of the color difference signal as described above with regard to the Quad-tree of the brightness signal. In consideration of this, the color difference offset calculation section 141 calculates the color difference offset value with regard to each region which is divided into the Quad-tree by the Quad-tree structure determining section 131 in relation to the color difference signal. The color difference offset calculation section 141 supplies the information on the color difference offset which has been calculated to the correlation coefficient calculation section 142 and the color difference offset section 144.

The correlation coefficient calculation section 142 calculates the correlation coefficients alpha and beta using the information on the brightness offset from the brightness offset calculation section 132 and the information on the color difference offset from the color difference offset calculation section 141. The correlation coefficient calculation section 142 supplies the values of the correlation coefficients alpha and beta which have been calculated and the information on the color difference offset to the color difference offset prediction value calculation section 143. In addition, the correlation coefficient calculation section 142 supplies the values of the correlation coefficients alpha and beta which have been calculated to the lossless coding section 16.

The color difference offset prediction value calculation section 143 calculates the prediction residual (referred to below as the color difference offset residual) using the brightness offset value from the brightness offset calculation section 132, the values of the correlation coefficients alpha and beta from the correlation coefficient calculation section 142, and the color difference offset value. At this time, for example, equation (35) and equation (36) which are described above are used. The color difference offset prediction value calculation section 143 supplies the color difference offset residual which has been calculated to the lossless coding section 16.

The color difference offset section 144 performs an offset process with regard to the pixel value of the color difference signal after deblock. That is, the color difference offset section 144 adds the color difference offset value which is calculated by the color difference offset calculation section 141 with regard to the pixel value of the color difference of each region which is divided into the Quad-tree by the Quad-tree structure determining section 131. The color difference offset section 144 accumulates the pixel value after the offset process in the pixel buffer 134.

<Flow of Coding Process>

Next, the flow of each process which is executed by the image coding device 101 as above will be described. First, an example of the flow of the coding process will be described with reference to the flowchart of FIG. 18.

In step S101, the A/D conversion section 11 carries out A/D conversion image data which is input. In step S102, the image rearrangement buffer 12 stores the images where A/D conversion has been carried out and performs rearranging from the order of displaying each picture to the coding order.

In a case where the image which is the processing target which is supplied from the image rearrangement buffer 12 is a block image where intra processing has been carried out, the reference image where decoding is complete is read out from the frame memory 22 and is supplied to the intra prediction section 24 via the selection section 23.

Based on the image, in step S103, the intra prediction section 24 carries out intra prediction using all of the intra prediction modes which are candidates on the block images which are the processing target. Here, as the reference image where decoding is complete, an image is used where filtering or offsetting using the deblock filter 21, the adaptive offset section 111, the color difference adaptive offset section 112, or the adaptive loop filter 71 has not been carried out.

Due to this process, the intra prediction is performing using all of the intra prediction modes which are candidates and the cost function value is calculated with regard to all of the intra prediction modes which are candidates. Then, based on the cost function values which are calculated, the optimal intra prediction mode is selected and the prediction image which is generated by the intra prediction of the optimal intra prediction mode and the cost function value thereof are supplied to the prediction image selection section 26.

In a case where the image of the processing target which is supplied from the image rearrangement buffer 12 is an image where inter prediction has been carried out, the reference image is read out from the frame memory 22 and is supplies to the movement prediction and compensation section 25 via the selection section 23. Based on the image, in step S104, the movement prediction and compensation section 25 performs the movement prediction and compensation process.

Due to this process, the movement prediction process is performing using all of the inter prediction modes which are candidates, the cost function value is calculated with regard to all of the inter prediction modes which are candidates, and the optimal inter prediction mode is selected based on the cost function value which is calculated. Then, the prediction image which is generated using the optimal inter prediction mode and the cost function value thereof are supplied to the prediction image selection section 26.

In step S105, the prediction image selection section 26 determines the optimal prediction mode from one of the optimal intra prediction mode and the optimal inter prediction mode based on each of the cost function values which are output by the intra prediction section 24 and the movement prediction and compensation section 25. Then, the prediction image selection section 26 selects the prediction image of the optimal prediction mode which has been determined and supplies to the calculation sections 13 and 20. The prediction image is used in the calculations in steps S106 and S111 which will be described later.

Here, the selection information of the prediction image is supplied to the intra prediction section 24 or the movement prediction and compensation section 25. In a case where the prediction image of the optimal intra prediction mode is selected, the intra prediction section 24 supplies the information which indicates the optimal intra prediction mode (that is, the intra prediction mode information) to the lossless coding section 16.

In a case where the prediction image of the optimal inter prediction mode is selected, the movement prediction and compensation section 25 outputs the information which indicates the optimal inter prediction mode, and further, as necessary, information according to the optical inter prediction mode to the lossless coding section 16. There is the movement vector information, the reference frame information, and the like as the information according to the optimal inter prediction mode.

In step S106, the calculation section 13 calculates the difference between the images which are rearranged in step S102 and the prediction image which is selected in step S105. The prediction image is supplied from the movement prediction and compensation section 25 in the case of carrying out inter prediction and from the intra prediction section 24 in the case of carrying out intra prediction to the calculation section 13 each via the prediction image selection section 26.

The amount of data of the residual data is smaller compared to the original image data. Accordingly, it is possible to compress the amount of data compared to a case where the image is coded as it is.

In step S107, the orthogonal transformation section 14 carries out orthogonal transformation on the difference information which is supplied from the calculation section 13. Specifically, an orthogonal transformation such as a discrete cosine transformation, a Karhunen Loeve transformation, or the like is performed and the transformation coefficient is output.

In step S108, the quantization section 15 quantizes the transformation coefficient. During quantization, the rate is control as is described in the process of step S118 which will be described later.

The difference information which is quantized as above is locally decoded as follows. That is, in step S109, the inverse quantization section 18 carries out inverse quantization on the transformation coefficient which is quantized by the quantization section 15 with the characteristics according to the characteristics of the quantization section 15. In step S110, the inverse orthogonal transformation section 19 carries out inverse orthogonal transformation on the transformation coefficient where inverse quantization has been carried out by the inverse quantization section 18 with the characteristics according to the characteristics of the orthogonal transformation section 14.

In step S111, the calculation section 20 adds the prediction image which is input via the prediction image selection section 26 to the difference information which has been locally decoded and generates an image (an image which corresponds to the input to the calculation section 13) which is locally decoded (that is, which is locally decoded).

In step S112, the deblock filter 21 performs a deblock filter process with regard to the image which is output by the calculation section 20. Due to this, block distortion is removed. The decoding image from the deblock filter 21 is output to the adaptive offset section 111.

In step S113, the adaptive offset section 111 and the color difference adaptive offset section 112 perform the adaptive offset process. The details of the adaptive offset process will be described later with reference to FIG. 19. Due to this process, on the basis of the brightness signal, the quad-tree structure is determined and offset values are each calculated with regard to the brightness and the color difference of the region which is divided up into the quad-tree which has been determined. Then, the offset process is carried out with regard to the brightness and the color difference of the region which is divided up into the quad-tree which has been determined. The pixel value after the offset is supplied to the adaptive loop filter 71.

In addition, the correlation coefficients are determined and the color difference offset residual is determined using the brightness offset value and the color difference offset value. The color difference offset residual which has been determined is supplied to the lossless coding section 16 along with the information on the quad-tree structure and the brightness offset. In addition, the correlation coefficients are also supplied to the lossless coding section 16.

In step S114, the adaptive loop filter 71 performs the adaptive loop filter process with regard to the pixel value after the offset process using the adaptive filter coefficient. The pixel value after the adaptive filter process is output to the frame memory 22.

In step S115, the frame memory 22 stores the image where filtering has been carried out. Here, in the frame memory 22, an image is used where filtering or offsetting using the deblock filter 21, the adaptive offset section 111, the color difference adaptive offset section 112, or the adaptive loop filter 71 has not been carried out is supplied from the calculation section 20 and stored.

On the other hand, the transformation coefficient which is quantized in step S108 which is described above is also supplied to the lossless coding section 16. In step s116, the lossless coding section 16 codes the transformation coefficient which has been quantized and output by the quantization section 15. That is, the difference image is subjected to lossless coding such as variable-length coding or arithmetic coding and compressed.

In addition, at this time, the optimal intra prediction mode information from the intra prediction section 24, the information according to the optimal inter prediction mode from the movement prediction and compensation section 25, or the like which is input to the lossless coding section 16 in step S105 described above is coded and added to the header information. Furthermore, the information on the quad-tree structure, the brightness offset, and the color difference offset residual which are input to the lossless coding section 16 in step S113 described above is also coded and added to the header information. Here, the correlation coefficients are added to the slice header or the LCU (Largest Coding Unit) header.

For example, the information which indicates the inter prediction mode is coded for each of the macroblocks. The movement vector information and the reference frame information are coded for each block which is a target.

In step S117, the accumulation buffer 17 accumulates the difference image as the compression image. The compression image which is accumulated in the accumulation buffer 17 is appropriately output and is transferred to the decoding side via a transfer path.

In step S118, the rate control section 27 controls the rate of the quantization operation of the quantization section 15 so that overflow or underflow is not generated based on the compression image which is accumulated in the accumulation buffer 17.

When the process of step S118 is complete, the coding process is complete.

<Flow of Adaptive Offset Process>

Next, an example of the flow of the adaptive offset process which is executed in step S113 of FIG. 18 will be described with reference to the flowchart of FIG. 19.

The pixel value after deblock from the deblock filter 21 is supplied to the Quad-tree structure determining section 131, the brightness offset section 133, and the color difference offset section 144.

In step S131, the Quad-tree structure determining section 131 determines the Quad-tree structure which is described above with reference to FIG. 12 by referencing the pixel value of the brightness signal after the deblock. That is, by the image being divided up into a quad-tree and which of the types of adaptive offsets described above to code with being determined for each of the regions using the cost function value, the Quad-tree structure is determined. The Quad-tree structure which has been determined is supplied to the brightness offset calculation section 132, the brightness offset section 133, the color difference offset calculation section 141, and the color difference offset section 144.

In step S132, the brightness offset calculation section 132 performs calculation of the brightness offset value with regard to each region which is divided into the Quad-tree with regard to the brightness signal. The information on the brightness offset which has been calculated is supplied to the brightness offset section 133, the correlation coefficient calculation section 142, and the color difference offset prediction value calculation section 143.

On the other hand, in step S133, the color difference offset calculation section 141 performs calculation of the color difference offset value with regard to each region which is divided into the Quad-tree by the Quad-tree structure determining section 131 in relation to the color difference signal. The information on the color difference offset which has been calculated is supplied to the correlation coefficient calculation section 142 and the color difference offset section 144.

In step S134, the correlation coefficient calculation section 142 calculates the correlation coefficients alpha and beta using the information on the brightness offset from the brightness offset calculation section 132 and the information on the color difference offset from the color difference offset calculation section 141. The values of the correlation coefficients alpha and beta which have been calculated and the information on the color difference offset are supplied to the color difference offset prediction value calculation section 143.

In step S135, the color difference offset prediction value calculation section 143 calculates the color difference offset residual as the prediction residual using equation (35) and equation (36). In the calculation of the color difference offset residual, the brightness offset value from the brightness offset calculation section 132, the values of the correlation coefficients alpha and beta from the correlation coefficient calculation section 142, and the color difference offset value are used.

In step S136, the adaptive offset section 111 and the color difference adaptive offset section 112 send the Quad-tree structure, the brightness offset value, the correlation coefficients alpha and beta, and the color difference offset residual which are adaptive offset parameters to the lossless coding section 16. That is, the brightness offset calculation 132 supplies the information on the brightness offset which has been calculated to the lossless coding section 16 along with the information on the Quad-tree structure. The correlation coefficient calculation section 142 supplies the values of the correlation coefficients alpha and beta which have been calculated to the lossless coding section 16. The color difference offset prediction value calculation section 143 supplies the color difference offset residual which has been calculated to the lossless coding section 16. Here, the color difference offset residual may be quantized by the quantization section 15.

Figure 18:
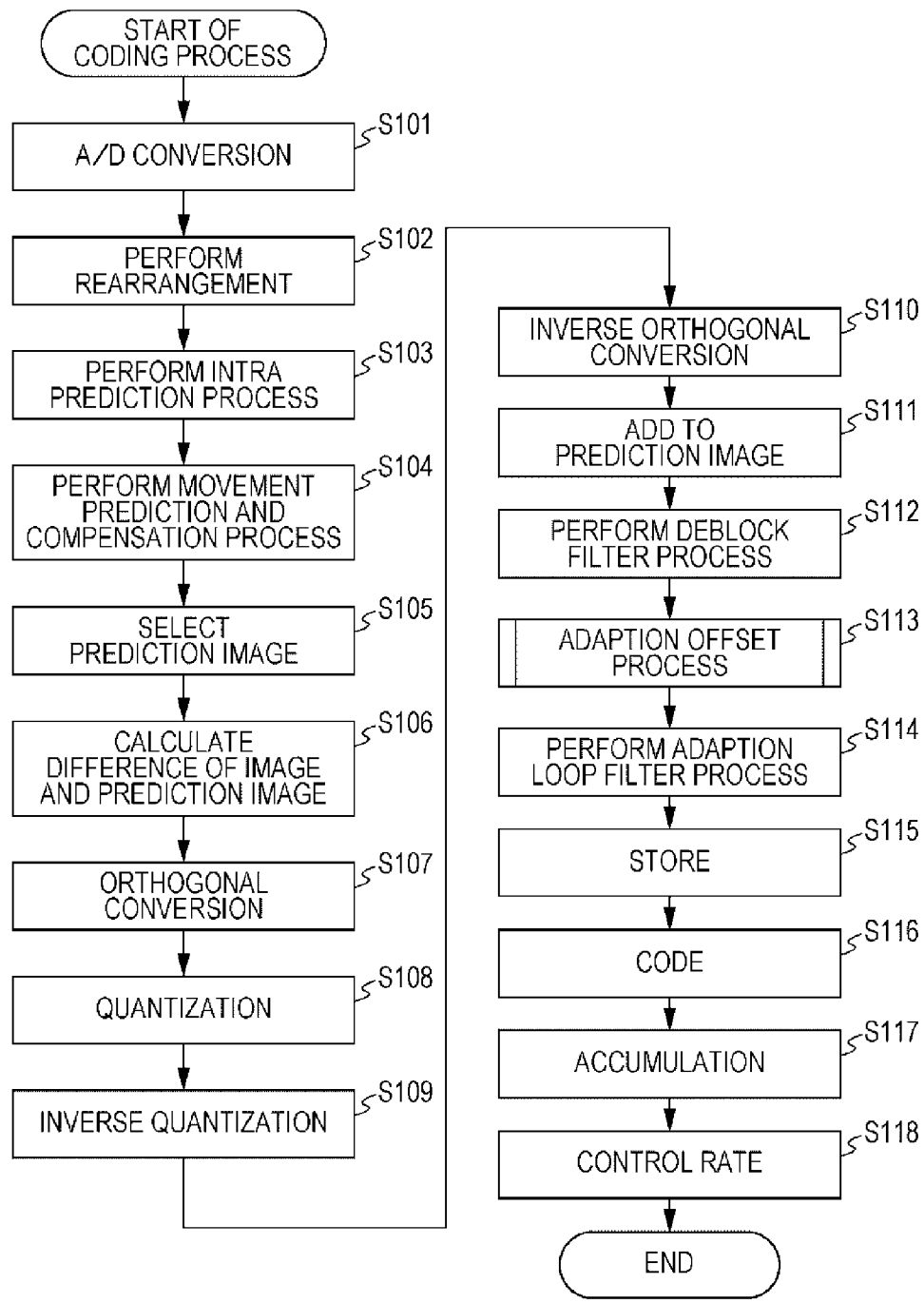
FIG. 18 is a flowchart illustrating an example of a flow of a coding process.
Figure 19:
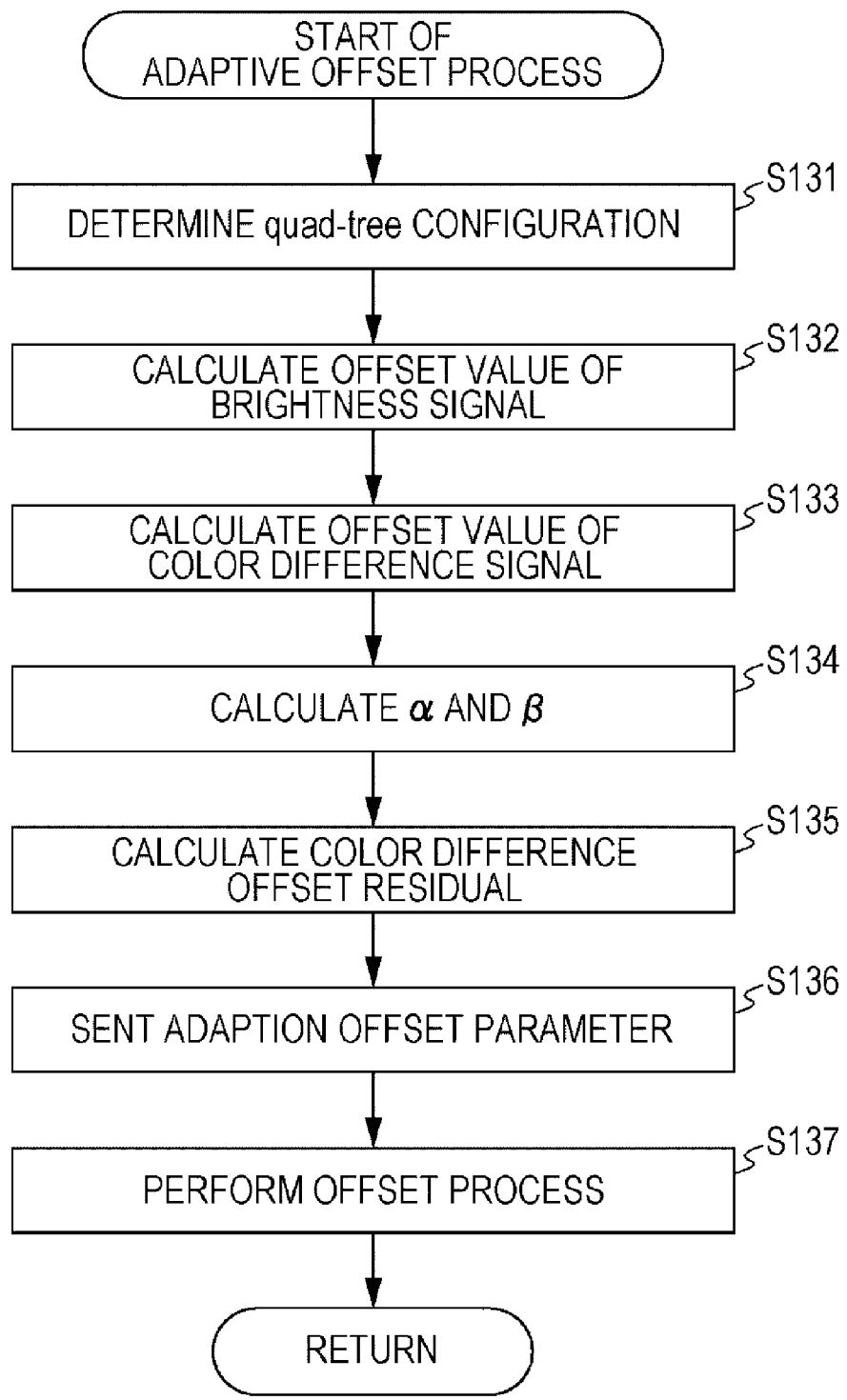
FIG. 19 is a flowchart illustrating an example of a flow of an adaptive offset process.

The adaptive offset parameters are coded by the lossless coding section 16 in step S116 of FIG. 18 described above and is added to the header information.

In step S137, the brightness offset section 133 and the color difference offset section 144 each perform offset processes with regard to the pixels values of the brightness and the color difference after deblock. That is, the brightness offset section 133 adds the offset value which is calculated using the brightness offset calculation section 132 with regard to the pixel value of the brightness for each region which is divided into the Quad-tree by the Quad-tree structure determining section 131. The color difference offset section 144 adds the offset value which is calculated using the color difference offset calculation section 141 with regard to the pixel value of the color difference for each region which is divided into the Quad-tree by the Quad-tree structure determining section 131.

The pixel value after the offset process is accumulated in the pixel buffer 134 and the brightness and the color difference are supplied to the adaptive loop filter 71 when matching up.

As above, since the offset process is carried out with regard to the color difference signal based on the Quad-tree structure which is determined based on the brightness signal, it is possible to improve the coding efficiency while suppressing an increase in the amount of calculation.

In addition, since, with regard to the color difference signal, the residual of the color difference offset which is calculated using the offset value of the brightness signal and the correlation coefficients is sent to the decoding side, it is possible to improve the coding efficiency.

2. Second Embodiment

<Image Decoding Device>

Figure 20:
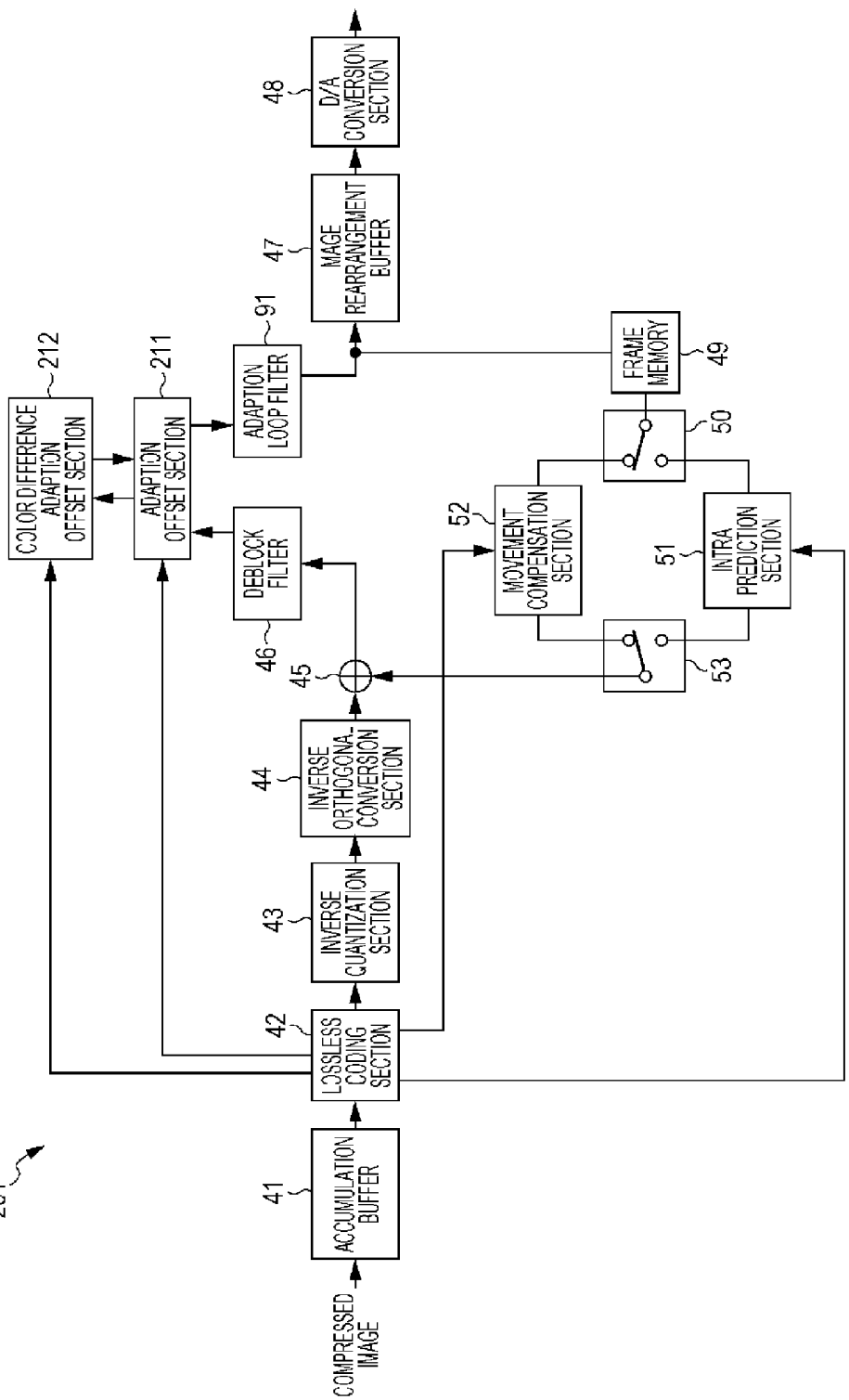
FIG. 20 is a block diagram illustrating an example of the main configuration of an image decoding device.

FIG. 20 represents an embodiment of an image decoding device as an image processing device where the present disclosure is applied. An image decoding device 201 which is shown in FIG. 20 is a decoding device which corresponds to the image coding device 101 of FIG. 16.

The decoding data which is decoded using the image coding device 101 is transferred to the image decoding device 201 which corresponds to the image coding device 101 via a predetermined transmission path and is decoded.

The image decoding device 201 of FIG. 20 is the same as the image decoding device 31 of FIG. 2 in the point where the accumulation buffer 41, the lossless decoding section 42, the inverse quantization section 43, the inverse orthogonal transformation section 44, and the calculation section 45 are provided. The image decoding device 201 of FIG. 20 is the same as the image decoding device 31 of FIG. 2 in the point where the deblock filter 46, the image rearranging buffer 47, the D/A conversion section 48, the frame memory 49, the selection section 50, the intra prediction section 51, the movement compensation section 52, and the image selection section 53 are provided.

In addition, the image decoding device 201 of FIG. 20 is different to the image decoding device 31 of FIG. 2 in the point where the adaptive loop filter 91 of FIG. 4 which is described above is added.

Furthermore, the image decoding device 201 of FIG. 20 is different to the image decoding device 31 of FIG. 2 in the point where an adaptive offset section 211 and a color different adaptive offset section 212 are added.

That is, the lossless decoding section 42 decodes the information which is coded by the lossless coding section 16 of FIG. 16 which is supplies by the accumulation buffer 41 using a method which corresponds to the coding method of the lossless coding section 16 in the same manner as the lossless decoding section 42 of FIG. 2. At this time, in the example of FIG. 20, the movement vector information, the reference frame information, the prediction mode information (the information which indicates the intra prediction mode or the inter prediction mode), the adaptive offset parameters, and the like are decoded. The adaptive offset parameters are configured by the Quad-tree structure, the brightness offset value, the correlation coefficients alpha and beta, the color difference offset residual, and the like which are coded by the lossless coding section 16 of FIG. 16 as described above.

Here, since the correlation coefficients alpha and beta are attached to the slice header or the LCU (Largest Coding Unit) header, the correlation coefficients alpha and beta are obtained therefrom. In addition, in a case where the color difference offset residual is quantized, the color difference offset residual is supplied to the color difference adaptive offset section 212 after inverse quantization is carried out by the inverse quantization section 43.

The adaptive offset section 211 and the color different adaptive offset section 212 are provided after the deblock filter 46 and before the adaptive loop filter 91. That is, the adaptive offset section 211 and the color difference adaptive offset section 212 are provided in the movement compensation loop which is formed from the calculation section 45, the deblock filter 46, the adaptive loop filter 91, the frame memory 49, the selection section 50, the movement compensation section 52, and the image selection section 53. That is, That is, the image is used by being looped in the movement compensation loop.

The Quad-tree structure and the brightness offset out of the adaptive offset parameters from the lossless decoding section 42 are supplied in the adaptive offset section 211. The adaptive offset section 211 performs the offset function with regard to the pixel value of the brightness signal of the decoding image from the deblock filter 46 using this information and this information is supplied to the color difference adaptive offset section 212.

In addition, the adaptive offset section 211 supplies the brightness signal after the offset process and the color difference signal where the offset process has been carried out by the color different adaptive offset section 212 to the adaptive loop filter 91.

The correlation coefficients alpha and beta and the color difference offset residual out of the adaptive offset parameters are supplied in the color different adaptive offset section 212. The color different adaptive offset section 212 performs the offset function with regard to the pixel value of the color difference signal of the decoding image from the deblock filter 46 based on the Quad-tree structure from the adaptive offset section 211. That is, the color difference adaptive offset section 212 reconfigures the color difference offset using the correlation coefficients alpha and beta and the color difference offset residual from the lossless decoding section 42 and the Quad-tree structure and the brightness offset value from the adaptive offset section 211. The color different adaptive offset section 212 performs an offset process with regard to the pixel value of the color difference signal of the decoding image from the deblock filter 46 using the Quad-tree structure from the adaptive offset section 211 and the color difference offset value which has been reconfigured.

The adaptive loop filter 91 performs a filter process on the decoding image from the deblock filter 46 using the adaptive filter coefficient which is supplied from the lossless decoding section 42. As the filter, for example, a Wiener Filter is used.

Figure 21:
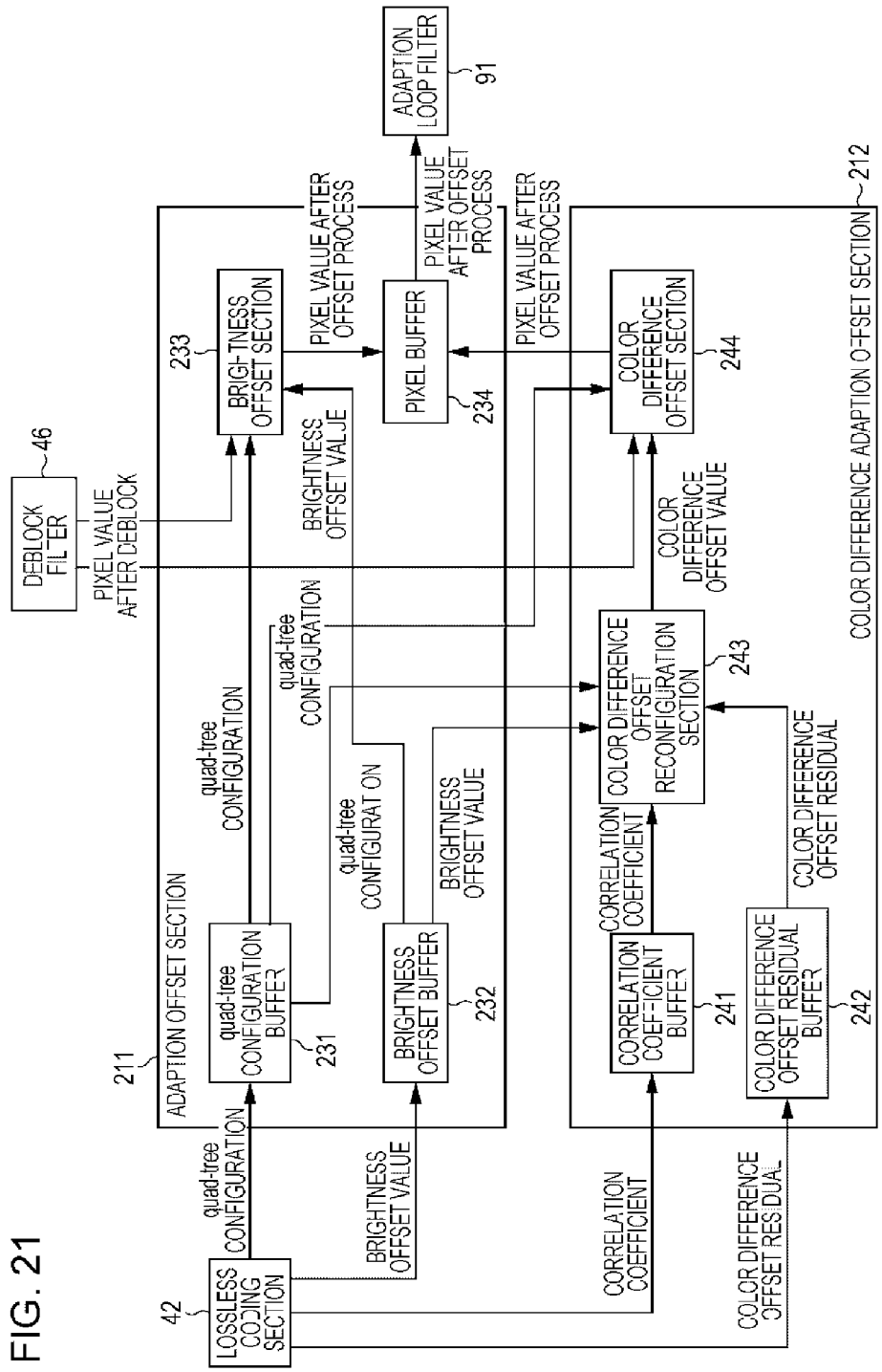
FIG. 21 is a block diagram illustrating configuration examples of an adaptive offset section and a color difference adaptive offset section.

Configuration Example of Adaptive Offset Section and Color Difference Adaptive Offset Section Next, each section of the image decoding device 201 will be described. FIG. 21 is a block diagram illustrating configuration examples of the adaptive offset section 211 and the color difference adaptive offset section 212.

In the example of FIG. 21, the adaptive offset section 211 is configuration so as to include a Quad-tree structure buffer 231, a brightness offset buffer 232, a brightness offset section 233, and the pixel buffer 234.

The color difference adaptive offset section 212 is configured so as to include a correlation coefficient buffer 241, a color difference offset residual buffer 242, a color difference offset reconfiguration section 243, and a color difference offset section 244.

The pixel value after the deblock from the deblock filter 46 is supplied to the brightness offset section 233 and the color difference offset section 244.

The information of the Quad-tree structure from the lossless decoding section 42 is supplied to the Quad-tree structure buffer 231. The Quad-tree structure buffer 231 accumulates the information on the Quad-tree structure from the lossless decoding section 42 and the information on the Quad-tree structure is supplied to the brightness offset section 233, the color difference offset reconfiguration section 243, and the color difference offset section 244.

The information on the brightness offset from the lossless decoding section 42 is supplied to the brightness offset buffer 232. The brightness offset buffer 232 accumulates the brightness offset from the lossless decoding section 42 and the information on the brightness offset is supplied to the brightness offset section 233 and the color difference offset reconfiguration section 243.

The brightness offset section 233 performs an offset process with regard to the pixel value of the brightness signal after the deblock. That is, the brightness offset section 233 adds the brightness offset from the brightness offset buffer 232 with regard to the pixel value of the brightness of each region which is divided into the Quad-tree by the Quad-tree structure buffer 231. The brightness offset section 233 accumulates the pixel value after the offset process in the pixel buffer 234.

The pixel buffer 234 waits for both the pixel values of the brightness signal and the color difference signal after the offset process to match up and supplies the pixel values after the offset process which have matched up to the adaptive loop filter 91.

The correlation coefficients alpha and beta from the lossless decoding section 42 is supplied to the correlation coefficient buffer 241. The correlation coefficient buffer 241 accumulates the correlation coefficients alpha and beta from the lossless decoding section 42 and the correlation coefficients alpha and beta which are accumulated are supplied to the color difference offset reconfiguration section 243.

The color difference offset residual from the lossless decoding section 42 is supplied to the color difference offset residual buffer 242. The color difference offset residual buffer 242 accumulates the color difference offset residual from the losses decoding section 42 and the color difference offset residual which has been accumulated is supplied to the color difference offset reconfiguration section 243.

In the color difference offset reconfiguration section 243, the Quad-tree structure from the Quad-tree structure buffer 231, the brightness offset from the brightness offset buffer 232, the correlation coefficients from the correlation coefficient buffer 241, and the color difference offset residual from the color difference offset residual buffer 242 are input. The color difference offset reconfiguration section 243 reconfigures the color difference offset using this information which is input and the information on the color difference offset which has been reconfigured is supplied to the color difference offset section 244.

In the color difference offset section 244, the correspondence of the number of divisions, the number of bands, or the categories in a case of the color difference signal as described above is determined in advance with regard to the Quad-tree of the brightness signal in the same manner as the color difference offset calculation section 141 and the color difference offset section 144 of FIG. 17. In consideration of this, the color difference offset section 244 performs an offset process with regard to the pixel value of the color difference signal after the deblock. That is, the color difference offset section 244 adds the color difference offset value which has been reconfigured using the color difference offset reconfiguration section 243 with regard to the pixel value of the brightness of each region which is divided into the Quad-tree by the Quad-tree structure buffer 231. The color difference offset section 244 accumulates the pixel value after the offset process in the pixel buffer 234.

<Flow of Decoding Process>

Next, the flow of each process which is executed by the image coding device 201 as above will be described. First, an example of the flow of the decoding process will be described with reference to the flowchart of FIG. 22.

When the decoding process starts, in step S201, the accumulation buffer 41 accumulates the coding data which has been transferred. In step S202, the lossless decoding section 42 decodes the coding data which is supplied from the accumulation buffer 41. That is, an I picture, a P picture, and a B picture which are coded using the lossless coding section 16 of FIG. 16 are decoding.

At this time, the movement vector information, the reference frame information, the prediction mode information (intra prediction mode and the inter prediction mode), and the information of the adaptive offset parameter is decoded.

In a case where the prediction mode information is intra prediction mode information, the prediction mode information is supplied to the intra prediction section 51. In a case where the prediction mode information is inter prediction mode information, the prediction mode information is supplied to the movement compensation section 52. In addition, the Quad-tree structure and the brightness offset out of the adaptive offset parameters are supplied to the adaptive offset section 211. The correlation coefficients alpha and beta and the color difference offset residual out of the adaptive offset parameters are supplied to the color difference adaptive offset section 212.

In step S203, the intra prediction section 51 or the movement compensation 52 respectively perform a prediction image generation process so as to correspond to the prediction mode information which is supplied from the lossless decoding section 42.

That is, in a case where the intra prediction mode information is supplied from the lossless decoding section 42, the intra prediction section 51 performs generation of a most probable mode and generates an intra prediction image of the intra prediction mode using parallel processing. In a case where the inter prediction mode information is supplied from the lossless decoding section 42, the movement compensation section 52 performs generation of the movement prediction and compensation process of the inter prediction mode and generates an inter prediction image.

Due to the process, the prediction image which is generated by the intra prediction section 51 (intra prediction image) or the prediction image which is generated by the movement compensation section 52 (inter prediction image) is supplies to the image selection section 53.

In step S204, the image selection section 53 selects the prediction image. That is, the prediction image which is generated by the intra prediction section 51 or the prediction image which is generated by the movement compensation section 52 is supplied. Accordingly, the prediction image which is supplied is selected, supplied to the calculation section 45, and added to the output of the inverse orthogonal transformation section 44 in step S206 which will be described later.

In step S202 which is described above, the transformation coefficient which is decoded by the lossless decoding section 42 is also supplied to the inverse quantization section 43. In step S205, the inverse quantization section 43 carries out inverse quantization on the transformation coefficient which has been decoded by the lossless decoding section 42 with the characteristics which correspond to the characteristics of the quantization section 15 of FIG. 16.

In step S206, the inverse orthogonal section 44 carries out inverse orthogonal transformation on the transformation coefficient where inverse quantization has been carried out by the inverse quantization section 43 with the characteristics which correspond to the characteristics of the orthogonal transformation section 14 of FIG. 16. Due to this, the difference information which corresponds to the input of the orthogonal transformation section 14 (output of the calculation section 13) of FIG. 16 is decoded.

In step S207, the calculation section 45 adds the prediction image which is selected in the process of step S204 described above and is input via the image selection section 53 to the difference information. Due to this, the original image is decided. In step S208, the deblock filter 46 perform a deblock filter process with regard to the image which is output by the calculation section 45. Due to this, block distortion is removed.

In step S209, the adaptive offset section 211 and the color different adaptive offset section 212 perform an adaptive offset process. The details of the adaptive offset process will be described later with reference to FIG. 23. Due to this process, an offset process is carried out on the brightness signal after the deblock using the quad-tree structure and the information on the brightness offset from the lossless decoding section 42.

In addition, the color difference offset value is reconfigured using the quad-tree structure, the brightness offset value, the correlation coefficients, and the color difference offset residual from the lossless decoding section 42. Then, an offset value is carried out on the color difference signal after the deblock using the quad-tree structure and the color difference offset value. The pixel value after the offset is supplied to the adaptive loop filter 91.

In step S210, the adaptive loop filter 91 performs an adaptive loop filter process with regard to the pixel value after the offset value using the adaptive filter coefficient. The pixel value after the adaptive filter process is output to the image rearrangement buffer 47 and the frame memory 49.

In step S211, the frame memory 49 stores the image where adaptive filtering has been performed.

In step S212, the image rearrangement buffer 47 performs rearranging of the image after the adaptive loop filter 91. That is, the order of the frames which are rearranged for coding by the image rearrangement buffer 12 of the image coding device 101 is rearranged to the original display order.

In step S213, the D/A conversion section 48 carries out D/A conversion on the images which are supplied from the image rearrangement buffer 47. The image is outputs to the display which is not shown and the image is displayed.

When the process of step S213 is complete, the decoding process is complete.

<Flow of Adaptive Offset Process>

Figure 22:
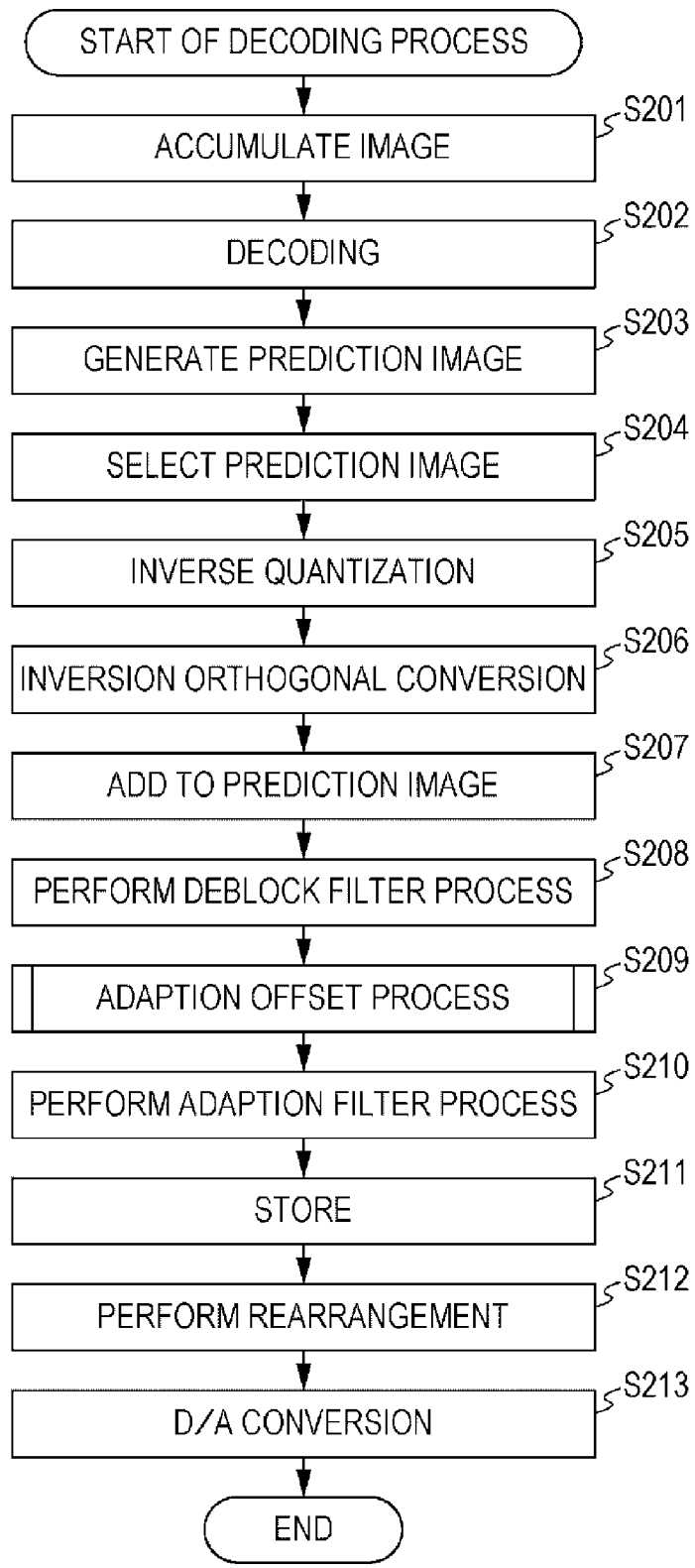
FIG. 22 is a flowchart illustrating an example of a flow of a decoding process.
Figure 23:
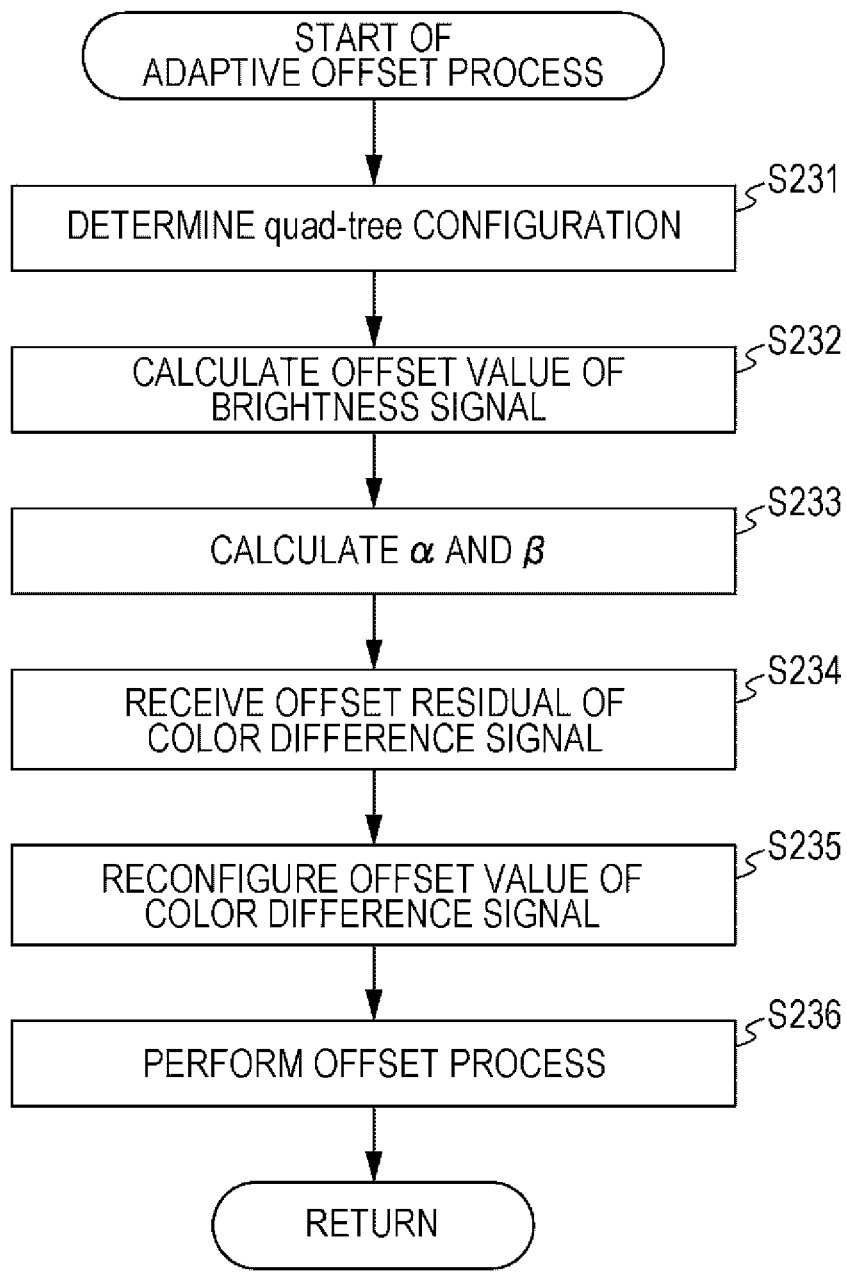
FIG. 23 is a flowchart illustrating an example of a flow of an adaptive offset process.

Next, an example of the flow of the adaptive offset process which is executed in step S209 of FIG. 22 will be described with reference to the flowchart of FIG. 23.

The information on the Quad-tree structure from the lossless decoding section 42 is supplied to the Quad-tree structure buffer 231. In step S231, the Quad-tree structure buffer 231 receives the Quad-tree structure from the lossless decoding section 42 and accumulates. After this, the Quad-tree structure buffer 231 supplies the information on the Quad-tree structure to the brightness offset section 233.

The information on the brightness offset from the lossless decoding section 42 is supplied to the brightness offset buffer 232. In step S232, the brightness offset buffer 232 receives the information on the offset (brightness offset) with regard to the brightness signal from the lossless decoding section 42 and accumulates. Then, the brightness offset buffer 232 supplies the information on the brightness offset to the brightness offset section 233 and the color difference offset reconfiguration section 243 at a predetermined timing.

The correlation coefficients alpha and beta from the lossless decoding section 42 are supplied to the correlation coefficient buffer 241. In step S233, the correlation coefficient buffer 241 receives the correlation coefficients alpha and beta from the lossless decoding section 42 and accumulates. The correlation coefficient buffer 241 supplies the correlation coefficients alpha and beta which have been accumulated to the color difference offset reconfiguration section 243 at a predetermined timing.

The color difference offset residual from the lossless decoding section 42 is supplied to the color difference offset residual buffer 242. In step S234, the color difference offset residual buffer 242 receives the offset residual with regard to the color difference signal from the lossless decoding section 42 (color difference offset residual) and accumulates. Then, the color difference offset residual buffer 242 supplies the color difference offset residual which have been accumulated to the color difference offset reconfiguration section 243 at a predetermined timing.

In the color difference offset reconfiguration section 243, the Quad-tree structure from the Quad-tree structure buffer 231, the brightness offset from the brightness offset buffer 232, the correlation coefficients from the correlation coefficient buffer 241, and the color difference offset residual from the color difference offset residual buffer 242 are input. In step S235, the color difference offset reconfiguration section 243 reconfigures the offset value (color difference offset) using this information which is input and the information on the color difference offset which has been reconfigured is supplied to the color difference offset section 244.

In S236, the brightness offset section 233 and the color difference offset section 244 perform an offset process with regard to the color difference signal after the deblock. That is, that is, the brightness offset section 233 adds the brightness offset from the brightness offset buffer 232 with regard to the pixel value of the brightness of each region which is divided into the Quad-tree by the Quad-tree structure buffer 231. The brightness offset section 233 accumulates the pixel value after the offset process in the pixel buffer 234.

In addition, the color difference offset section 244 adds the color difference offset which is reconfigured by the color difference offset reconfiguration section 243 with regard to the pixel value of the color difference of each region which is divided into the Quad-tree by the Quad-tree structure buffer 231. The color difference offset section 144 accumulates the pixel value after the offset process in the pixel buffer 234.

After that, the pixel buffer 234 waits for both the pixel values of the brightness signal and the color difference signal after the offset process to match up, supplies the pixel values after the offset process which have matched up to the adaptive loop filter 91, and the adaptive offset process is complete.

As above, since the offset process is carried out with regard to the color difference signal based on the Quad-tree structure which is determined based on the brightness signal, it is possible to improve the coding efficiency while suppressing an increase in the amount of calculation.

In addition, since, with regard to the color difference signal, the residual of the color difference offset which is calculated using the offset value of the brightness signal and the correlation coefficients is sent to the decoding side, it is possible to improve the coding efficiency.

As above, as the coding method, the H.264/AVC method is used as a base, but the present disclosure is not limited to this and it is possible to adopt another coding method and decoding method which includes a movement prediction and compensation loop.

Here, for example, the present disclosure is able to be applied to an image coding device and an image decoding device which are used when receiving image information (bit stream) which is compressed according to an orthogonal transformation such as a discrete cosine transformation and movement compensation via satellite broadcasting, cable television, the Internet, or a network medium such as a mobile phone unit in the same manner as MPEG, H.26x, and the like. In addition, the present disclosure is able to be applied to an image coding device and an image decoding device which are used when processing on a recording medium such as an optical or magnetic disc or a flash memory. Furthermore, the present disclosure is able to be applied to a movement prediction and compensation device which includes an image coding device and an image decoding device.

3. Third Embodiment

<Personal Computer>

Here, the series of processes which are described above are able to be executed using hardware or are able to be executed using software. In a case where the series of processes which are described above are executed using software, a process which configures the software is installed to a computer. Here, in the computer, a computer where specialized hardware is built in, a general personal computer which is able to execute the various processes by various programs being installed, or the like.

Figure 24:
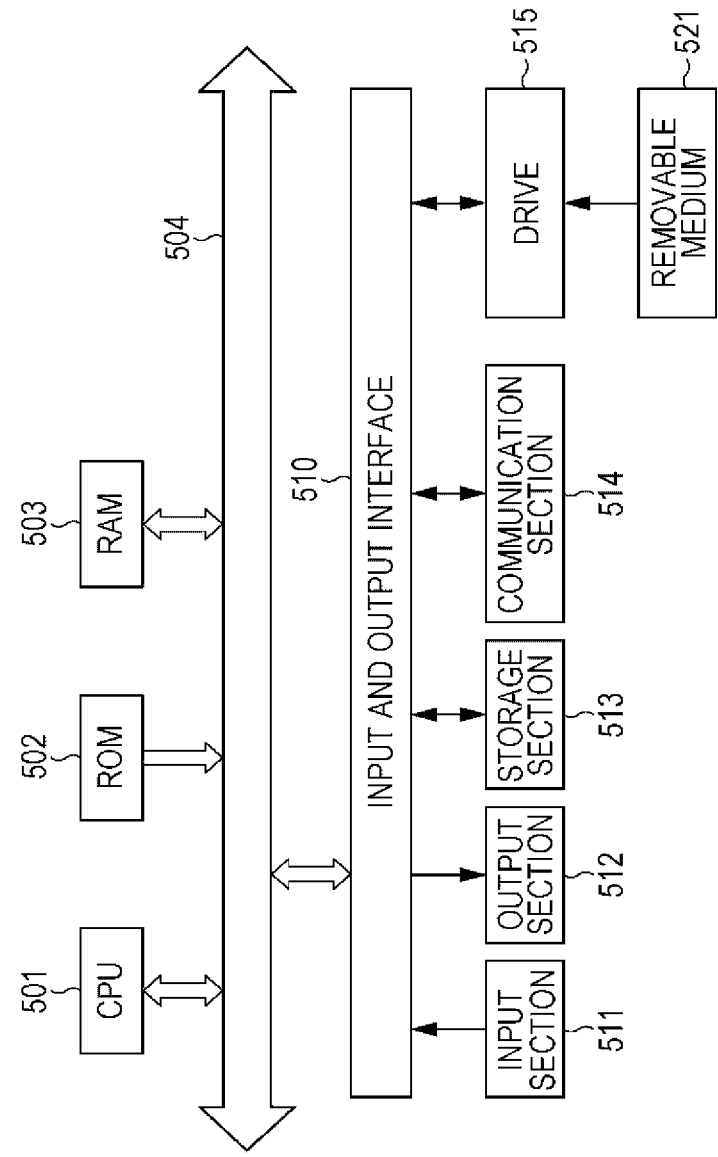
FIG. 24 is a block diagram illustrating an example of the main configuration of a personal computer.

In FIG. 24, a CPU (Central Processing Unit) 501 of a personal computer 500 executes various processes in accordance with a program which is stored in a ROM (Read Only Memory) 502 or a program which is loaded to a RAM (Random Access Memory) 503 from a storage section 513. In the RAM 503, in addition, necessary data and the like is appropriately stored for the CPU 501 to execute the various processes.

The CPU 501, the ROM 502, and the RAM 503 are connected to each other via a bus 504. An input/output interface 510 is also connected to the bus 504.

An input section 511 which is formed from a keyboard, a mouse, or the like, an output device 512 which is formed from a display formed by a CRT (Cathode Ray Tube), a LCD (Liquid Crystal Display), or the like, a speaker, or the like, the storage section 513 which is configured from a hard disk or the like, and a communication section 514 which is configured from a modem or the like are connected in the input/output interface 510. The communication section 514 performs a communication process via the network which includes the Internet.

In addition, a drive 515 is connected to the input and output interface 510 as necessary, a removable medium 521 such as a magnetic disc, an optical disc, a magneto optical disc, a semiconductor memory, or the like is appropriately mounted, and a computer program which is read out therefrom is installed into the storage section 513 as necessary.

In a case where the series of processes described above are executed using software, the program which configures the software is installed from a network or a recoding medium.

Here, the recording medium is configured from not only the removable medium 521 which is formed from a magnetic disc (which includes a flexible disc), an optical disc (which includes a CD-ROM (Compact Disc-Read Only Memory) or a DVD (Digital Versatile Disk), a magneto optical disc (which includes a MD (Mini-Disk)), a semiconductor memory, or the like where the program is recorded which is distributed separately to the device body for delivery of the program to the user as shown in FIG. 24, but also includes a configuration of a hard disk or the like which includes the ROM 502 or the storage section 513 which recorded the program which are distributed to the user in a state of being embedded in the device body in advance.

Here the program which is executed by the computer may be a program where the processes are in a time series in line with the order which is described in the specifications or may be a program where the processes are performed in parallel or at a necessary timing such as when a request is performed.

Here, in the specifications, the steps which are described in the programs which are recorded on the recording medium may be processes which are performed in a time series manner in line with the order described above but may not necessarily be processes in a time series manner and include processes where the processing is performed in parallel or executed individually.

In addition, in the specifications, the system represents a device body which is configured using a plurality of devices (devices).

In addition, above, the configuration which is described as one device (or processing section) may be divided up and configured as a plurality of devices (or processing sections). On the contrary, the configuration which is described as a plurality of devices (or processing sections) may be grouped together and configured as one device (or processing section). In addition, configurations other than the configurations of each of the devices (or processing sections) described above may be added. Furthermore, if the configuration or actions as an entire system are the same, a portion of the configuration of a certain device (or processing section) may be included in the configuration of another device (or processing section). That is, the present technology is not limited to the embodiments described above but various modifications are possible within the range which does not depart from the scope of the present technology.

The image coding device and the image decoding device according to the embodiments described above are able to be applied to various electronic devices such as a transmission unit or a reception unit such as distribution to a terminal using satellite broadcasting, wired broadcasting such as cable TV, distribution on the Internet, or a cellular network, a recording device which records an image on a medium such as an optical disc, a magnetic disc, or a flash memory, or a reproduction device which reproduces images from the recording medium. Below, four examples are described.

4. Fourth Embodiment

First Example: Television Reception Unit

Figure 25:
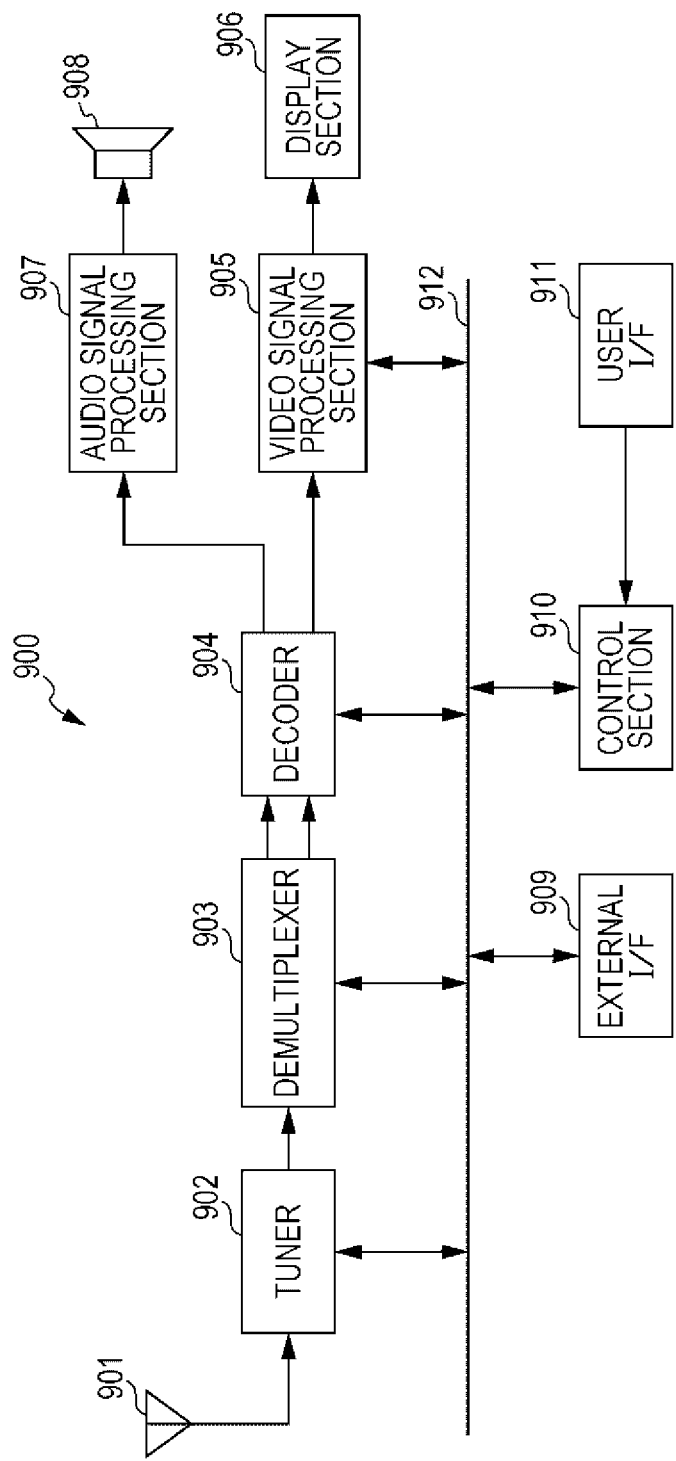
FIG. 25 is a block diagram illustrating one example of a schematic configuration of a television device.

FIG. 25 is a block diagram illustrating one example of a schematic configuration of a television device where the embodiment described above has been applied. A television device 900 is provided with an antenna 901, a tuner 902, a demultiplexer 903, a decoder 904, a video signal processing section 905, a display 906, an audio signal processing section 907, a speaker 908, an external interface 909, a control section 910, a user interface 911, and a bus 912.

The tuner 902 extracts a signal of a desired channel from a broadcasting signal which is received via the antenna 901 and modulates the signal which has been extracted. Then, the tuner 902 outputs the coding bit stream which has been obtained due to the modulation to the demultiplexer 903. That is, the tuner 902 has a function as a transfer means in the television device 900 which receives the coding stream where the image is coded.

The demultiplexer 903 separates the video stream and the audio stream of the program which is a viewing target from the coding bit stream and outputs each of the streams which have been separated to the decoder 904. In addition, the demultiplexer 903 extracts supplementary data such as an EPG (Electronic Program Guide) from the coding bit stream and supplies the data which has been extracted to the control section 910. Here, the demultiplexer 903 may perform descrambling in a case where the coding bit stream is scrambled.

The decoder 904 decodes the video stream and the audio stream which are input from the demultiplexer 903. Then, the decoder 904 outputs the video image which is generated by the decoding process to the video signal processing section 905. In addition, the decoder 904 outputs the audio data which is generated by the decoding process to the audio signal processing section 907.

The video signal processing section 905 reproduces the video data which is input from the decoder 904 and displays the video in the display section 906. In addition, the video signal processing section 905 may display an application image which is supplied via a network in the display section 906. In addition, the video signal processing section 906 may, for example, perform an additional process such as noise removal according to the setting with regard to the video data. Furthermore, the video signal processing section 906 may, for example, generate an image of a GUI (Graphical User Interface) such as a menu, a button, or a cursor and overlap the image which is generated with the output image.

The display section 906 is driven by a driving signal which is supplied from the video signal processing section 905 and displays video or images on a video screen of a display device (for example, a liquid crystal display, a plasma display, or a OELC (Organic ElectroLuminescence Display) or the like).

The audio signal processing section 907 performs a reproduction process such as D/A conversion or amplification with regard to the audio data which is input from the decoder 904 and outputs the audio from the speaker 908. In addition, the audio signal processing section 907 may perform an additional process such as noise removal with regard to the audio data.

The external interface 909 is an interface for connecting the television device 900 to an external device or a network. For example, the video stream or the audio stream which is received via the external interface 909 may be decoded by the decoder 904. That is, the external interface 909 also has a function as a transfer means in the television device 900 which receives the coding stream where the image is coded.

The control section 910 has a processor such as a CPU and a memory such as a RAM or a ROM. The memory stores programs executed by the CPU, program data, EPG data, and data obtained via a network. The program which is stored using the memory is, for example read out and executed by the CPU when the television device 900 is activated. The CPU controls the operations of the television device 900 according to an operation signal which is input, for example, from a user interface 911 by executing the programs.

The user interface 911 is connected to the control section 910. The user interface 911 has, for example, a button or a switch for the user to operate the television device 900 and a reception section of a remote control signal. The user interface 911 generates the operation signal by detecting the operation by the user via the constituent elements and outputs the operation signal which is generated to the control section 910.

The bus 912 mutually connects the tuner 902, the demultiplexer 903, the decoder 904, the video signal processing section 905, the audio signal processing section 907, the external interface 909, and the control section 910.

In the television device 900 which is configured in this manner, the decoder 904 has a function of the image decoding device according to the embodiment described above. Due to this, it is possible to improve the coding efficiency with regard to the color difference signal when decoding images with the television device 900.

5. Fifth Embodiment

Second Example: Mobile Phone Unit

Figure 26:
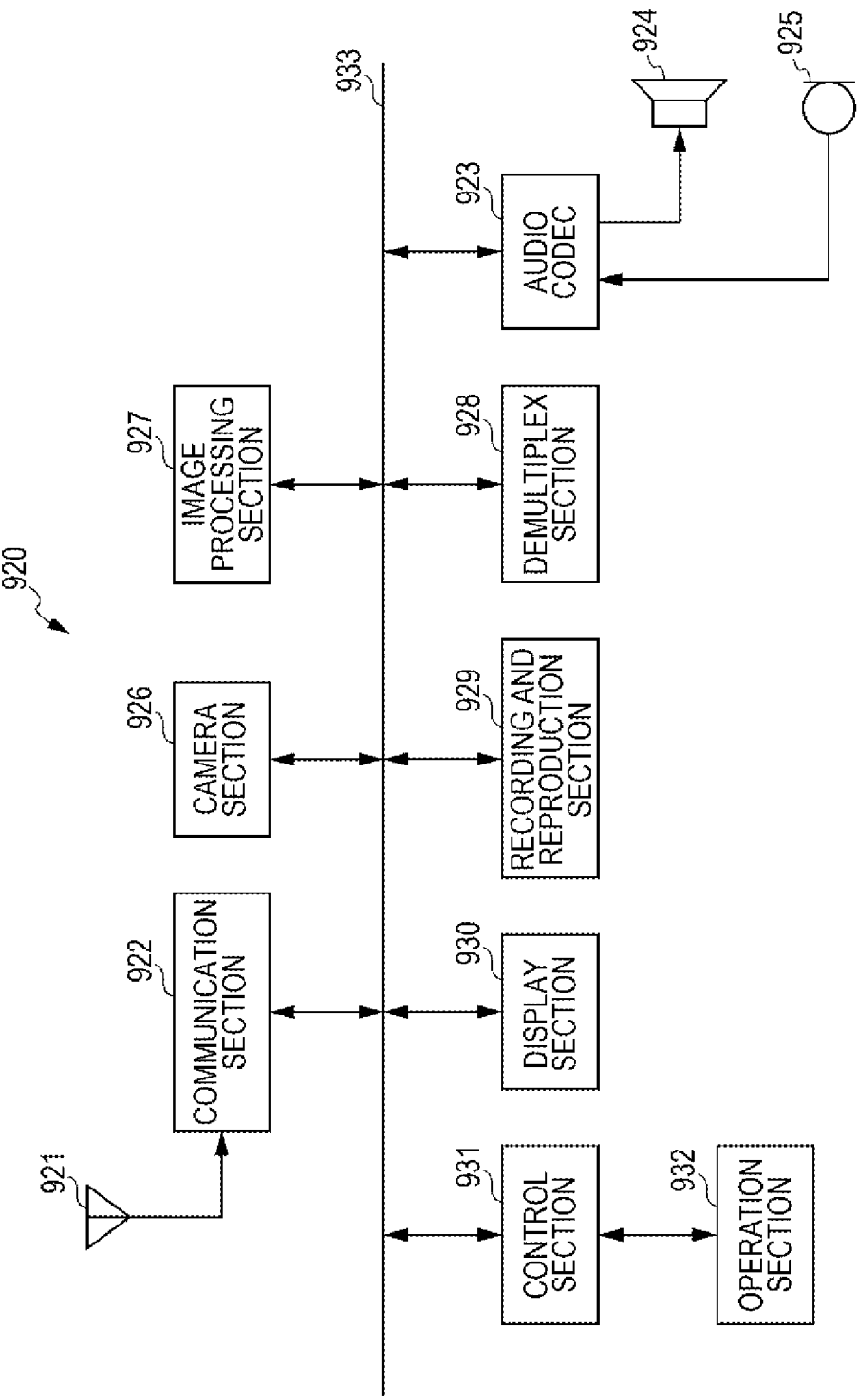
FIG. 26 is a block diagram illustrating one example of a schematic configuration of a mobile phone unit.

FIG. 26 is a block diagram illustrating one example of a schematic configuration of a mobile phone unit where the embodiment described above has been applied. A mobile phone unit 920 is provided with an antenna 921, a communication section 922, an audio codec 923, a speaker 924, a microphone 925, a camera section 926, an image processing section 927, a demultiplex section 928, a recording and reproduction section 929, a display section 930, a control section 931, an operation section 932, and a bus 933.

The antenna 921 is connected to the communication section 922. The speaker 924 and the microphone 925 are connected to the audio codec 923. The operation section 932 is connected to the control section 931. The bus 933 mutually connects the communication section 922, the audio codec 923, the camera section 926, the image processing section 927, the demultiplex section 928, the recording and reproduction section 929, the display section 930, and the control section 931.

The mobile phone unit 920 performs operation such as transmission and reception of audio signals, transmission and reception of electronic mail and image data, imaging of images, and recording of data with various operation modes which include an audio conversation mode, a data communication mode, an imaging mode, and a television phone mode.

In the audio conversation mode, the analog audio signals which are generated by the microphone 925 are supplied to the audio codec 923. The audio code 923 converts the analog audio signal into audio data and carries out A/D conversion and compress on the audio data which has been converted. Then, the audio codec 923 outputs the audio data after compression to the communication section 922. The communication section 922 codes and modulates the audio data and generates a transmission signal. Then, the communication section 922 transmits the transmission signal which has been generated to a base station (not shown) via the antenna 921. In addition, the communication section 922 carries out amplification and frequency conversion of a wireless signal which is received via the antenna 921. Then, the communication section 922 generates audio data by demodulating and decoding a reception signal and outputs the audio data which is generated to the audio codec 923. The audio codec 923 carries out extension and D/A conversion and generates an analog audio signal. Then, the audio codec 923 outputs the audio by supplying the audio signal which has been generated to the speaker 924.

In addition, in the data communication mode, for example, the control section 931 generates text data which configure an electronic mail according to an operation by the user via the operation section 932. In addition, the control section 931 displays the text on the display section 930. In addition, the control section 931 generates electronic mail data according to the transmission instruction from a user via the operation section 932 and outputs the electronic mail data which has been generated to the communication section 922. The communication section 922 codes and modulates the electronic mail data and generates the transmission signal. Then, the communication section 922 transmits the transmission signal which has been generated to the base station (not shown) via an antenna 921. In addition, the communication section 922 carries out amplification and frequency conversion of a wireless signal which is received via the antenna 921. Then, the communication section 922 restores the electronic mail data by the demodulation and decoding of the reception signal and outputs the electronic mail data which is restored to the control section 931. The control section 931 displays the content of the electronic mail on the display section 930 and stores the electronic mail data on a recording medium of the recording and reproduction section 929.

The recording and reproduction section 929 has an arbitrary recording medium where reading and writing is possible. For example, the recording medium may be a recording medium which is an embedded type such as a RAM or flash memory or may be a recording medium of an external mounting type such as a hard disk, a magnetic disc, an optical magnetic disc, an optical disc, a USB (Unallocated Space Bitmap) memory, or a memory card.

In addition, in the imaging mode, for example, the camera section 926 generates image data by imaging an object and outputs the image data which has been generated to the image processing section 927. The image processing section 927 codes the image data which is input from the camera section 926 and stores the coding stream to the recording medium of the recording and reproduction section 929.

In addition, in the television phone mode, for example, the demultiplex section 928 demultiplexes the image stream which is coded by the image processing section 927 and the audio stream which is input from the audio codec 923 and outputs the stream which is multiplexed to the communication section 922. The communication section 922 codes and modulates the electronic mail data and generates the transmission signal. Then, the communication section 922 transmits the transmission signal which has been generated to the base station (not shown) via the antenna 921. In addition, the communication section 922 carries out amplification and frequency conversion of a wireless signal which is received via the antenna 921 and acquires a reception signal. In the transmission signal and the reception signal, the coding bit stream is able to be included. Then, the communication section 922 restores the electronic mail data by the demodulation and decoding of the reception signal and outputs the stream which is restored to the demultiplex section 928. The demultiplex section 928 separates the video stream and the audio stream from the stream which has been input, outputs the video stream to the image processing section 927, and outputs the audio stream to the audio codec 923. The image processing section 927 decodes the video stream and generates video data. The video data is supplied to the imaging section 930 and a series of images are displayed using the display section 930. The audio codec 923 carries out extension and D/A conversion of the audio stream and generates an analog audio signal. Then, the audio codec 923 outputs audio by supplying the audio signal to the speaker 924.

In the mobile phone unit 920 which is configured in this manner, the image processing section 927 has a function of the image coding device and the image decoding device according to the embodiment described above. Due to this, it is possible to improve the coding efficiency with regard to the color difference signal when coding and decoding images with the mobile phone unit 920.

6. Sixth Embodiment

Third Example: Recording and Reproduction Device

Figure 27:
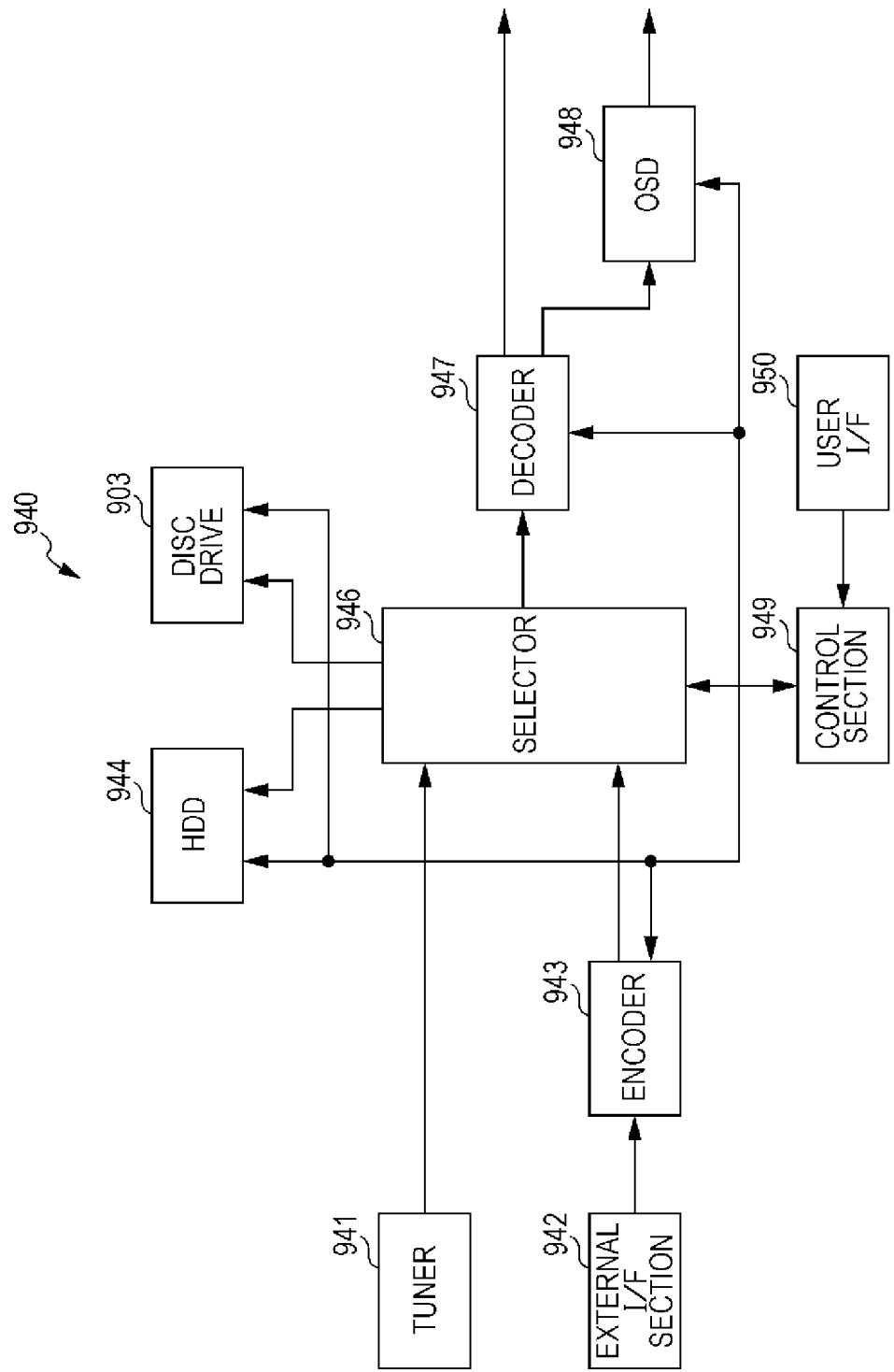
FIG. 27 is a block diagram illustrating one example of a schematic configuration of a recording and reproduction device.

FIG. 27 is a block diagram illustrating one example of a schematic configuration of a recording and reproduction device where the embodiment described above has been applied. A recording and reproduction device 940 records audio data and video data of, for example, a broadcasting program which has been received on a recording medium by coding. In addition, the recording and reproduction device 940 may record, for example, audio data and video data from another device which has been received on a recording medium by coding. In addition, the recording and reproduction device 940 reproduces data which is recorded on the recording medium on a monitor and speakers. At this time, the recording and reproduction device 940 decodes the audio data and the video data.

The recording and reproduction device 940 is provided with a tuner 941, an external interface 942, an encoder 943, a HDD (Hard Disk Drive) 944, a disk drive 945, a selector 946, a decoder 947, an OSD (On-Screen Display) 948, a control section 949, and a user interface 950.

The tuner 941 extracts a signal of a desired channel from a broadcasting signal which is received via an antenna (not shown) and modulates the signal which has been extracted. Then, the tuner 941 outputs the coding bit stream which has been obtained due to the modulation to the selector 946. That is, the tuner 941 has a function as a transfer means in the recording and reproduction device 940 which receives the coding stream where the image is coded.

The external interface 942 is an interface for connecting the recording and reproduction device 940 to an external device or a network. The external interface 942 may be, for example, an IEEE1394 interface, a network interface, a USB interface, or a flash memory interface. For example, the video stream and the audio stream which is received via the external interface 942 may be input to the encoder 943. That is, the external interface 942 also has a function as a transfer means in the recording and reproduction device 940 which receives the coding stream where the image is coded.

The encoder 943 codes the video data and the audio data in a case where the video data and the audio data which are input from the external interface 942 are not coded. Then, the encoder 943 output the coding bit stream to the selector 946.

The HDD 944 records the coding bit stream where the content data is compressed such as video and audio, various programs, and other data in an internal hard disk. In addition, the HDD 944 reads out the data from the hard disk when reproducing the video and the audio.

The disk drive 945 performs recording and reading out of data with regard to the recording medium which has been mounted. The recording medium which is mounted in the disk drive 945 may be, for example, a DVD disk (DVD-video, DVD-RAM, DVD-R, DVD-RW, DVD+R, DVD+RW, or the like) or a Blu-ray (registered trademark) disc.

The selector 946 selects the coding bit stream which is input from the tuner 941 or the encoder 943 and outputs the coding bit stream which is selected to the HDD 944 or the disk drive 945. In addition, the selector 946 outputs the coding bit stream which is input from the HDD 944 or the disk drive 945 when reproducing the video and the audio to the decoder 947.

The decoder 947 decodes the coding bit stream and generates the video data and the audio data. Then, the decoder 947 outputs the video data which is generated to the OSD 948. In addition, the decoder 904 outputs the audio data which is generated to an external speaker.

The OSD 948 generates video data which is input from the decoder 947 and displays the video. In addition, the OSD 948 may overlap an image of, for example, a GUI such as a menu, a button, or a cursor on the video which is displayed.

The control section 949 has a processor such as a CPU and a memory such as a RAM or a ROM. The memory stores programs executed by the CPU, program data, EPG data, and data obtained via a network. The program which is stored using the memory is, for example read out and executed by the CPU when the recording and reproduction device 940 is activated. The CPU controls the operations of the recording and reproduction device 940 according to an operation signal which is input, for example, from a user interface 950 by executing the programs.

The user interface 950 is connected to the control section 949. The user interface 950 has, for example, a button or a switch for the user to operate the recording and reproduction device 940 and a reception section of a remote control signal. The user interface 950 generates the operation signal by detecting the operation by the user via the constituent elements and outputs the operation signal which is generated to the control section 949.

In the recording and reproduction device 940 which is configured in this manner, the encoder 943 has a function of the image coding device according to the embodiment described above. In addition, the decoder 947 has a function of the image decoding device according to the embodiment described above. Due to this, it is possible to improve the coding efficiency with regard to the color difference signal when coding and decoding images with the recording and reproduction device 940.

7. Seventh Embodiment

Fourth Example: Imaging Device

Figure 28:
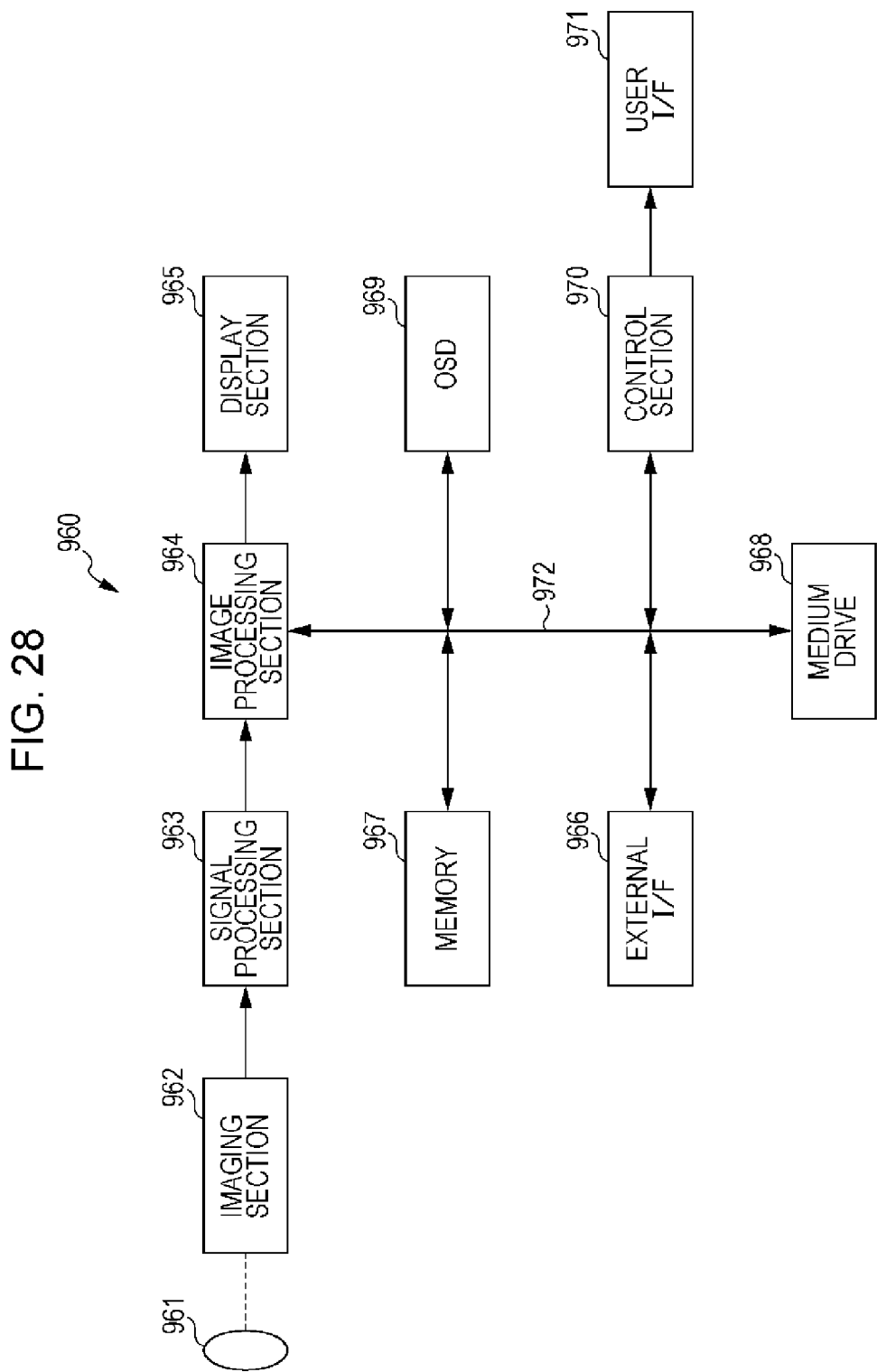
FIG. 28 is a block diagram illustrating one example of a schematic configuration of an imaging device.

FIG. 28 is a block diagram illustrating one example of a schematic configuration of an imaging device where the embodiment described above has been applied. An imaging device 960 generates an image by imaging an object and records image data in a recording medium by coding.

The imaging device 960 is provided with an optical block 961, an imaging section 962, a signal processing section 963, an image processing section 964, a display section 965, an external interface 966, a memory 967, a medium drive 968, a OSD 969, a control section 970, a user interface 971, and a bus 972.

The optical block 961 is connected to the imaging section 962. The imaging section 962 is connected to the signal processing section 963. The display section 965 is connected to the image processing section 964. The user interface 971 is connected to the control section 970. The bus 972 is mutually connected to the image processing section 964, the display section 965, the external interface 966, the memory 967, the medium drive 968, the OSD 969, and the control section 970.

The optical block 961 has a focus lens and an aperture mechanism. The optical block 961 images an optical image of an object on an imaging surface of the imaging section 962. The imaging section 962 has an image sensor such as a CCD (Charge Coupled Device) or a CMOS (Complementary Metal Oxide Semiconductor) and converts the optical image which is imaged on the imaging surface to an image signal as an electric signal using photoelectric conversion. Then, the imaging section 962 outputs the image signal to the signal processing section 963.

The signal processing section 963 performs various camera signal processes such as knee correction, gamma correction, and color correction with regard to the image signal which is input from the imaging section 962. The signal processing section 963 outputs the image data after the camera signal processes to the image processing section 964.

The image processing section 964 codes the image data which is input from the signal processing section 963 and generates coding data. Then, the image processing section 964 outputs the coding data which has been generated to the external interface 966 and the medium driver 968. In addition, the image processing section 964 decodes the coding data which is input from the external interface 966 and the medium driver 968 and generates image data. Then, the image processing section 964 outputs the image data which has been generated to the display section 965. In addition, the image processing section 964 may display the image by outputting the image data which is input from the signal processing section 963 to the display section 965. In addition, the image processing section 964 may overlap data for display which is acquired from the OSD 969 on the image which is output to the display section 965.

The OSD 969 generates, for example, a GUI image such as a menu, a button, or a cursor and outputs the image which has been generated to the image processing section 964.

The external interface 966 is configured as, for example, a USB input and output terminal. The external interface 966 is, for example, connected to the imaging device 960 and a printer when printing an image. In addition, a driver is connected in the external interface 966 when necessary. In the drive, for example, a removable medium such as a magnetic disc or an optical disc is mounted and a program which is read out from the removable medium is able to be installed to the imaging device 960. Furthermore, the external interface 966 may be configured as a network interface which is connected to a network such as a LAN or the Internet. That is, the external interface 966 has a function as a transfer means of the imaging device 960.

The recording medium which is mounted in the medium drive 968 may be, for example, an arbitrary removable medium where reading and writing is possible such as a magnetic disc, an optical disc, or a semiconductor memory. In addition, the recording medium is mounted in the medium drive 968 in a fixed manner, and for example, a recording section which is non-transportable such as an embedded hard disk drive or SSD (Solid State Drive).

The control section 970 has a processor such as a CPU and a memory such as a RAM or a ROM. The memory stores a program which is executed by the CPU, program data, or the like. The program which is stored using the memory is, for example, read out and executed by the CPU when the imaging device 960 is activated. The CPU controls the operations of the imaging device 960 according to an operation signal which is input, for example, from a user interface 971 by executing the programs.

The user interface 971 is connected to the control section 970. The user interface 971 has, for example, a button or a switch for the user to operate the imaging device 960. The user interface 971 generates the operation signal by detecting the operation by the user via the constituent elements and outputs the operation signal which is generated to the control section 970.

In the imaging device 960 which is configured in this manner, the image processing section 964 has a function of the image coding device and the image decoding device according to the embodiment described above. Due to this, it is possible to improve the coding efficiency with regard to the color difference signal when coding and decoding images with the imaging device 960.

Here, in the specifications, an example has been described where each type of information such as the color difference quantization parameter is transferred to the decoding side from the coding side by being multiplexed in the coding stream. However, the method of transferring the information is not limited to this example. For example, the information may not be multiplexed in the coding bit stream but may be transferred or recorded as individual data which is linked to the coding bit stream. Here, the term "linked to" has the meaning of the image which is included in the bit stream (this may be a portion of an image such as a slice or a block) and the information which corresponds to the image being linked when decoding. That is, the information may be transferred on a transfer path which is different to the image (or bit stream). In addition, the information may be recorded in a different recording medium (or a recording area which is different in the same recording medium) to the image (or bit stream). Furthermore, the information and the image (or bit stream) may be linked to each other, for example, in arbitrary units such as a plurality of frames, one frame, or a portion of a frame.

Above, preferred embodiments of the disclosure have been described in detail with reference to the attached diagrams, but the present disclosure is not limited to these examples. It is clear that various modification or alternations are possible within the range of the technical concept which is described in the scope of the claims to those skilled in the art in the field of the technology to which the present disclosure belongs and these are to be interpreted as of course belonging to the technical range of the present disclosure.

(1) An image decoding apparatus including:
a brightness adaptive offset processing section which performs a brightness adaptive offset process with regard to brightness signal of an image to be decoded; and
a color difference adaptive offset processing section which performs a color difference adaptive offset process with regard to a color difference signal based on data generated by the brightness adaptive offset process by the brightness adaptive offset processing section to generate a decoded image.

(2) The apparatus according to (1), wherein the brightness adaptive offset processing section divides the image into a plurality of regions and performs the brightness adaptive offset process on each of the plurality of regions, and the color difference adaptive offset processing section performs the color difference adaptive offset processing on each of the plurality of regions.

(3) The apparatus according to (2), wherein the brightness adaptive offset processing section divides the image into the plurality of regions creating a quad-tree structure and performs the brightness adaptive offset process on the quad-tree structure, and the color difference adaptive offset processing section performs the color difference adaptive offset processing on the quad-tree structure.

(4) The apparatus according to (2), wherein the brightness adaptive offset processing section determines a type of offset for each of the plurality of regions and performs the brightness adaptive offset process on each of the plurality of regions based on the type of offset, and the color difference adaptive offset processing section performs the color difference adaptive offset processing on some of the plurality of regions based on the type of offset.

(5) The apparatus according to (4), wherein the brightness adaptive offset processing section determines the type of offset from among three sets of offsets.

(6) The apparatus according to (5), wherein the three sets of offsets are no offset, band offset, and edge offset.

(7) The apparatus according to (1) to (6), wherein the brightness adaptive offset processing section determines a category for each pixel in the image and performs the brightness adaptive offset process on each pixel based on the category, and the color difference adaptive offset processing section performs the color difference adaptive offset processing on some pixels based on the category.

(8) The apparatus according to (1) to (7), wherein the brightness adaptive offset processing section determines a number of brightness sub-bands of an offset and performs the brightness adaptive offset process based on the number of brightness sub-bands, and the color difference adaptive offset processing section performs the color difference adaptive offset processing based on a number of color difference sub-bands which is less than the number of brightness sub-bands.

(9) An image encoding apparatus includes:
a brightness adaptive offset processing section which performs a brightness adaptive offset process with regard to brightness signal of an image to be encoded; and
a color difference adaptive offset processing section which performs a color difference adaptive offset process with regard to a color difference signal based on data generated by the brightness adaptive offset process by the brightness adaptive offset processing section to generate an encoded image.

REFERENCE SIGNS LIST

16 LOSSLESS CODING SECTION
21 DEBLOCK FILTER
42 LOSSLESS DECODING SECTION
46 DEBLOCK FILTER
71 ADAPTIVE LOOP FILTER
91 ADAPTIVE LOOP FILTER
101 IMAGE CODING DEVICE
111 ADAPTIVE OFFSET SECTION
112 COLOR DIFFERENCE ADAPTIVE OFFSET SECTION
131 QUAD-TREE CONFIGURATION DETERMINING SECTION
132 BRIGHTNESS OFFSET CALCULATION SECTION
133 BRIGHTNESS OFFSET SECTION
134 IMAGE BUFFER
141 COLOR DIFFERENCE OFFSET CALCULATION SECTION
142 CORRELATION COEFFICIENT CALCULATION SECTION
143 COLOR DIFFERENCE OFFSET PREDICTION VALUE CALCULATION SECTION
144 COLOR DIFFERENCE OFFSET SECTION
201 IMAGE CODING DEVICE
211 ADAPTIVE OFFSET SECTION
212 COLOR DIFFERENCE ADAPTIVE OFFSET SECTION
231 QUAD-TREE CONFIGURATION BUFFER
232 BRIGHTNESS OFFSET BUFFER
233 BRIGHTNESS OFFSET SECTION
234 PIXEL BUFFER
241 CORRELATION COEFFICIENT BUFFER
242 COLOR DIFFERENCE OFFSET RESIDUAL BUFFER
243 COLOR DIFFERENCE OFFSET RECONFIGURATION SECTION
244 COLOR DIFFERENCE OFFSET SECTION

The invention claimed is:

1. An image decoding apparatus comprising:
a decoding circuit configured to decode a bit stream and generate a decoded image;
a brightness adaptive offset processing circuit configured to perform a brightness adaptive offset process with regard to a brightness signal of the decoded image and output a brightness offset value; and
a color difference adaptive offset processing circuit configured to perform a color difference adaptive offset process with regard to a color difference signal of the decoded image based on data related to the brightness offset value stored in largest coding unit (LCU) header used by the brightness adaptive offset process by the brightness adaptive offset processing circuit and further based on a quad-tree structure configuration output,
wherein the brightness adaptive offset processing circuit is further configured to determine a pixel value category for each pixel in the image and perform the brightness adaptive offset process on each pixel based on the category, and the color difference adaptive offset processing circuit is further configured to perform the color difference adaptive offset processing on some pixels based on the pixel value category.

2. The apparatus according to claim 1, wherein the brightness adaptive offset processing circuit is further configured to divide the image into a plurality of regions and perform the brightness adaptive offset process on each of the plurality of regions, and the color difference adaptive offset processing circuit is further configured to perform the color difference adaptive offset processing on each of the plurality of regions.

3. The apparatus according to claim 2, wherein the brightness adaptive offset processing circuit is further configured to divide the image into the plurality of regions creating the quad-tree structure and performs the brightness adaptive offset process on the quad-tree structure.

4. The apparatus according to claim 2, wherein the brightness adaptive offset processing circuit is further configured to determine a type of offset for each of the plurality of regions and perform the brightness adaptive offset process on each of the plurality of regions based on the type of offset, and the color difference adaptive offset processing circuit is further configured to perform the color difference adaptive offset processing on some of the plurality of regions based on the type of offset.

5. The apparatus according to claim 4, wherein the brightness adaptive offset processing circuit is further configured to determine the type of offset from among three sets of offsets.

6. The apparatus according to claim 5, wherein the three sets of offsets are no offset, band offset, and edge offset.

7. The apparatus according to claim 1, wherein the brightness adaptive offset processing circuit is further configured to determine a number of brightness sub-bands of an offset and perform the brightness adaptive offset process based on the number of brightness sub-bands, and the color difference adaptive offset processing circuit is further configured to perform the color difference adaptive offset processing based on a number of color difference sub-bands which is less than the number of brightness sub-bands.

8. The apparatus according to claim 1, wherein the color difference adaptive offset processing circuit is further configured to output a color offset value, the color offset value being different from the brightness offset value.

9. The apparatus according to claim 1, wherein the color difference offset value is based on the brightness offset value and the quad-tree structure configuration output.

10. An image encoding apparatus comprising:

an encoding circuit configured to encode a bit stream and generate an encoded image;

a brightness adaptive offset processing circuit configured to perform a brightness adaptive offset process with regard to a brightness signal of the encoded image and output a brightness offset value; and a color difference adaptive offset processing circuit configured to perform a color difference adaptive offset process with regard to a color difference signal of the encoded image based on data related to the brightness offset value stored in largest coding unit (LCU) header used by the brightness adaptive offset process by the brightness adaptive offset processing circuit and further based on a quad-tree structure configuration output, wherein the brightness adaptive offset processing circuit is further configured to determine a pixel value category for each pixel in the image and perform the brightness adaptive offset process on each pixel based on the category, and the color difference adaptive offset processing circuit is further configured to perform the color difference adaptive offset processing on some pixels based on the pixel value category.

* * * * *